US009746658B2

(12) United States Patent
Abe

(10) Patent No.: US 9,746,658 B2
(45) Date of Patent: Aug. 29, 2017

(54) OBJECTIVE FOR MICROSCOPE

(71) Applicant: OLYMPUS CORPORATION, Shibuya-ku, Tokyo (JP)

(72) Inventor: Kenichiro Abe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 14 days.

(21) Appl. No.: 14/885,223

(22) Filed: Oct. 16, 2015

(65) Prior Publication Data

US 2016/0116724 A1    Apr. 28, 2016

(30) Foreign Application Priority Data

Oct. 24, 2014  (JP) ................................ 2014-217747

(51) Int. Cl.
　　*G02B 21/02*　　(2006.01)
　　*G02B 13/24*　　(2006.01)
　　*G02B 21/33*　　(2006.01)

(52) U.S. Cl.
　　CPC ............. *G02B 21/02* (2013.01); *G02B 13/24* (2013.01); *G02B 21/33* (2013.01)

(58) Field of Classification Search
　　CPC ...... G02B 21/02; G02B 13/24; G02B 21/367; G02B 21/16; G02B 21/365; G02B 21/361; G02B 21/06; G02B 21/26; G02B 21/0032; G02B 21/34; G02B 21/0076; G02B 21/008; G02B 21/082; G02B 21/33; G02B 21/086; G02B 27/00
　　USPC ....... 359/656, 661, 645, 689, 690, 377, 350, 359/654, 657, 658
See application file for complete search history.

(56) References Cited

U.S. PATENT DOCUMENTS

| 5,532,878 A | 7/1996 | Suenaga et al. |
| 5,636,058 A | 6/1997 | Amemiya |
| 5,748,372 A | 5/1998 | Kitagawa |
| 5,847,877 A | 12/1998 | Imamura et al. |
| 5,978,153 A | 11/1999 | Nishio |
| 2002/0024744 A1 | 2/2002 | Kasahara |
| 2003/0142412 A1 | 7/2003 | Shirasuna |

(Continued)

FOREIGN PATENT DOCUMENTS

| JP | 60209715 A | 10/1985 |
| JP | 07230038 A | 8/1995 |

(Continued)

*Primary Examiner* — Scott J Sugarman
*Assistant Examiner* — Mustak Choudhury
(74) *Attorney, Agent, or Firm* — Holtz, Holtz & Volek PC

(57) ABSTRACT

An objective for a microscope includes, in order from an object side, a first lens group with positive refractive power, a second lens group with positive refractive power, and a third lens group with negative refractive power. When NA represents a numerical aperture of the objective, FN represents a field number of the objective, $\beta$ represents a magnification of the objective, $\epsilon$ represents an Airy disk diameter on an axis to a d-line of the objective, $\phi_{max}$ represents a maximum value of an effective diameter of a lens included in the objective, and $h_{exp}$ represents a radius of an exit pupil of the objective, the objective satisfies the following conditional expressions:

$$0.8 \leq NA \leq 1.5 \quad (1)$$

$$1000 \leq FN/|\beta|/\epsilon \leq 10000 \quad (2)$$

$$1.7 \leq \phi_{max}/2/h_{exp}/NA \leq 4 \quad (3).$$

11 Claims, 24 Drawing Sheets

(56) References Cited

U.S. PATENT DOCUMENTS

| | | |
|---|---|---|
| 2008/0180805 A1 | 7/2008 | Yonetani |
| 2008/0212199 A1 | 9/2008 | Yonetani |
| 2010/0103530 A1 | 4/2010 | Yonetani |
| 2010/0165474 A1 | 7/2010 | Yonetani |
| 2010/0177404 A1* | 7/2010 | Fujimoto ............... G02B 21/02 359/661 |
| 2011/0254992 A1 | 10/2011 | Abe |

FOREIGN PATENT DOCUMENTS

| | | |
|---|---|---|
| JP | 08190055 A | 7/1996 |
| JP | 08286113 A | 11/1996 |
| JP | 11133305 A | 5/1999 |
| JP | 2002031760 A | 1/2002 |
| JP | 2003215457 A | 7/2003 |
| JP | 3717555 B2 | 11/2005 |
| JP | 2006259548 A | 9/2006 |
| JP | 2008185965 A | 8/2008 |
| JP | 2010186162 A | 8/2010 |
| JP | 2011075982 A | 4/2011 |
| JP | 2011227131 A | 11/2011 |

\* cited by examiner

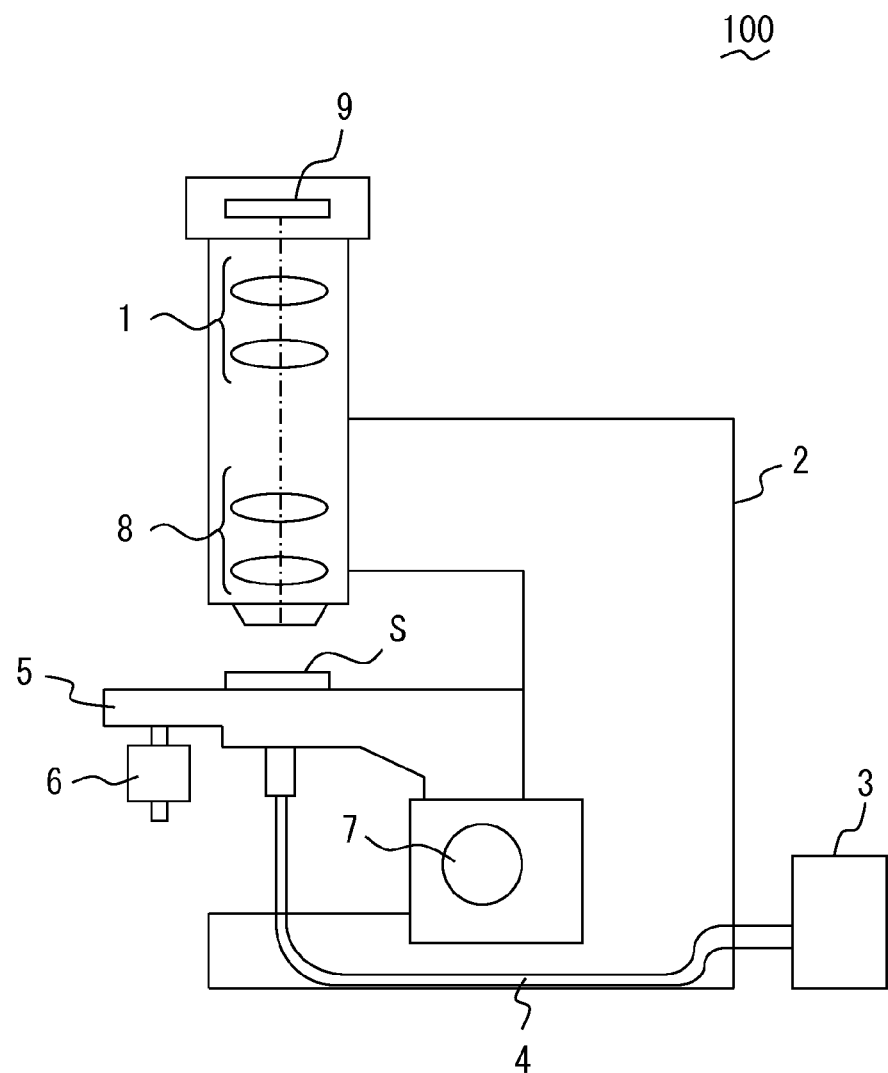
F I G. 1

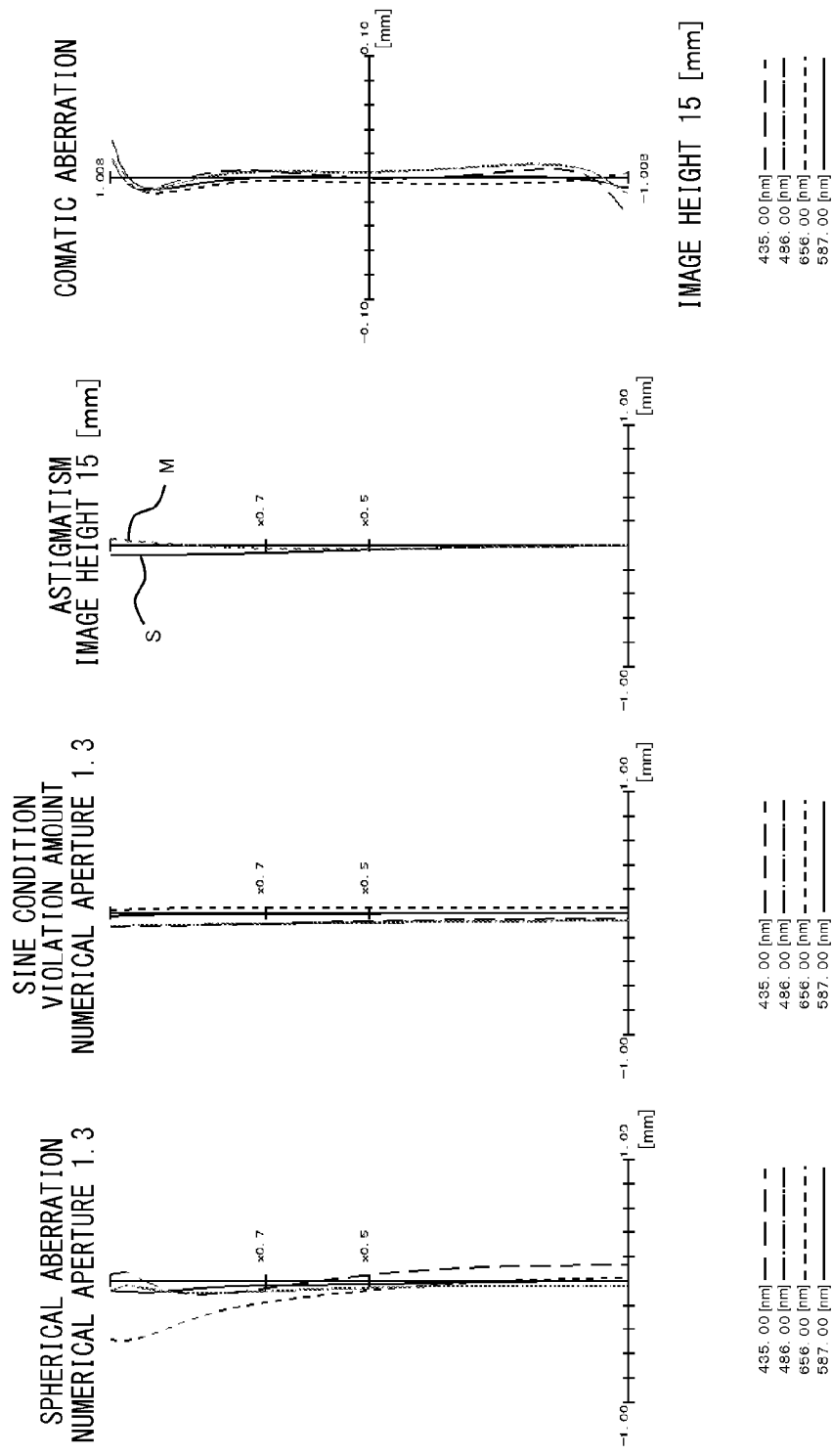

OBJECTIVE FOR MICROSCOPE

CROSS REFERENCE TO RELATED APPLICATIONS

This application is based upon and claims the benefit of priority from prior Japanese Patent Application No. 2014-217747, filed Oct. 24, 2014, the entire contents of which are incorporated herein by this reference.

BACKGROUND OF THE INVENTION

Field of the Invention

The present invention relates to an objective for a microscope.

Description of the Related Art

In recent years, the number of pixels of an image sensor has increased remarkably, and in the field of a microscope, expectations for a microscope device that enables observation and image acquisition while achieving both a wide field of view and high resolving power are increasing. As an example, when such a microscope device is employed for a virtual slide, a scanning speed can be increased.

In order to realize the microscope device above, an objective having a wide field of view (namely, a large field number and a low magnification) and a high numerical aperture is desired. Such an objective is described, for example, in Japanese Laid-Open Patent Publication No. 2010-186162 and Japanese Laid-Open Patent Publication No. 2011-75982.

SUMMARY OF THE INVENTION

An aspect of the present invention is a dry objective for a microscope. The objective includes, in order from an object side, a first lens group with positive refractive power, a second lens group with positive refractive power, the second lens group including a cemented lens that is configured of a lens with positive refractive power that is made of a low dispersion material and a lens with negative refractive power that is made of a high dispersion material, and a third lens group with negative refractive power. The first lens group includes, in order from the object side, a first lens that is a single lens having a meniscus shape with a concave surface facing the object side, a second lens that is a single lens with positive refractive power, the single lens having a meniscus shape with a concave surface facing the object side, and a third lens component that is a single lens or cemented lens with positive refractive power. When NA represents a numerical aperture of the objective, f represents a focal length of the objective, $f_{G1}$ represents a focal length of the first lens group, $r_{11}$ represents a radius of curvature of a lens surface on the object side of the first lens, $r_{12}$ represents a radius of curvature of a lens surface on an image side of the first lens, and $d_{o12}$ represents a distance on an optical axis from a front-side focal plane of the objective to the lens surface on the image side of the first lens, the objective satisfies the following conditional expressions:

$$0.8 \leq NA < 1 \tag{4}$$

$$1.6 \leq f_{G1}/f \leq 6 \tag{5}$$

$$-1.6 \leq r_{11}/f \leq -0.2 \tag{6}$$

$$-2 \leq r_{12}/d_{o12} \leq -0.86. \tag{7}$$

Another aspect of the present invention is an immersion type objective for a microscope. The objective includes, in order from an object side, a first lens group with positive refractive power, a second lens group with positive refractive power, the second lens group including a cemented lens that is configured of a lens with positive refractive power that is made of a low dispersion material and a lens with negative refractive power that is made of a high dispersion material, and a third lens group with negative refractive power. The first lens group includes, in order from the object side, a first lens that is a single lens having a meniscus shape with a concave surface facing the object side, or a first cemented lens that is configured of the first lens and a lens arranged on the object side of the first lens, a second lens that a single lens with positive refractive power, the single lens having a meniscus shape with a concave surface facing the object side, and a third lens component that is a single lens or cemented lens with positive refractive power. The third lens group includes a rear lens group with negative refractive power closest to an image side, and the rear lens group includes a fourth lens component that is a single lens or cemented lens having a meniscus shape with a concave surface facing the object side, and a fifth lens component that is arranged closer to the object side than the fourth lens component and that is a single lens or cemented lens with negative refractive power with a concave surface facing the object side. When NA represents a numerical aperture of the objective, f represents a focal length of the objective, $f_{G1}$ represents a focal length of the first lens group, $r_{12}$ represents a radius of curvature of a lens surface on the image side of the first lens, and $d_{o12}$ represents a distance on an optical axis from a front-side focal plane of the objective to the lens surface on the image side of the first lens, the objective satisfies the following conditional expressions:

$$0.8 \leq NA \leq 1.5 \tag{8}$$

$$2.3 \leq f_{G1}/f \leq 8 \tag{9}$$

$$-1.5 \leq r_{12}/d_{o12} \leq -0.75. \tag{10}$$

Yet another aspect of the present invention is an objective for a microscope. The objective includes, in order from an object side, a first lens group with positive refractive power, a second lens group with positive refractive power, and a third lens group with negative refractive power. When NA represents a numerical aperture of the objective, FN represents a field number of the objective, β represents a magnification of the objective, ε represents an Airy disk diameter on an axis to a d-line of the objective, $\phi_{max}$ represents a maximum value of an effective diameter of a lens included in the objective, and $h_{exp}$ represents a radius of an exit pupil of the objective, the objective satisfies the following conditional expressions:

$$0.8 \leq NA \leq 1.5 \tag{1}$$

$$1000 \leq FN/|\beta|/\epsilon \leq 10000 \tag{2}$$

$$1.7 \leq \phi_{max}/2/h_{exp}/NA \leq 4. \tag{3}$$

BRIEF DESCRIPTION OF THE DRAWINGS

The present invention will be more apparent from the following detailed description when the accompanying drawings are referenced.

FIG. 1 illustrates a configuration of a microscope device according to an embodiment of the present invention.

FIG. 24A to FIG. 24D are aberration diagrams in a case in which a combination of an objective illustrated in FIG. 23 and a tube lens illustrated in FIG. 3 is used, and respectively illustrate spherical aberration, a sine condition violation amount, astigmatism, and comatic aberration.

DESCRIPTION OF THE EMBODIMENTS

Figure 2:
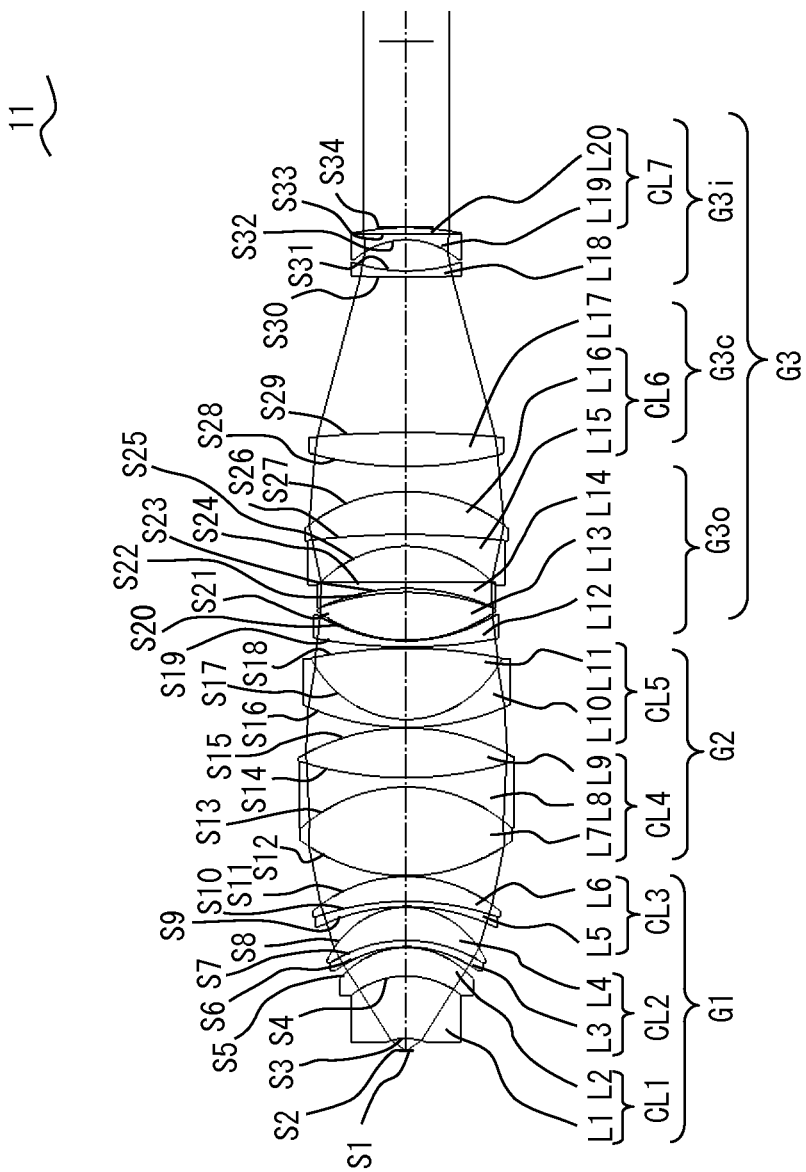
FIG. 2 is a sectional view of an objective in Example 1 of the present invention.

Objectives described in Japanese Laid-Open Patent Publication No. 2010-186162 and Japanese Laid-Open Patent Publication No. 2011-75982 insufficiently correct comatic aberration. Therefore, when both a wider field of view and a high numerical aperture are achieved, or when vignetting is reduced and an off-axis numerical aperture is enlarged, circumference performance remarkably deteriorates due to comatic aberration. Accordingly, it is difficult to achieve both a wide field of view and high resolving power at a higher level.

In view of the foregoing, embodiments of the present invention are described below.

FIG. 1 is a schematic diagram illustrating a configuration of a microscope device 100 according to an embodiment of the present invention. The microscope device 100 illustrated in FIG. 1 includes a microscope body 2, a light source device 3 connected to the microscope body 2 via an optical fiber 4, an imaging optical system including an objective 8 and a tube lens 1, and a digital camera incorporating an image sensor 9. The microscope device 100 further includes an XY handle 6 that moves a stage 5 in a direction orthogonal to an optical axis of the objective 8, and a Z handle 7 that moves the stage 5 in a direction parallel to the optical axis of the objective 8. In addition, the microscope device 100 may include an eyepiece (not illustrated).

The objective 8 is an infinity correction type objective (a microscope objective) for a microscope. The objective 8 may be a dry objective or an immersion type objective. The objective 8 is configured to realize a wide field of view (namely, a low magnification and a large field number) and a high numerical aperture. Specifically, the objective 8 is configured so as to satisfy the following conditional expressions, although the other details are described later.

$$0.8 \leq NA \leq 1.5 \tag{1}$$

$$1000 \leq FN/|\beta|/\epsilon \leq 10000 \tag{2}$$

$$1.7 \leq \phi_{max}/2/h_{exp}/NA \leq 4 \tag{3}$$

In these conditional expressions, NA represents a numerical aperture on an object side of the objective 8. FN represents a field number of the objective 8. $\beta$ represents a magnification of the objective 8. $\epsilon$ represents an Airy disk diameter on an axis to the d-line (588 nm) of the objective 8. $\phi_{max}$ represents a maximum value of an effective diameter of a lens included in the objective 8. $h_{exp}$ represents the radius of an exit pupil of the objective 8. The magnification of an objective corresponds to a projection magnification of a microscope optical system formed by combining a tube lens having a focal length between 160 mm and 200 mm and the objective, which is usually used for a microscope device. The field number of an objective corresponds to twice the maximum image height of the microscope optical system above formed by combining the tube lens and the objective.

It can be said that, when digital observation is performed on a sample image formed by this microscope optical system by using an image sensor, the objective can deal with an image sensor having a diagonal length that is the same as a field number at the maximum.

Conditional expression (1) represents a condition for obtaining sufficient resolving power. By NA not being less than a lower limit value of conditional expression (1), an Airy disk diameter can be sufficiently reduced, and therefore sufficient resolving power can be obtained. By NA not being greater than an upper limit value of conditional expression (1), a spread angle of a marginal ray incident on the objective 8 does not excessively increase, and deterioration in performance primarily due to comatic aberration can be suppressed. Accordingly, sufficient resolving power can be obtained.

Conditional expression (2) represents a condition for obtaining sufficient resolving power and a wide field of view. By $FN/|\beta|/\epsilon$ not being less than a lower limit value of conditional expression (2), sample observation and image acquisition can be performed with a wide field of view and high resolving power while making the best use of performance of the image sensor 9 having high definition and a large size (namely, a large number of pixels) that is described later. By $FN/|\beta|/\epsilon$ not being greater than an upper limit value of conditional expression (2), an Airy disk diameter does not become small enough to exceed resolving power of the image sensor 9, and there is no need to correct aberration due to an excessively high NA. Therefore, deterioration in performance primarily due to comatic aberration can be suppressed. A value obtained by dividing a field number of an objective by a magnification of the objective is equal to twice the object height of the objective. Accordingly, when the object height of the objective is $Y_{ob}$, conditional expression (2) is synonymous with the following expression.

$$1000 \leq 2 \times Y_{ob}/\epsilon \leq 10000 \quad (2A)$$

Conditional expression (3) represents a condition for satisfactorily correcting primarily comatic aberration so as to attain a wide field of view and high resolving power. By $\phi_{max}/2/h_{exp}/NA$ not being less than a lower limit value of conditional expression (3), there is no need to converge an off-axis pencil of light with high refractive power in an optical system in a portion located on a side of a sample S within the objective 8. Therefore, an incident angle and a refraction angle of an off-axis marginal ray to a lens surface does not excessively increase, and this allows the generation of comatic aberration to be reduced. By $\phi_{max}/2/h_{exp}/NA$ not being greater than an upper limit value of conditional expression (3), an outer diameter of a lens configuring the objective 8 does not excessively increase, and this prevents the objective 8 from having a large diameter. The pencil of light is a bundle of rays emitted from one point of an object (an object point).

It is preferable that the objective 8 satisfy conditional expression (2-1) and conditional expression (3-1) described below, instead of conditional expression (2) and conditional expression (3) described above, respectively, and it is further preferable that the objective 8 satisfy conditional expression (2-2) and conditional expression (3-2).

$$1200 \leq FN/|\beta|/\epsilon \leq 8000 \quad (2\text{-}1)$$

$$1400 \leq FN/|\beta|/\epsilon \leq 6000 \quad (2\text{-}2)$$

$$1.9 \leq \phi_{max}/2/h_{exp}/NA \leq 3.5 \quad (3\text{-}1)$$

$$2.1 \leq \phi_{max}/2/h_{exp}/NA \leq 3 \quad (3\text{-}2)$$

The tube lens 1 is a tube lens for a microscope that forms a magnified image of an object (sample S) by being used in combination with the objective 8. The tube lens 1 is configured so as to satisfactorily correct aberration and realize a large field number and a high numerical aperture.

The image sensor 9 is, for example, a CCD (Charge Coupled Device), a CMOS (Complementary Metal Oxide Semiconductor), or the like, and is arranged on an image plane on which a magnified image is formed by the objective 8 and the tube lens 1.

It is preferable that the image sensor 9 have a large size in order to sufficiently utilize a large field number realized by the objective 8 and the tube lens 1. It is also preferable that the image sensor 9 have high definition in order to sufficiently exhibit high imaging performance realized by the objective 8 and the tube lens 1. It is preferable that the image sensor 9 have, for example, a pixel size L (namely, a length of one side of each pixel) between 1 μm and 17 μm. This is because, when the pixel size L is greater than 17 μm, a Nyquist frequency is lower than a cut-off frequency of an imaging optical system and this prevents resolution performance of the imaging optical system from being sufficiently exhibited. This is also because, when the pixel size L is less than 1 μm, a Nyquist frequency greatly exceeds a cut-off frequency of the imaging optical system and excessively increases, and resolution performance of an image sensor is not sufficiently exhibited.

In the microscope device 100, the sample S arranged on the stage 5 is illuminated with light that is emitted from the light source device 3 and is made incident via the optical fiber 4. The illuminated sample S is magnified and projected to the image sensor 9 by the objective 8 and the tube lens 1, and a magnified image of the sample S that has been formed by the objective 8 and the tube lens 1 is captured by the image sensor 9. When the microscope device 100 includes an eyepiece, the magnified image of the sample S is observed via the eyepiece.

The microscope device 100 having the above configuration enables observation and image acquisition while achieving both a wide field of view and a high resolution.

A configuration and an action of the objective 8 are described next in detail. The objective 8 is an objective for a microscope that forms a magnified image of an object (the sample S) by being used in combination with the tube lens 1. The objective 8 is configured of the first lens group with positive refractive power, the second lens group with positive refractive power, and the third lens group with negative refractive power in order from the object side.

The first lens group gradually suppresses divergence (spreading) of a pencil of light from the object with the positive power. The second lens group gradually suppresses spreading of a pencil of divergence light from the first lens group with the positive power while correcting primarily on-axis chromatic aberration, and converts the pencil of divergence light into a pencil of convergence light. The third lens group converts the pencil of convergence light from the second lens group into a pencil of parallel light with the negative power.

In the objective 8, a ray height of an on-axis marginal ray becomes the maximum within the second lens group. More specifically, the ray height of the on-axis marginal ray becomes the maximum on a boundary surface of a lens component closest to the object in the second lens group or within the lens component. This characteristic enables a boundary between the first lens group and the second lens group, both having positive power, to be identified. Further, with regard to a boundary between the second lens group and the third lens group, a lens component with positive refractive power that is closest to the object among lens components of the objective 8 other than lens components included in the first lens group and a lens component which the maximum ray height of an on-axis marginal ray pass through is a lens component closest to the image plane in the second lens group. This characteristic enables a boundary between the second lens group with positive power and the third lens group with negative power to be identified.

In this specification, a lens component is one lens block in which only two surfaces, an object-side surface and an image-side surface, are brought into contact with air (or immersion liquid), regardless of whether this is a single lens or a cemented lens.

When the objective 8 is a dry objective for a microscope, the first lens group includes the first lens, the second lens, and the third lens component, in order from the object side. The first lens is a single lens having a meniscus shape with a concave surface facing the object side. The second lens is a single lens with positive refractive power that has a meniscus shape with a concave surface facing the object side. The third lens component is a single lens or cemented lens with positive refractive power. The first lens and the second lens may be cemented.

By arranging a single lens having a meniscus shape with a concave surface facing the object side (the first lens) closest to the object, the concave surface can be arranged in an area in which a marginal ray height is small. Accordingly, primarily field curvature can be satisfactorily corrected with divergence of a pencil of light from an object suppressed. Further, by arranging the second lens and the third lens each having positive refractive power closer to an image plane than the first lens, divergence (spreading) of a pencil of light can be gradually suppressed with the generation of spherical aberration and comatic aberration reduced.

When the objective 8 is an immersion type objective for a microscope, the first lens group includes the first lens or the first cemented lens, the second lens, and the third lens component, in order from the object side. The first cemented lens is a cemented lens that is configured of the first lens and a lens arranged on the object side of the first lens. The first cemented lens and the second lens may be cemented.

By arranging a single lens having a meniscus shape with a concave surface facing the object side (the first lens) closest to the object, the concave surface can be arranged in an area in which a marginal ray height is small. Therefore, primarily field curvature can be satisfactorily corrected with divergence of a pencil of light from an object suppressed. This point is similar to a case of a dry objective. However, in a case of an immersion type objective, it may be difficult to fill a space (a concave portion) formed by the concave surface of the first lens with immersion liquid. In this case, a lens that is made of a material having a refractive index similar to that of the immersion liquid may be cemented to the concave surface of the first lens. Further, by arranging the second lens and the third lens component each having positive refractive power closer to the image plane than the first lens, divergence (spreading) of a pencil of light can be gradually suppressed with the generation of spherical aberration and comatic aberration reduced. This point is similar to a case of a dry objective.

The second lens group includes a cemented lens that is formed of a lens with positive refractive power that is made of a low dispersion material and a lens with negative refractive power that is made of a high dispersion material. The low dispersion material is a material that satisfies Abbe number vd≤65. The high dispersion material is a material that satisfies Abbe number vd≤55.

In the second lens group, a ray height of a marginal ray is great. Therefore, by the second lens group including a cemented lens that is formed of a lens with positive refractive power that is made of a low dispersion material and a lens with negative refractive power that is made of a high dispersion material, on-axis chromatic aberration can be effectively corrected.

When the objective 8 is an immersion type objective for a microscope, the third lens group includes a rear lens group with negative refractive power closest to the image plane. The rear lens group includes the fourth lens component, and the fifth component arranged closer to the object than the fourth lens component. The fourth lens component is a single lens or cemented lens having a meniscus shape with a concave surface facing the object side. The fifth lens component is a single lens or cemented lens with negative refractive power with a concave surface facing the object side.

The rear lens group in the third lens group converts a pencil of light into a pencil of parallel light by using the negative refractive power, and guides the pencil of parallel light to the tube lens 1. By including the fourth lens component, the rear lens group can have a concave surface of a lens arranged in an area in which a marginal ray height is small. Therefore, the Petzval sum can be corrected in a positive direction, and field curvature can be satisfactorily corrected. In addition, by including the fourth lens component, the rear lens group can have an area in which a marginal ray height is small closer to the object side than the forth lens component. By arranging the fifth lens component with negative refractive power in the area, the Petzval sum can be corrected in a positive direction, and field curvature can be satisfactorily corrected. Further, because the concave surface faces the object side, field curvature can be effectively corrected with the generation of astigmatism and comatic aberration suppressed.

A preferred configuration of the objective 8 is described below.

It is preferable that the third lens component included in the first lens group have a meniscus shape with a concave surface facing the object side. This enables divergence of a pencil of light to be suppressed while the generation of spherical aberration and comatic aberration is reduced.

Further, it is preferable that the first lens group include the seventh lens component closer to the image plane than the third lens component. The seventh lens component is a single lens or cemented lens with positive refractive power. By arranging the seventh lens component with positive refractive power closer to the image plane than the third lens component, an optical system from the first lens to the third lens component can refract a pencil of light more gradually (in a direction in which spreading of the pencil of light is suppressed) in a state in which the first lens group has a prescribed refractive power. As a result, the generation of comatic aberration and spherical aberration can be reduced.

It is preferable that the second lens group include three-lens-cemented lenses that is configured by cementing lenses with positive refractive power that each are made of a low dispersion material on both surfaces of a lens with negative refractive power that is made of a high dispersion material. This configuration enables on-axis chromatic aberration to be corrected on both of the surfaces of the lens with negative refractive power. Therefore, in the second group in which a ray height of a marginal ray is great, on-axis chromatic aberration can be effectively corrected. Further, because a lens surface is cemented to another lens surface, the generation of spherical aberration and comatic aberration can be reduced.

Further, it is preferable that the second lens group include an aspherical lens that has a lens surface having an aspherical shape. It is preferable that the aspherical shape be an aspherical shape with positive refractive power on the optical axis, and be an aspherical shape in which positive refractive power decreases towards a peripheral portion of the lens surface. By arranging the aspherical lens described above in the second group in which a ray height of a marginal ray is great, spherical aberration and comatic aberration can be satisfactorily corrected.

It is preferable that the third lens group be configured of a front lens group, an intermediate lens group, and a rear lens group, in order from the object side.

The front lens group is a lens group arranged closest to the object in the third lens group, and has a focal length that satisfies conditional expression (12) described later. This characteristic enables a boundary between the front lens group and the intermediate lens group to be identified. The front lens group plays a role in correcting on-axis chromatic aberration while gradually reducing a ray height of a marginal ray that has been converted in a convergence direction by the second lens group.

The intermediate lens group is a lens group arranged between the front lens group and the rear lens group. The intermediate lens group plays a different role depending on whether the objective 8 is a dry objective or an immersion type objective. When the objective 8 is a dry objective, the intermediate lens group plays a role in correcting the Petzval sum in a positive direction and further outputting a pencil of light as a pencil of convergence light. This corresponds to actions of an image-side portion of an optical system that is referred to as a so-called gauss group and an object-side portion of an optical system that is referred to as a wide converter. When the objective 8 is an immersion type objective, the intermediate lens group plays a role in correcting the Petzval sum in a positive direction and reducing a marginal ray height of an on-axis pencil of light. This corresponds to an action of an object-side portion of an optical system that is referred to as a so-called gauss group.

The rear lens group is a lens group arranged closest to the image plane in the third lens group. The rear lens group has a different characteristic depending on whether the objective 8 is a dry objective or an immersion type objective. When the objective 8 is a dry objective, the rear lens group has negative refractive power, and has a characteristic whereby an air space between the intermediate lens group and the rear lens group becomes greatest in the objective 8. When the objective 8 is an immersion type objective, the rear lens group has a characteristic whereby an on-axis marginal ray height becomes smallest within a lens component closest to the object in the rear lens group or on a boundary surface of the lens component. These characteristics enable a boundary between the intermediate lens group and the rear lens group to be identified. The rear lens group plays a role in converting an on-axis pencil of light into a pencil of parallel light. This corresponds to actions of an image-side portion of an optical system that is referred to as a so-called gauss group and an image-side portion of an optical system that is referred to as a wide converter. The rear lens group also plays a role in correcting the Petzval sum in a positive direction and converting the on-axis pencil of light into a pencil of parallel light having a prescribed exit pupil diameter. This corresponds to an action of an image-side portion of an optical system that is referred to as a so-called gauss group.

It is preferable that the front lens group include the eighth lens and the ninth lens that are arranged so as to be adjacent to each other. The eighth lens is a lens with positive refractive power that is made of a low dispersion material, and the ninth lens is a lens with negative refractive power that is made of a high dispersion material. A ninth-lens-side lens surface of the eighth lens and an eighth-lens-side lens surface of the ninth lens have a radius of curvature having the same sign. In other words, lens surfaces adjacent to each other are bent in the same direction.

The front lens group has an action of correcting on-axis chromatic aberration while gradually refracting a marginal ray that has been converted in a convergence direction (so as to enter into a convergence state) by the second lens group so as to reduce a ray height of the marginal ray. By the front lens group having the eighth lens and the ninth lens described above, on-axis chromatic aberration can be satisfactorily corrected. By these lenses being arranged so as to be adjacent to each other and by adjacent lens surfaces being bent in the same direction, the generation of comatic aberration and spherical aberration can be reduced. The eighth lens and the ninth lens may be cemented.

When the objective 8 is a dry objective for a microscope, it is preferable that the intermediate lens group include the tenth lens component. The tenth lens component is configured of a single lens or cemented lens having a meniscus shape with a concave surface facing the object side. By arranging the tenth lens component described above in a prescribed position between the front lens group and the rear lens group, a ray height of a marginal ray on a concave surface (on the object side) of the tenth lens component can be smaller than the ray height of the marginal ray on a convex surface (on the image side). As a result, the Petzval sum can be corrected in a positive direction, and field curvature can be satisfactorily corrected. In addition, because the concave surface faces the object side, an incident angle and an exit angle of an off-axis pencil of light do not excessively increase, and the generation of comatic aberration can be reduced.

In this case, it is preferable that the intermediate lens group further include the thirteenth lens with positive refractive power on the image side of the tenth lens component. This enables the thirteenth lens to have a portion of positive refractive power that a convex surface of the tenth lens component originally has, and therefore the generation of spherical aberration and comatic aberration can be suppressed.

When the objective 8 is an immersion type objective for a microscope, it is preferable that the intermediate lens group include the twelfth lens component. The twelfth lens component is configured of a single lens or cemented lens having a meniscus shape with a convex surface facing the object side. It is difficult for an immersion type objective for a microscope to sufficiently correct the Petzval sum on a concave surface closest to the object. Therefore, the third lens group is desired to have an action of correcting a greater Petzval sum, compared with a case in which the objective 8 is a dry objective for a microscope. By arranging the twelfth lens component in the intermediate lens group, a ray height of a marginal ray on a concave surface (on the image side) of the twelfth lens component can be smaller than the ray height of the marginal ray on a convex surface (on the object side). As a result, field curvature can be made satisfactory. Further, because the convex surface of the twelfth lens component faces the object side, a marginal ray height can be reduced in an area on the image side of the intermediate lens group, namely, in an area on the object side of the rear lens group. As a result, the Petzval sum can be corrected more effectively.

When the objective 8 is a dry objective for a microscope, it is preferable that the rear lens group have negative refractive power and that field curvature be satisfactorily corrected by using the negative refractive power. However, when a radius of curvature of a concave surface excessively decreases, at least one of comatic aberration and astigmatism is greatly generated. In view of this, it is preferable that the rear lens group include two or more lens components with negative refractive power. By the two or more lens components sharing negative refractive power, the rear lens group can have a prescribed negative refractive power, and a radius of curvature of each of the lens components can be prevented from excessively decreasing. As a result, the generation of comatic aberration and astigmatism can be reduced.

When the objective 8 is an immersion type objective, it is preferable that the rear lens group include the eleventh lens component that is arranged closer to the object than the fourth lens component. The eleventh lens component is a single lens or cemented lens with negative refractive power. By the rear lens group including the eleventh lens component with negative refractive power separately from the fourth lens component having an action of correcting the Petzval sum, the generation of astigmatism and comatic aberration can be suppressed, and field curvature can be corrected more effectively.

Regardless of whether the objective 8 is a dry objective for a microscope or an immersion type objective for a microscope, it is preferable that the rear lens group include an aspherical lens that has a lens surface having an aspherical shape. It is preferable that the aspherical shape be an aspherical shape with negative refractive power on the optical axis, and be an aspherical shape in which negative refractive power decreases towards a peripheral portion of the lens surface. By arranging the aspherical lens described above in the rear lens group in which an off-axis ray height is great, field curvature and astigmatism can be effectively corrected. It is also preferable that the rear lens group have a diffractive optical element with negative refractive power. This enables chromatic aberration of magnification to be satisfactorily corrected. Even when a lens with positive refractive power that is made of a high dispersion material is arranged in the rear lens group, a similar effect can be attained to some extent. However, by arranging a diffractive optical element, chromatic aberration of magnification of a g-line can be more surely prevented from being excessively corrected.

Regardless of whether the objective 8 is a dry objective for a microscope or an immersion type objective for a microscope, it is preferable that the objective 8 include the sixth lens with positive refractive power that is made of a material having a high partial dispersion. By the objective 8 including the sixth lens, on-axis chromatic aberration of a g-line that is excessively corrected when correcting on-axis chromatic aberration by using a combination of a low-dispersion negative lens and a high-dispersion positive lens can be satisfactorily corrected. The material having a high partial dispersion is a material that satisfies $(n_g-n_F)/(n_F-n_C) \geq 0.58$, where $n_g$, $n_F$, and $n_C$ respectively represent refractive indices of a material to a g-line, an F-line, and a C-line. As an example, a material such as NBH53, TIH3, or TIH53 of OHARA INC. falls under this material. When the objective 8 is a dry objective for a microscope, it is preferable that the sixth lens be included in the intermediate lens group. In particular, it is preferable that the sixth lens be included in a meniscus lens component included in the intermediate lens group or that the sixth lens be arranged on the image side of the meniscus lens component included in the intermediate lens group. In this case, the sixth lens is arranged in an area in which a marginal ray height is relatively great, and therefore compensation for chromatic aberration of a g-line that has been excessively corrected as described above and correction of field curvature can be performed simultaneously.

Conditions satisfied by the objective 8 are described below.

When the objective 8 is a dry objective, the objective 8 is configured so as to satisfy conditional expression (4) to conditional expression (7) described below.

$$0.8 \leq NA < 1 \quad (4)$$

$$1.6 \leq f_{G1}/f \leq 6 \quad (5)$$

$$-1.6 \leq r_{11}/f \leq -0.2 \quad (6)$$

$$-2 \leq r_{12}/d_{o12} \leq -0.86 \quad (7)$$

When the objective 8 is an immersion type objective, the objective 8 is configured so as to satisfy conditional expression (8) to conditional expression (10) described below.

$$0.8 \leq NA \leq 1.5 \quad (8)$$

$$2.3 \leq f_{G1}/f \leq 8 \quad (9)$$

$$-1.5 \leq r_{12}/d_{o12} \leq -0.75 \quad (10)$$

In these conditional expressions, NA represents a numerical aperture of the objective 8. f represents a focal length of the objective 8. $f_{G1}$ represents a focal length of the first lens group. $r_{11}$ represents a radius of curvature of a lens surface on the object side of the first lens. $r_{12}$ represents a radius of curvature of a lens surface on the image side of the first lens. $d_{o12}$ represents a distance on the optical axis from a front-side focal plane (namely, an object surface) of the objective 8 to a lens surface on the image side of the first lens.

Conditional expression (4) and conditional expression (8) are conditional expressions required to obtain sufficient resolving power. By NA being not less than lower limit values of conditional expression (4) and conditional expression (8), an Airy disk diameter can be reduced sufficiently, and therefore sufficient resolving power can be obtained. When the objective 8 is a dry objective, NA does not exceed 1. When the objective 8 is an immersion type objective, a spread angle of a marginal ray incident on the objective 8 does not increase excessively by NA not being greater than an upper limit value of conditional expression (8), and therefore performance deterioration primarily due to comatic aberration can be suppressed. Accordingly, sufficient resolving power can be obtained.

Conditional expression (5) and conditional expression (9) are conditional expressions to satisfactorily correct primarily comatic aberration. By $f_{G1}/f$ not being less than a lower limit value of a conditional expression according to the type of an objective (a dry objective or an immersion type objective) (here, conditional expression (5) or conditional expression (9)), a focal length of the first lens group does not decrease excessively. This can also prevent a focal length of each of the lenses that configures the first lens group from decreasing excessively. As a result, the generation of comatic aberration in the first lens group can be reduced, and comatic aberration of the entirety of the objective 8 can be satisfactorily corrected. By $f_{G1}/f$ not being greater than an upper limit value of the conditional expression, a focal length of the first lens group does not increase excessively, and therefore an excessive increase in an off-axis marginal ray height in the second lens group can be avoided. Accordingly, the generation of comatic aberration in the second lens group can be reduced, and comatic aberration of the entirety of an objective can be satisfactorily corrected. When conditional expression (5) and conditional expression (9) are compared, upper limit values and lower limit values are different from each other. This results from a smaller convergence (spreading suppression) action of a pencil of light in the first lens group of an immersion type objective, compared with a dry objective, because, in the immersion type objective, a lens surface closest to the object is in contact with immersion liquid.

Conditional expression (6) is a conditional expression to satisfactorily correct primarily field curvature, spherical aberration, and comatic aberration. By $r_{11}/f$ not being less than a lower limit value of conditional expression (6), a radius of curvature of a concave surface that is a lens surface on the objective side of the first lens does not excessively increase. Therefore, a correction amount of the Petzval sum in a positive direction does not excessively decrease, and field curvature can be satisfactorily corrected. In addition, incident angles and refraction angles of on-axis and off-axis marginal rays to a lens surface do not excessively increase, and therefore spherical aberration and comatic aberration can be satisfactorily corrected. By $r_{11}/f$ not being greater than an upper limit value of conditional expression (6), a radius of curvature of a concave surface that is a lens surface on the object side of the first lens does not excessively decrease. Therefore, spreading of on-axis and off-axis pencils of light can be suppressed sufficiently, and the generation of spherical aberration and comatic aberration can be reduced on a lens surface on the image side of the first lens and in an optical system closer to the image plane than the first lens.

Conditional expression (7) and conditional expression (10) are conditional expressions to satisfactorily correct primarily spherical aberration and comatic aberration. By $r_{12}/d_{o12}$ not being less than a lower limit value of a conditional expression according to the type of an objective (a dry objective or an immersion type objective) (here, conditional expression (7) or conditional expression (10)), a radius of curvature of a convex surface that is a lens surface on the image side of the first lens does not increase excessively. Therefore, spreading of on-axis and off-axis pencils of light can be suppressed sufficiently, and the generation of spherical aberration and comatic aberration can be reduced in an optical system closer to the image plane than the first lens. By $r_{12}/d_{o12}$ not being greater than an upper limit value of the conditional expression, a radius of curvature of a convex surface that is a lens surface on the image side of the first lens does not decrease excessively. Therefore, incident angles and refraction angles of on-axis and off-axis marginal rays to a lens surface do not increase excessively, and as a result, spherical aberration and comatic aberration can be satisfactorily corrected. When conditional expression (7) and conditional expression (10) are compared, upper limit values and lower limit values are different from each other. This results from a smaller convergence (spreading suppression) action of a pencil of light on an object-side surface of the first lens in an immersion type objective than that of a dry objective, because a lens surface closest to the object side in the immersion type objective is in contact with immersion liquid.

When the objective 8 is a dry objective, it is preferable that the objective 8 satisfy conditional expression (5-1) to conditional expression (7-1) described below, instead of conditional expression (5) to conditional expression (7) described above, respectively, and it is further preferable that the objective 8 satisfy conditional expression (5-2) to conditional expression (7-2). When the objective 8 is an immersion type objective, it is preferable that the objective 8 satisfy conditional expression (9-1) and conditional expression (10-1) described below, instead of conditional expression (9) and conditional expression (10) described above, respectively, and it is further preferable that the objective satisfy conditional expression (9-2) and conditional expression (10-2).

$$1.9 \leq f_{G1}/f \leq 4.5 \tag{5-1}$$

$$2.1 \leq f_{G1}/f \leq 3.5 \tag{5-2}$$

$$-1.53 \leq r_{11}/f \leq -0.6 \tag{6-1}$$

$$-1.46 \leq r_{11}/f \leq -1 \tag{6-2}$$

$$-1.75 \leq r_{12}/d_{o12} \leq -0.95 \tag{7-1}$$

$$-1.5 \leq r_{12}/d_{o12} \leq -1.05 \tag{7-2}$$

$$2.55 \leq f_{G1}/f \leq 6 \tag{9-1}$$

$$2.8 \leq f_{G1}/f \leq 4 \tag{9-2}$$

$$-1.3 \leq r_{12}/d_{o12} \leq -0.8 \tag{10-1}$$

$$-1.1 \leq r_{12}/d_{o12} \leq -0.9 \tag{10-2}$$

Conditions that the objective 8 preferably satisfies are described below.

It is preferable that the objective 8 satisfy conditional expression (11) to conditional expression (14) described below.

$$0.2 \leq D_{ogF}/D_{oL} \leq 0.87 \tag{11}$$

$$-0.3 \leq f/f_{G3O} \leq 0.3 \tag{12}$$

$$0.05 \leq f_{G1}/f_{L2} \leq 0.6 \tag{13}$$

$$0.03 \leq f_{G1}/f_{L3} \leq 0.5 \tag{14}$$

In these conditional expressions, $D_{ogF}$ represents a distance on the optical axis from a front-side focal plane (an object surface) of the objective 8 to a lens surface on the image side of the sixth lens. $D_{oL}$ represents a distance on the optical axis from a front focal plane (an object surface) of the objective 8 to a lens surface closest to the image plane of the objective 8. $f_{G3O}$ represents a focal length of a front lens group. $f_{L2}$ represents a focal length of the second lens. $f_{L3}$ represents a focal length of the third lens component.

Conditional expression (11) is a conditional expression relating to a position of the sixth lens in the objective 8. By $D_{ogF}/D_{oL}$ satisfying conditional expression (11), the sixth lens can be arranged in an area in which a marginal ray height is great. Therefore, excessive correction of on-axis chromatic aberration of a g-line can be efficiently compensated for. In particular, by $D_{ogF}/D_{oL}$ not being greater than an upper limit value of conditional expression (11), the sixth lens can be arranged in an area in which an off-axis principal ray height is small. Therefore, chromatic aberration of magnification of a g-line can be prevented from being excessively corrected.

Conditional expression (12) is a conditional expression relating to a focal length of a rear lens group. By $f/f_{G3O}$ not being greater than an upper limit value of conditional expression (12), a convergence action of the rear lens group does not excessively increase. Therefore, a marginal ray can gradually pass through the rear lens group without being suddenly refracted. As a result, on-axis chromatic aberration can be effectively corrected while the generation of comatic aberration and spherical aberration is reduced. By $f/f_{G3O}$ not being less than a lower limit value of condition expression (12), a divergence action in the rear lens group does not excessively increase, and a marginal ray height can be sufficiently reduced within the rear lens group and in an optical system closer to the image plane than the rear lens group.

Conditional expression (13) is a conditional expression to satisfactorily correct primarily comatic aberration and spherical aberration. By $f_{G1}/f_{L2}$ not being greater than an upper limit value of conditional expression (13), a focal length of the second lens does not excessively decrease. Therefore, divergence (spreading) of a pencil of light can be gradually suppressed while the generation of spherical aberration and comatic aberration is reduced. By $f_{G1}/f_{L2}$ not being less than a lower limit value of conditional expression (13), a focal length of the second lens does not excessively increase. Therefore, the first lens group can have prescribed refractive power without an excessive increase in refractive power of other positive lenses that configure the first lens group. Therefore, in the first lens group, divergence (spreading) of a pencil of light can be gradually suppressed while the generation of spherical aberration and comatic aberration is reduced.

Conditional expression (14) is a conditional expression to satisfactorily correct primarily comatic aberration and spherical aberration. By $f_{G1}/f_{L3}$ not being greater than an upper limit value of conditional expression (14), a focal length of the third lens component does not excessively decrease. Therefore, divergence (spreading) of a pencil of light can be gradually reduced while the generation of spherical aberration and comatic aberration is reduced. By $f_{G1}/f_{L3}$ not being less than a lower limit value of conditional expression (14), a focal length of the third lens component does not excessively increase. The first lens group can have prescribed refractive power without an excessive increase in refractive power of other positive lenses that configure the first lens group. Therefore, in the first lens group, divergence (spreading) of a pencil of light can be gradually suppressed while the generation of spherical aberration and comatic aberration is reduced.

It is preferable that the objective 8 satisfy conditional expression (11-1) to conditional expression (14-1) described below, instead of conditional expression (11) to conditional expression (14) described above, respectively, and it is further preferable that the objective 8 satisfy conditional expression (11-2) to conditional expression (14-2).

$$0.3 \leq D_{ogF}/D_{oL} \leq 0.83 \quad (11\text{-}1)$$

$$0.38 \leq D_{ogF}/D_{oL} \leq 0.75 \quad (11\text{-}2)$$

$$-0.25 \leq f/f_{G3O} \leq 0.2 \quad (12\text{-}1)$$

$$-0.2 \leq f/f_{G3C} \leq 0.11 \quad (12\text{-}2)$$

$$0.1 \leq f_{G1}/f_{L2} \leq 0.5 \quad (13\text{-}1)$$

$$0.15 \leq f_{G1}/f_{L2} \leq 0.4 \quad (13\text{-}2)$$

$$0.05 \leq f_{G1}/f_{L3} \leq 0.4 \quad (14\text{-}1)$$

$$0.07 \leq f_{G1}/f_{L3} \leq 0.3 \quad (14\text{-}2)$$

When the objective 8 is a dry objective, it is preferable that the objective 8 satisfy conditional expression (15) and conditional expression (16) described below.

$$-10 \leq f_{G3I}/f \leq -1.5 \quad (15)$$

$$0.8 \leq r_{21}/r_{12} \leq 2 \quad (16)$$

In these conditional expressions, $f_{G3I}$ represents a focal length of the rear lens group. $r_{12}$ represents a radius of curvature of a lens surface on the image side of the first lens. $r_{21}$ represents a radius of curvature of a lens surface on the object side of the second lens.

Conditional expression (15) is a conditional expression to satisfactorily correct primarily field curvature. Considering that light from the rear lend group is parallel light, by $f_{G3I}/f$ not being less than a lower limit value of conditional expression (15), a marginal ray height in the rear lens group can be sufficiently reduced, compared with a lens group closer to the object than the rear lens group. In addition, the rear lens group can have sufficient negative refractive power, and therefore a correction amount of the Petzval sum in a positive direction does not excessively decrease, and field curvature can be satisfactorily corrected. By $f_{G3I}/f$ not being greater than an upper limit value of conditional expression (15), negative refractive power of the rear lens group does not excessively increase, and a marginal ray height does not excessively increase in a lens group closer to the object than the rear lens group. Therefore, the generation of comatic aberration and spherical aberration can be reduced.

Conditional expression (16) is a conditional expression to satisfactorily correct primarily spherical aberration and comatic aberration. By $r_{21}/r_{12}$ not being greater than an upper limit value of conditional expression (16), a radius of curvature of a concave surface that is a lens surface on the object side of the second lens does not excessively increase. Therefore, incident angles and refraction angles of on-axis and off-axis marginal rays to the lens surface do not excessively increase, and spherical aberration and comatic aberration can be satisfactorily corrected. By $r_{21}/r_{12}$ not being less than a lower limit value of conditional expression (16), a radius of curvature of a concave surface that is a lens surface on the object side of the second lens does not excessively decrease. Therefore, divergence (spreading) of on-axis and off-axis pencils of light can be sufficiently suppressed.

It is preferable that the objective 8 satisfy conditional expression (15-1) and conditional expression (16-1) described below, instead of conditional expression (15) and conditional expression (16) described above, respectively, and it is further preferable that the objective 8 satisfy conditional expression (15-2) and conditional expression (16-2).

$$-7.5 \leq f_{G3I}/f \leq -2 \quad (15\text{-}1)$$

$$-5 \leq f_{G3I}/f \leq -2.5 \quad (15\text{-}2)$$

$$1 \leq r_{21}/r_{12} \leq 1.7 \quad (16\text{-}1)$$

$$1.2 \leq r_{21}/r_{12} \leq 1.4 \quad (16\text{-}2)$$

When the objective 8 is a dry objective, an arbitrary combination of conditional expression (11) to conditional expression (16) may be adopted for an objective that satisfies conditional expressions (4) to (7). When the objective 8 is an immersion type objective, an arbitrary combination of conditional expression (11) to conditional expression (14) may be adopted for an objective that satisfies conditional expressions (8) to (10). Respective expressions may be limited merely by one of an upper limit value and a lower limit value.

The objective 8 can realize a microscope objective having a wide field of view and a high numerical aperture with aberration satisfactorily corrected. Examples of the objective 8 above are described below in detail. Example 1 to Example 5 describe a dry objective, and Example 6 and examples that follow describe an immersion type objective.

EXAMPLE 1

FIG. 2 is a sectional view of an objective 11 in this example. The objective 11 illustrated in FIG. 2 is a dry objective for a microscope. The objective 11 is configured of the first lens group G1 with positive refractive power, the second lens group G2 with positive refractive power including a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a cemented lens CL1 that is configured of a meniscus lens L1 (the first lens) with negative refractive power with a concave surface facing the object side and a meniscus lens L2 (the second lens) with positive refractive power with a concave surface facing the object side, a cemented lens CL2 (the third lens component) that is configured of a meniscus lens L3 with negative refractive power with a concave surface facing the object side and a meniscus lens L4 with positive refractive power with a concave surface facing the object side, and a cemented lens CL3 (the seventh lens component) that is configured of a meniscus lens L5 with negative refractive power with a concave surface facing the object side and a meniscus lens L6 with positive refractive power with a concave surface facing the object side, in order from the object side.

The second lens group G2 is configured of a three-lens-cemented lens CL4 that is configured of a biconvex lens L7, a biconcave lens L8, and a biconvex lens L9, and a cemented lens CL5 that is configured of a meniscus lens L10 with negative refractive power with a concave surface facing the image side and a biconvex lens L11, in order from the object side.

The third lens group G3 is configured of the 3o-th lens group (the front lens group), the 3c-th lens group (the intermediate lens group), and the 3i-th lens group (the rear lens group), in order from the object side. The 3o-th lens group is configured of a meniscus lens L12 with negative refractive power with a concave surface facing the image side, a biconvex lens L13 (the eighth lens), and a meniscus lens L14 (the ninth lens) with negative refractive power with a concave surface facing the object side, in order from the object side. The 3c-th lens group is configured of a cemented lens CL6 (the tenth lens component) that is configured of a meniscus lens L15 with negative refractive power with a concave surface facing the object side and a meniscus lens L16 (the sixth lens; NBH53 of OHARA INC.) with positive refractive power with a concave surface facing the object side, and a biconvex lens L17, in order from the object side. The 3i-th lens group is configured of a meniscus lens L18 with negative refractive power with a concave surface facing the image side, and a cemented lens CL7 that is configured of a meniscus lens L19 with negative refractive power with a concave surface facing the object side and a meniscus lens L20 with positive refractive power with a concave surface facing the object side, in order from the object side.

Various pieces of data of the objective 11 are described below. The d-line (587.56 nm) is used for a reference wavelength. $f_{G2}$ represents a focal length of the second lens group G2, and $f_{L7}$ represents a focal length of the seventh lens component. E represents a power of 10.

NA=0.85, FN=30 mm, $|\beta|$=20, $\epsilon$=8.43E−04 mm, f=9 mm, $f_{G1}$=30.11 mm, $r_{11}$=−12.2481 mm, $r_{12}$=−17.8211 mm, $d_{o12}$=12.182 mm, $\Phi_{max}/2$=19.05 mm, $h_{exp}$=7.65 mm, $f_{G3O}$=−196.64 mm, $f_{G3I}$=−30.23 mm, $r_{21}$=−17.8211 mm, $D_{oL}$=133.000 mm, $D_{ogF}$=90.312 mm, $f_{L2}$=196.11 mm, $f_{L3}$=66.55 mm Lens data of the objective 11 is described below. "INF" in the lens data represents infinity ($\infty$).

Objective 11

| s | r | d | nd | vd | er |
|---|---|---|---|---|---|
| s1(object surface) | INF | 0.150 | 1.52100 | 56.02 | 0.75 |
| s2 | INF | 1.942 | | | 0.85 |
| s3 | −12.2481 | 10.090 | 1.88300 | 40.76 | 3.39 |
| s4 | −17.8211 | 4.612 | 1.60300 | 65.44 | 9.46 |
| s5 | −16.9951 | 0.100 | | | 11.64 |
| s6 | −23.7081 | 1.043 | 1.63779 | 42.41 | 12.48 |
| s7 | −28.2010 | 5.361 | 1.60300 | 65.44 | 13.32 |
| s8 | −16.3520 | 0.100 | | | 13.94 |
| s9 | −40.7739 | 0.838 | 1.63779 | 42.41 | 15.49 |
| s10 | −55.9945 | 4.018 | 1.49702 | 81.54 | 16.04 |
| s11 | −28.6925 | 0.100 | | | 16.46 |
| s12 | 35.2415 | 14.308 | 1.43876 | 94.93 | 18.69 |
| s13 | −30.8526 | 1.500 | 1.63779 | 42.41 | 18.54 |
| s14 | 72.9560 | 8.018 | 1.43876 | 94.93 | 18.97 |
| s15 | −42.3220 | 0.100 | | | 19.05 |
| s16 | 50.1825 | 1.300 | 1.63779 | 42.41 | 18.26 |
| s17 | 20.2794 | 11.485 | 1.43876 | 94.93 | 16.84 |
| s18 | −94.5855 | 0.200 | | | 16.77 |
| s19 | 101.8945 | 1.000 | 1.63779 | 42.41 | 16.26 |
| s20 | 33.4896 | 0.100 | | | 15.67 |
| s21 | 30.4321 | 7.731 | 1.43876 | 94.93 | 15.70 |
| s22 | −50.4634 | 0.624 | | | 15.62 |
| s23 | −42.0010 | 1.000 | 1.67305 | 38.15 | 15.59 |
| s24 | −1706.2591 | 5.818 | | | 15.61 |
| s25 | −23.7887 | 1.891 | 1.48751 | 70.23 | 15.61 |
| s26 | −162.4849 | 6.884 | 1.73806 | 32.26 | 17.41 |
| s27 | −31.7625 | 4.144 | | | 17.95 |
| s28 | 74.7972 | 5.430 | 1.63779 | 42.41 | 17.18 |
| s29 | −199.8224 | 25.089 | | | 16.83 |
| s30 | 290.9229 | 1.000 | 1.49702 | 81.54 | 9.57 |
| s31 | 34.8878 | 5.025 | | | 9.16 |
| s32 | −15.6607 | 1.000 | 1.49702 | 81.54 | 9.02 |
| s33 | −663.5991 | 1.000 | 1.63779 | 42.41 | 9.51 |
| s34 | −53.4597 | −23.576 | | | 9.54 |

Here, s represents a surface number, r represents a radius of curvature (mm), d represents a surface spacing (mm), nd represents a refractive index to the d-line, vd represents an Abbe number, and er represents an effective radius (mm). These symbols are similar in the following examples. Surfaces represented by surface numbers s1 and s2 are respectively an object surface (a surface on the object side of a cover glass) and a surface on the image side of the cover glass, and surfaces represented by surface numbers s3 and s34 are respectively a lens surface closest to the object and a lens surface closest to the image plane in an objective. As an example, surface spacing d1 represents a distance from a surface represented by surface number s1 to a surface represented by surface number s2. A last value of a surface spacing represents a distance from a lens surface closest to the image plane in an objective to an exit pupil position. A minus value represents that an exit pupil position is located closer to the object than a lens surface closest to the image plane in an objective.

The objective 11 satisfies conditional expressions (1) to (7) and (11) to (16), as described below. A field number FN and a magnification β are values in a case in which the objective 11 is used in combination with the tube lens 10. This point is similar in all of Example 1 to Example 11.

$$NA=0.85 \quad (1), (4):$$

$$FN/|\beta|/\epsilon=1780 \quad (2):$$

$$\Phi_{max}/2/h_{exp}/NA=2.93 \quad (3):$$

$$f_{G1}/f=3.35 \quad (5):$$

$$r_{11}/f=-1.36 \quad (6):$$

$$r_{12}/d_{o12}=-1.46 \quad (7):$$

$$D_{ogF}/D_{oL}=0.68 \quad (11):$$

$$f/f_{G3O}=-0.05 \quad (12):$$

$$f_{G1}/f_{L2}=0.15 \quad (13):$$

$$f_{G1}/f_{L3}=0.45 \quad (14):$$

$$f_{G3I}/f=-3.36 \quad (15):$$

$$r_{21}/r_{12}=1.00 \quad (16):$$

Figure 3:
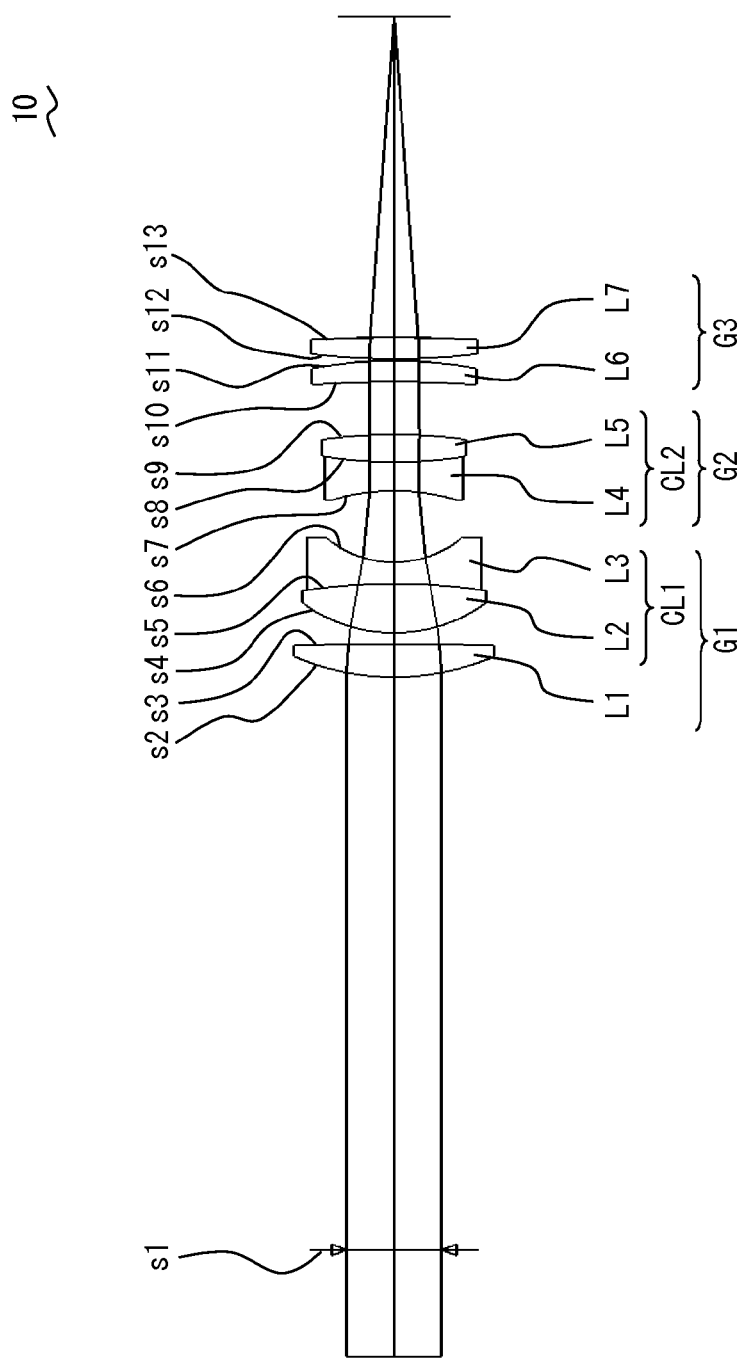
FIG. 3 is a sectional view of a tube lens used in combination with an objective.
Figure 4:
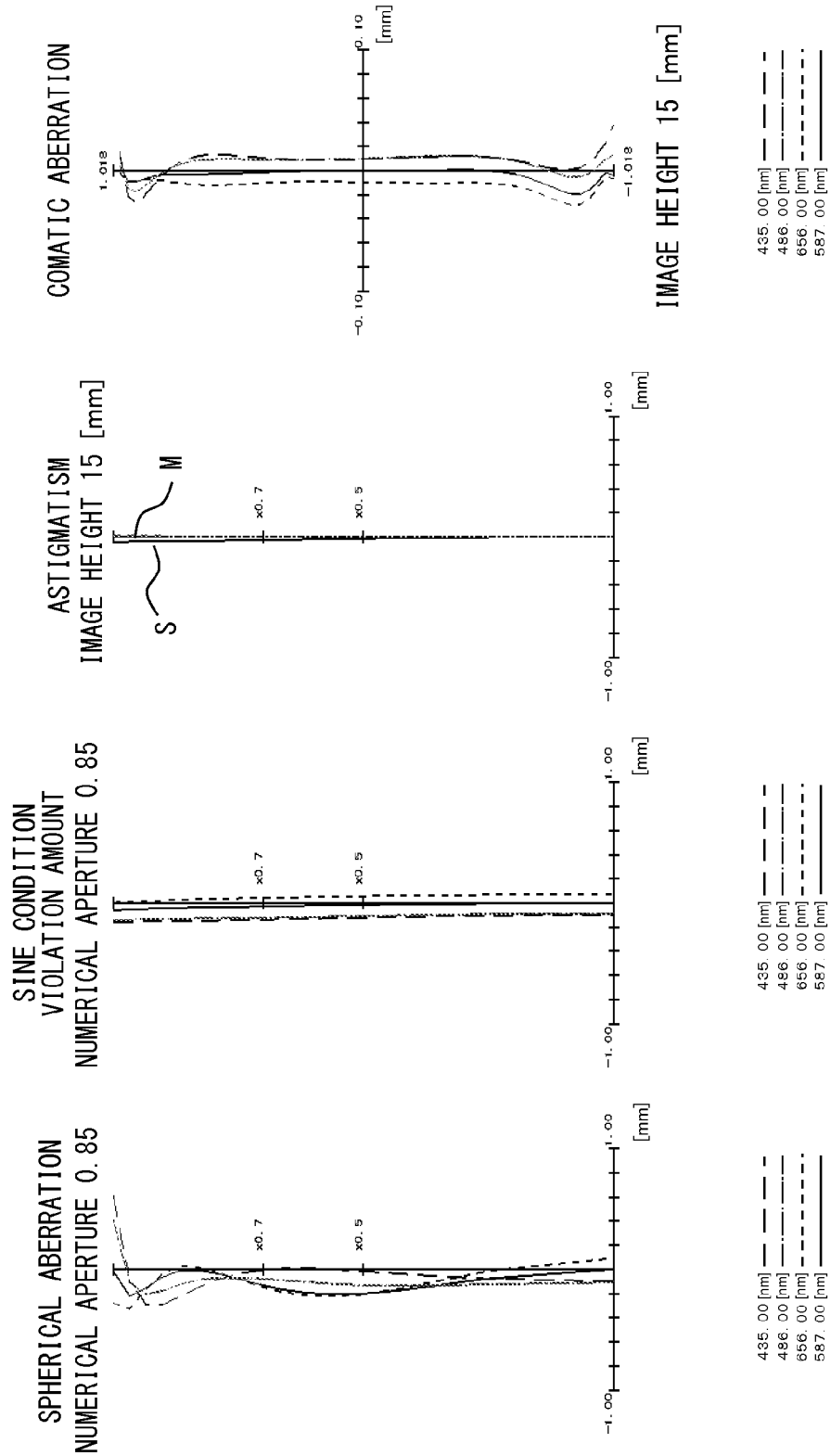
FIG. 4A to FIG. 4D are aberration diagrams in a case in which a combination of an objective illustrated in FIG. 2 and a tube lens illustrated in FIG. 3 is used, and respectively illustrate spherical aberration, a sine condition violation amount, astigmatism, and comatic aberration.

FIG. 3 is a sectional view of the tube lens 10 used in combination with the objective 11. FIG. 4A to FIG. 4D are aberration diagrams in a case in which a combination of the objective 11 and the tube lens 10 illustrated in FIG. 3 is used. FIG. 4A illustrates spherical aberration, FIG. 4B illustrates a sine condition violation amount, FIG. 4C illustrates astigmatism, and FIG. 4D illustrates comatic aberration. In these diagrams, "M" represents a meridional component, and "S" represents a sagittal component. Respective aberration diagrams including diagrams in Example 2 and examples that follow illustrate aberration that is output when the first surface s1 of the tube lens 10 is made to coincide with an exit pupil position of an objective. A configuration of the tube lens 10 illustrated in FIG. 3 is described later.

EXAMPLE 2

Figure 5:
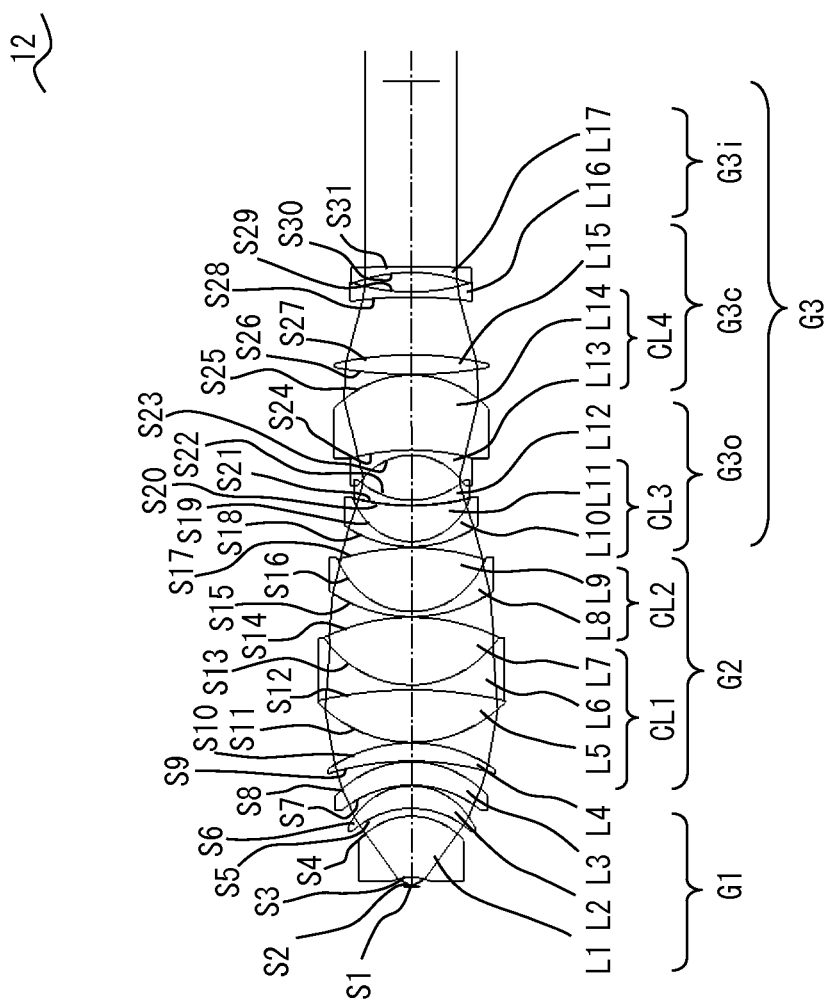
FIG. 5 is a sectional view of an objective in Example 2 of the present invention.

FIG. 5 is a sectional view of an objective 12 in this example. The objective 12 illustrated in FIG. 5 is a dry objective for a microscope. The objective 12 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a meniscus lens L1 (the first lens) with negative refractive power with a concave surface facing the object side, a meniscus lens L2 (the second lens) with positive refractive power with a concave surface facing the object side, a meniscus lens L3 (the third lens component) with positive refractive power with a concave surface facing the object side, and a meniscus lens L4 (the seventh lens component) with positive refractive power with a concave surface facing the object side, in order from the object side.

The second lens group G2 is configured of a three-lens-cemented lens CL1 that is configured of a biconvex lens L5, a biconcave lens L6, and a biconvex lens L7, and a cemented lens CL2 that is configured of a meniscus lens L8 with negative refractive power with a concave surface facing the image side and a biconvex lens L9, in order from the object side.

The third lens group G3 is configured of the 3o-th lens group (the front lens group), the 3c-th lens group (the intermediate lens group), and the 3i-th lens group (the rear lens group), in order from the object side. The 3o-th lens group is configured of a cemented lens CL 3 that is configured of a meniscus lens L10 (the ninth lens) with negative refractive power with a concave surface facing the image side and a meniscus lens L11 (the eighth lens) with positive refractive power with a concave surface facing the image side, and a meniscus lens L12 with negative refractive power with a concave surface facing the image side, in order from the object side. The 3c-th lens group is configured of a cemented lens CL4 (the tenth lens component) that is configured of a meniscus lens L13 with negative refractive power with a concave surface facing the object side and a meniscus lens L14 (the sixth lens; NBH53 of OHARA INC.) with positive refractive power with a concave surface facing the object side, and a biconvex lens L15, in order from the object side. The 3i-th lens group is configured of a biconcave lens L16, and a meniscus lens L17 with negative refractive power with a concave surface facing the object side, in order from the object side.

Various pieces of data of the objective 12 are described below. The d-line (587.56 nm) is used for a reference wavelength.

NA=0.9, FN=30 mm, |β|=20, ϵ=7.96E−04 mm, f=9 mm, $f_{G1}$=19.422 mm, $r_{11}$=−9.8587 mm, $r_{12}$=−13.0211 mm, $d_{o12}$=11.431 mm, $\Phi_{max}/2$=16.15 mm, $h_{exp}$=8.10 mm, $f_{G3O}$=−52.9824 mm, $f_{G3I}$=−29.147 mm, $r_{21}$=−16.8701 mm, $D_{oL}$=100.382 mm, $D_{ogF}$=82.791 mm, $f_{L2}$=57.08 mm, $f_{L3}$=238.45 mm Lens data of the objective 12 is described below.

| Objective 12 | | | | | |
|---|---|---|---|---|---|
| s | r | d | nd | vd | er |
| s1(object surface) | INF | 0.150 | 1.52100 | 56.02 | 0.75 |
| s2 | INF | 1.390 | | | 0.86 |
| s3 | −9.8587 | 9.891 | 1.88300 | 40.76 | 2.93 |
| s4 | −13.0211 | 1.258 | | | 8.83 |
| s5 | −16.8701 | 3.652 | 1.67790 | 55.34 | 9.99 |
| s6 | −12.7760 | 0.100 | | | 10.77 |
| s7 | −20.8962 | 3.754 | 1.60300 | 65.44 | 11.78 |
| s8 | −19.4778 | 0.100 | | | 13.02 |
| s9 | −55.3230 | 2.940 | 1.49700 | 81.54 | 14.08 |
| s10 | −28.0702 | 0.100 | | | 14.33 |
| s11 | 24.5700 | 8.491 | 1.43875 | 94.93 | 16.06 |
| s12 | −80.5777 | 0.800 | 1.63775 | 42.41 | 15.92 |
| s13 | 19.5830 | 10.948 | 1.43875 | 94.93 | 14.97 |
| s14 | −38.5327 | 0.100 | | | 15.01 |
| s15 | 27.6315 | 0.800 | 1.63775 | 42.41 | 14.10 |
| s16 | 14.3420 | 10.337 | 1.43875 | 94.93 | 12.71 |
| s17 | −46.3046 | 0.200 | | | 12.60 |
| s18 | 22.3981 | 0.800 | 1.63775 | 42.41 | 11.38 |
| s19 | 11.2096 | 5.812 | 1.49700 | 81.54 | 9.98 |
| s20 | 45.0258 | 0.100 | | | 9.77 |
| s21 | 44.9455 | 0.800 | 1.63775 | 42.41 | 9.74 |
| s22 | 15.3887 | 7.272 | | | 9.03 |
| s23 | −11.7080 | 0.800 | 1.48749 | 70.23 | 9.03 |

-continued

Objective 12

| s | r | d | nd | vd | er |
|---|---|---|----|----|-----|
| s24 | −45.2675 | 12.197 | 1.73800 | 32.26 | 10.38 |
| s25 | −20.2331 | 0.100 | | | 13.21 |
| s26 | 82.3763 | 3.191 | 1.67790 | 55.34 | 13.16 |
| s27 | −65.0281 | 9.354 | | | 13.10 |
| s28 | −80.8182 | 0.800 | 1.49700 | 81.54 | 10.35 |
| s29 | 37.0824 | 3.163 | | | 9.98 |
| s30 | −31.4348 | 0.983 | 1.49700 | 81.54 | 9.96 |
| s31 | −254.1359 | −25.918 | | | 10.13 |

The objective 12 satisfies conditional expressions (1) to (7) and (11) to (16), as described below.

Figure 6:
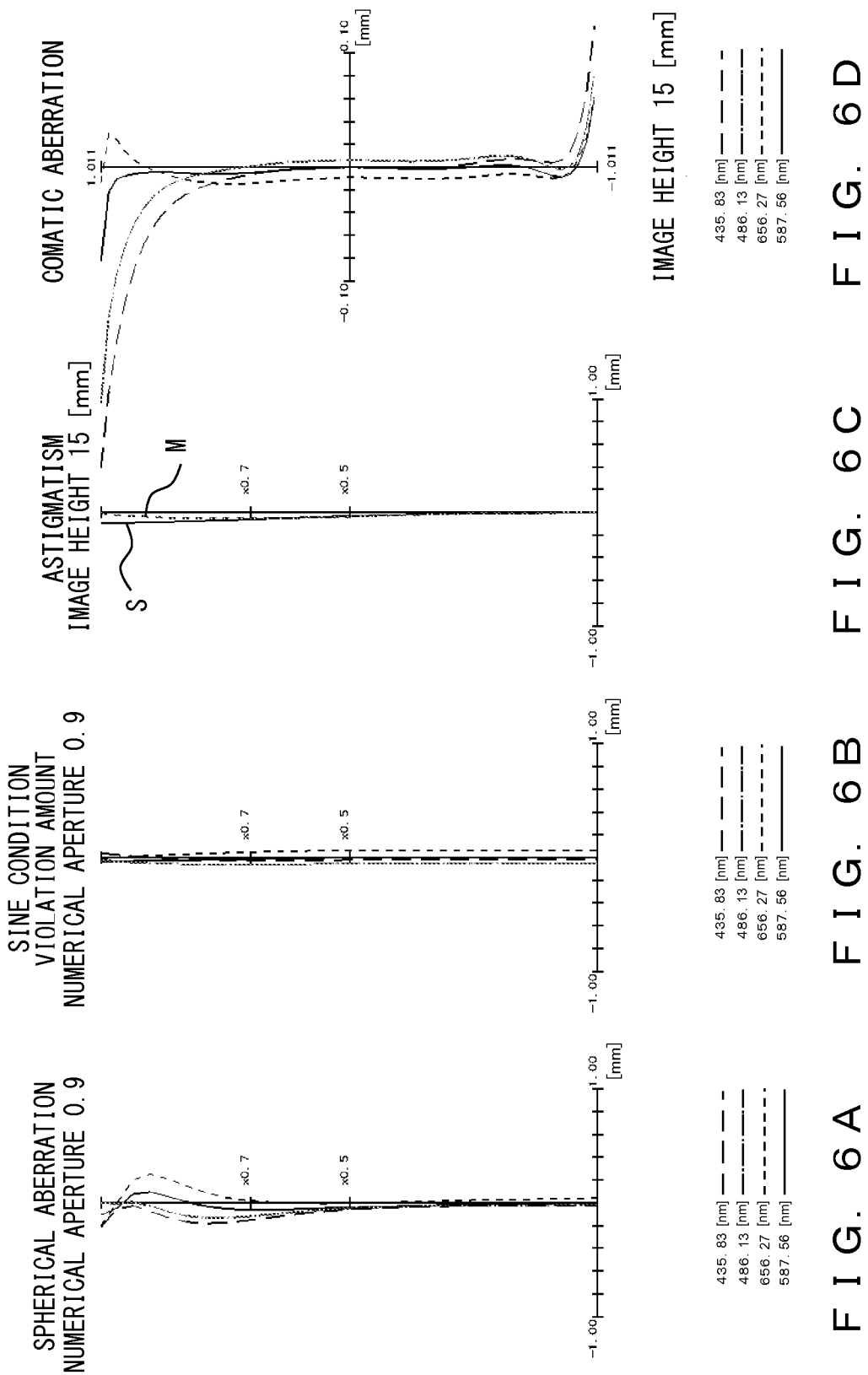
FIG. 6A to FIG. 6D are aberration diagrams in a case in which a combination of an objective illustrated in FIG. 5 and a tube lens illustrated in FIG. 3 is used, and respectively illustrate spherical aberration, a sine condition violation amount, astigmatism, and comatic aberration.

$NA=0.9$ (1), (4):

$FN/|\beta|/\epsilon=1885$ (2):

$\Phi_{max}/2 / h_{exp}/NA=2.22$ (3):

$f_{G1}/f=2.16$ (5):

$r_{11}/f=-1.10$ (6):

$r_{12}/d_{o12}=-1.14$ (7):

$D_{ogF}/D_{oL}=0.82$ (11):

$f/f_{G3O}=-0.17$ (12):

$f_{G1}/f_{L2}=0.34$ (13):

$f_{G1}/f_{L3}=0.08$ (14):

$f_{G3I}/f=-3.24$ (15):

$r_{21}/r_{12}=1.30$ (16):

FIG. 6A to FIG. 6D are aberration diagrams in a case in which a combination of the objective 12 and the tube lens 10 is used. FIG. 6A illustrates spherical aberration, FIG. 6B illustrates a sine condition violation amount, FIG. 6C illustrates astigmatism, and FIG. 6D illustrates comatic aberration.

EXAMPLE 3

Figure 7:
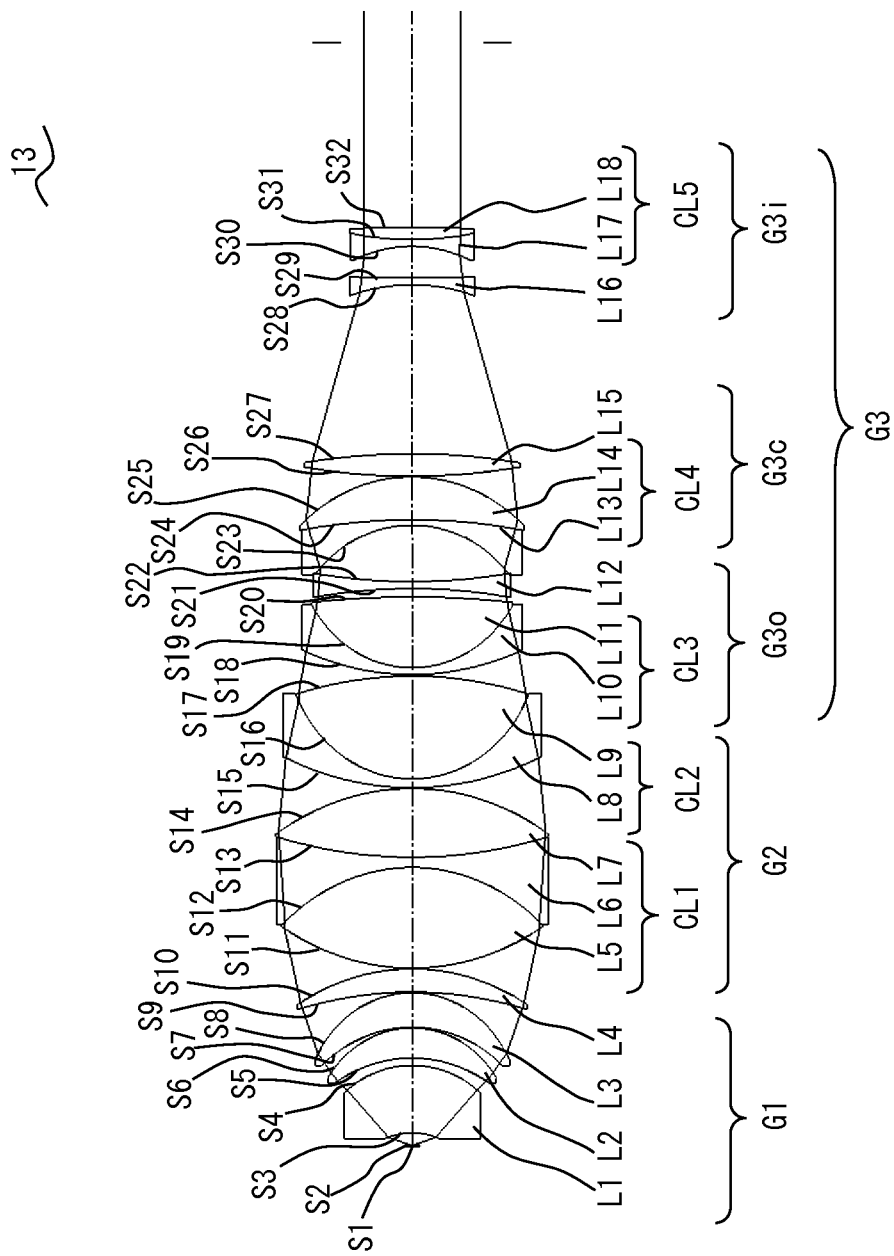
FIG. 7 is a sectional view of an objective in Example 3 of the present invention.

FIG. 7 is a sectional view of an objective 13 in this example. The objective 13 illustrated in FIG. 7 is a dry objective for a microscope. The objective 13 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a meniscus lens L1 (the first lens) with negative refractive power with a concave surface facing the object side, a meniscus lens L2 (the second lens) with positive refractive power with a concave surface facing the object side, a meniscus lens L3 (the third lens component) with positive refractive power with a concave surface facing the object side, and a meniscus lens L4 (the seventh lens component) with positive refractive power with a concave surface facing the object side, in order from the object side.

The second lens group G2 is configured of a three-lens-cemented lens CL1 that is configured of a biconvex lens L5, a biconcave lens L6, and a biconvex lens L7, and a cemented lens CL2 that is configured of a meniscus lens L8 with negative refractive power with a concave surface facing the image side and a biconvex lens L9, in order from the object side.

The third lens group G3 is configured of the 3o-th lens group (the front lens group), the 3c-th lens group (the intermediate lens group), and the 3i-th lens group (the rear lens group), in order from the object side. The 3o-th lens group is configured of a cemented lens CL3 that is configured of a meniscus lens L10 (the ninth lens) with negative refractive power with a concave surface facing the image side and a biconvex lens L11 (the eighth lens), and a biconcave lens L12, in order from the object side. The 3c-th lens group is configured of a cemented lens CL 4 (the tenth lens component) that is configured of a meniscus lens L13 with negative refractive power with a concave surface facing the object side and a meniscus lens L14 (the sixth lens; NBH53 of OHARA INC.) with positive refractive power with a concave surface facing the object side, and a biconvex lens L15, in order from the object side. The 3i-th lens group is configured of a biconcave lens L16, and a cemented lens CL5 that is configured of a biconcave lens L17 and a biconvex lens L18, in order from the object side.

Various pieces of data of the objective 13 are described below. The d-line (587.56 nm) is used for a reference wavelength.

$NA=0.95$, $FN=30$ mm, $|\beta|=20$, $\epsilon=7.54E-04$ mm, $f=9$ mm, $f_{G1}=27.3$ mm, $r_{11}=-13.0828$ mm, $r_{12}=-18.6447$ mm, $d_{o12}=13.101$ mm, $\Phi_{max}/2=23.948$ mm, $h_{exp}=8.55$ mm, $f_{G2}=54.7$ mm, $f_{G3O}=-159.94$ mm, $f_{G3C}=65.94$ mm, $f_{G3I}=-31.75$ mm, $r_{21}=-25.0446$ mm, $D_{oL}=148.679$ mm, $D_{ogF}=108.374$ mm, $f_{L2}=82.66$ mm, $f_{L3}=109.35$ mm, $f_{L7}=156.84$ mm Lens data of the objective 13 is described below.

Objective 13

| s | r | d | nd | vd | er |
|---|---|---|----|----|-----|
| s1(object surface) | INF | 0.150 | 1.52100 | 56.02 | 0.75 |
| s2 | INF | 2.027 | | | 0.87 |
| s3 | −13.0828 | 10.924 | 1.88300 | 40.76 | 4.37 |
| s4 | −18.6447 | 1.191 | | | 11.63 |
| s5 | −25.0446 | 4.866 | 1.60300 | 65.44 | 13.27 |
| s6 | −17.8874 | 0.110 | | | 14.45 |
| s7 | −23.8656 | 5.582 | 1.60300 | 65.44 | 15.60 |
| s8 | −19.0650 | 0.110 | | | 16.72 |
| s9 | −74.2737 | 3.752 | 1.49700 | 81.54 | 19.54 |
| s10 | −38.6719 | 0.110 | | | 19.84 |
| s11 | 43.0902 | 16.297 | 1.43875 | 94.93 | 22.60 |
| s12 | −33.2088 | 1.650 | 1.63775 | 42.41 | 22.55 |
| s13 | 89.2116 | 11.130 | 1.43875 | 94.93 | 23.56 |
| s14 | −43.0265 | 0.110 | | | 23.66 |
| s15 | 54.2247 | 1.430 | 1.63775 | 42.41 | 22.35 |
| s16 | 22.3467 | 16.663 | 1.43875 | 94.93 | 20.20 |
| s17 | −73.4579 | 0.220 | | | 20.17 |
| s18 | 49.8507 | 1.100 | 1.63775 | 42.41 | 19.05 |
| s19 | 20.7309 | 11.427 | 1.43875 | 94.93 | 17.33 |
| s20 | −180.4116 | 1.358 | | | 17.18 |
| s21 | −105.6549 | 1.100 | 1.67300 | 38.15 | 17.00 |
| s22 | 111.6317 | 9.250 | | | 16.77 |
| s23 | −22.2976 | 0.880 | 1.48749 | 70.23 | 16.77 |
| s24 | −115.6031 | 6.936 | 1.73800 | 32.26 | 19.07 |
| s25 | −28.8606 | 0.100 | | | 19.39 |
| s26 | 131.0728 | 3.590 | 1.63775 | 42.41 | 18.58 |
| s27 | −126.7311 | 27.324 | | | 18.47 |
| s28 | −35.6037 | 1.100 | 1.49700 | 81.54 | 10.57 |

-continued

Objective 13

| s | r | d | nd | vd | er |
|---|---|---|---|---|---|
| s29 | 349.2902 | 5.126 | | | 10.35 |
| s30 | −25.0136 | 1.100 | 1.49700 | 81.54 | 10.07 |
| s31 | 59.1028 | 1.965 | 1.63775 | 42.41 | 10.45 |
| s32 | −255.7418 | −28.248 | | | 10.50 |

The objective 13 satisfies conditional expressions (1) to (7) and (11) to (16), as described below.

$$NA=0.95 \quad (1), (4):$$

$$FN/|\beta|/\epsilon=1990 \quad (2):$$

$$\Phi_{max}/2/h_{exp}/NA=2.95 \quad (3):$$

$$f_{G1}/f=3.03 \quad (5):$$

$$r_{11}/f=-1.45 \quad (6):$$

$$r_{12}/d_{o12}=-1.42 \quad (7):$$

$$D_{ogF}/D_{oL}=0.73 \quad (11):$$

$$f/f_{G3O}=-0.06 \quad (12):$$

$$f_{G1}/f_{L2}=0.33 \quad (13):$$

$$f_{G1}/f_{L3}=0.25 \quad (14):$$

$$f_{G3I}/f=-3.53 \quad (15):$$

$$r_{21}/r_{12}=1.34 \quad (16):$$

Figure 8:
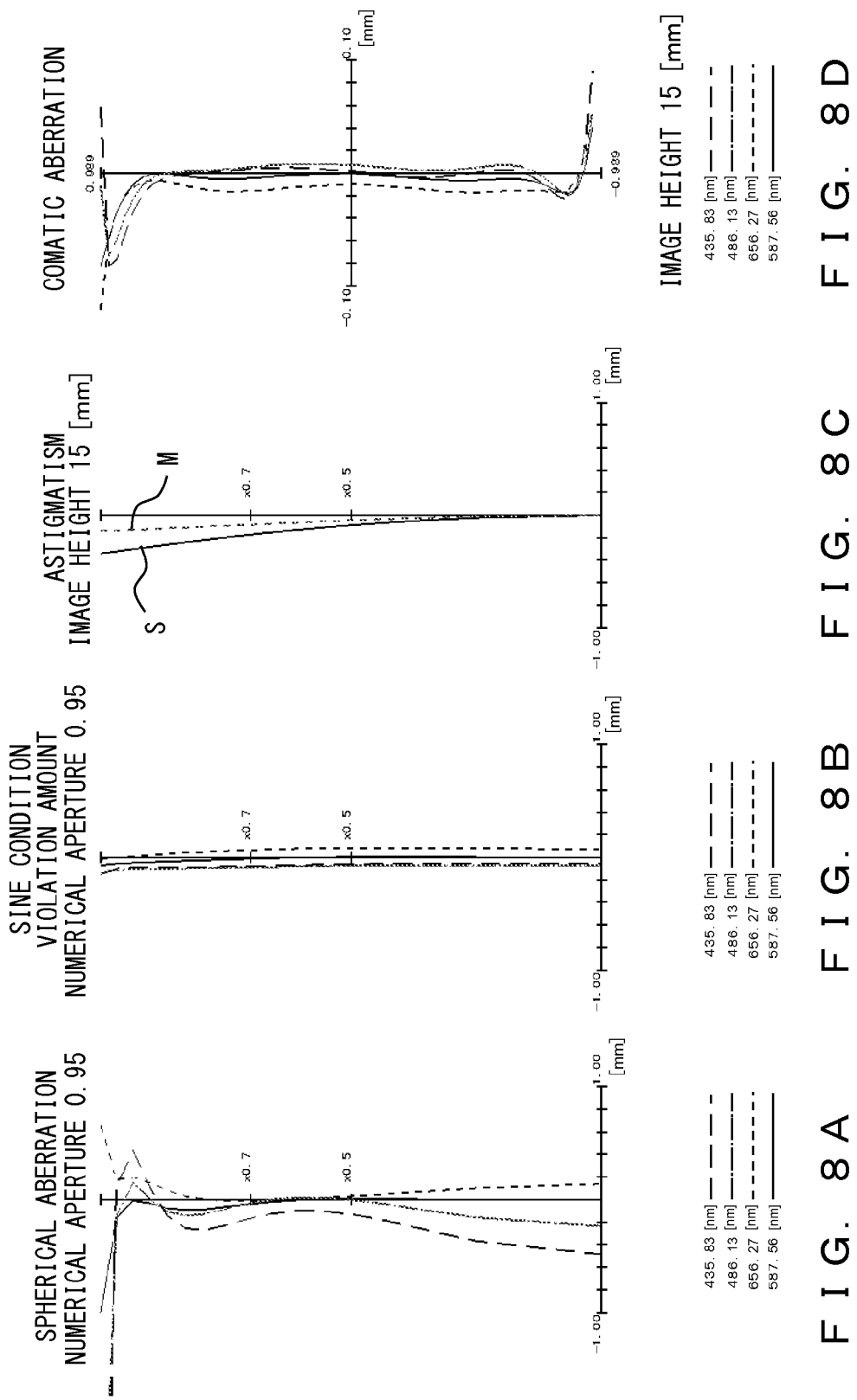
FIG. 8A to FIG. 8D are aberration diagrams in a case in which a combination of an objective illustrated in FIG. 7 and a tube lens illustrated in FIG. 3 is used, and respectively illustrate spherical aberration, a sine condition violation amount, astigmatism, and comatic aberration.

FIG. 8A to FIG. 8D are aberration diagrams in a case in which a combination of the objective 13 and the tube lens 10 is used. FIG. 8A illustrates spherical aberration, FIG. 8B illustrates a sine condition violation amount, FIG. 8C illustrates astigmatism, and FIG. 8D illustrates comatic aberration.

EXAMPLE 4

Figure 9:
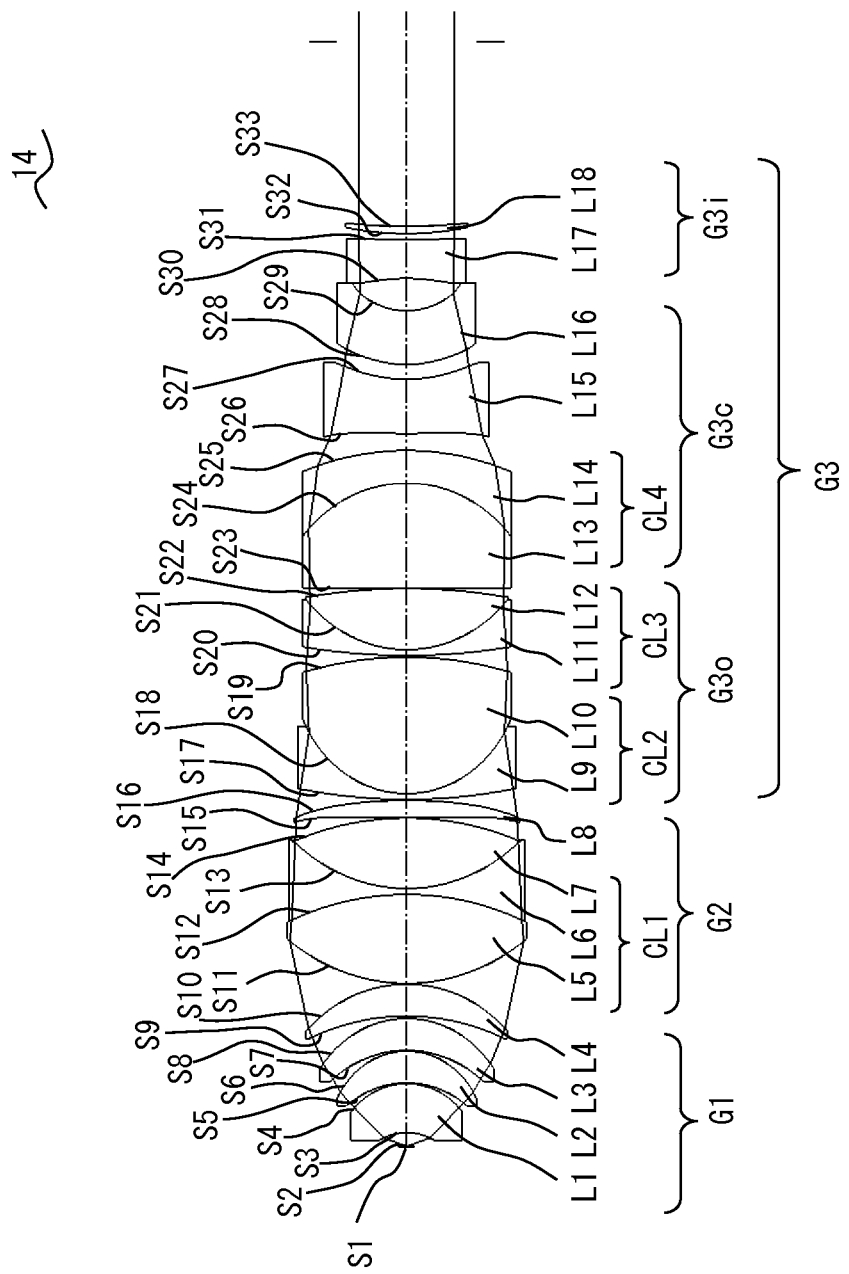
FIG. 9 is a sectional view of an objective in Example 4 of the present invention.

FIG. 9 is a sectional view of an objective 14 in this example. The objective 14 illustrated in FIG. 9 is a dry objective for a microscope. The objective 14 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a meniscus lens L1 (the first lens) with negative refractive power with a concave surface facing the object side, a meniscus lens L2 (the second lens) with positive refractive power with a concave surface facing the object side, a meniscus lens L3 (the third lens component) with positive refractive power with a concave surface facing the object side, and a meniscus lens L4 (the seventh lens component) with positive refractive power with a concave surface facing the object side, in order from the object side.

The second lens group G2 is configured of a three-lens-cemented lens CL1 that is configured of a biconvex lens L5, a biconcave lens L6, and a biconvex lens L7, and a biconvex lens L8, in order from the object side. The biconvex lens L8 is an aspherical lens for which both surfaces are formed so as to be aspherical.

The third lens group G3 is configured of the 3o-th lens group (the front lens group), the 3c-th lens group (the intermediate lens group), and the 3i-th lens group (the rear lens group), in order from the object side. The 3o-th lens group is configured of a cemented lens CL2 that is configured of a meniscus lens L9 (the ninth lens) with negative refractive power with a concave surface facing the image side and a biconvex lens L10 (the eighth lens), and a cemented lens CL3 that is configured of a meniscus lens L11 with negative refractive power with a concave surface facing the image side and a biconvex lens L12, in order from the object side. The 3c-th lens group is configured of a cemented lens CL4 that is configured of a biconvex lens L13 (the sixth lens; NBH53 of OHARA INC.) and a meniscus lens L14 with negative refractive power with a concave surface facing the object side, a meniscus lens L15 with a concave surface facing the image side, and a meniscus lens L16 with a concave surface facing the image side, in order from the object side. The 3i-th lens group is configured of a biconcave lens L17, and a meniscus lens L18 with positive refractive power with a concave surface facing the image side, in order from the object side. The meniscus lens L15, the meniscus lens L16, and the biconcave lens L17 are aspherical lenses for which both surfaces are formed so as to be aspherical.

Various pieces of data of the objective 14 are described below. The d-line (587.56 nm) is used for a reference wavelength.

NA=0.95, FN=30 mm, $|\beta|$=20, $\epsilon$=7.54E−04 mm, f=9 mm, $f_{G1}$=23.6 mm, $r_{11}$=−10.2441 mm, $r_{12}$=−13.3175 mm, $d_{o12}$=10.314 mm, $\Phi_{max}/2$=21.728 mm, $h_{exp}$=8.55 mm, $f_{G3O}$=909.357 mm, $f_{G3I}$=−81.92 mm, $r_{21}$=−17.6973 mm, $D_{oL}$=149.641 mm, $D_{ogF}$=107.876 mm, $f_{L2}$=65.24 mm, $f_{L3}$=175.06 mm Lens data of the objective 14 is described below. The mark "*" put on a surface number represents that a surface is aspherical.

Objective 14

| s | r | d | nd | vd | er |
|---|---|---|---|---|---|
| s1(object surface) | INF | 0.150 | 1.52100 | 56.02 | 0.75 |
| s2 | INF | 2.214 | | | 0.87 |
| s3 | −10.2441 | 7.950 | 1.88300 | 40.76 | 4.33 |
| s4 | −13.3175 | 0.121 | | | 9.56 |
| s5 | −17.6973 | 5.166 | 1.67790 | 55.34 | 10.43 |
| s6 | −14.1306 | 0.121 | | | 12.08 |
| s7 | −21.3714 | 5.186 | 1.56907 | 71.30 | 13.44 |
| s8 | −19.1452 | 0.396 | | | 15.16 |
| s9 | −44.1327 | 5.129 | 1.49700 | 81.54 | 17.10 |
| s10 | −25.6809 | 0.121 | | | 17.75 |
| s11 | 35.9327 | 14.463 | 1.49700 | 81.54 | 21.12 |
| s12 | −54.0221 | 0.968 | 1.63775 | 42.41 | 20.79 |
| s13 | 30.9878 | 11.469 | 1.43875 | 94.93 | 20.15 |
| s14 | −57.0147 | 0.121 | | | 20.17 |
| s15* | 762.8936 | 2.743 | 1.43875 | 94.93 | 19.93 |
| s16* | −95.8052 | 0.121 | | | 19.95 |
| s17 | 107.5081 | 0.968 | 1.67300 | 38.15 | 19.20 |
| s18 | 20.6405 | 22.188 | 1.43875 | 94.93 | 17.71 |
| s19 | −72.7389 | 0.242 | | | 18.35 |
| s20 | 124.0168 | 0.968 | 1.67300 | 38.15 | 18.27 |
| s21 | 24.4575 | 9.958 | 1.43875 | 94.93 | 17.76 |
| s22 | −117.0784 | 0.121 | | | 17.84 |
| s23 | 2449.3135 | 16.993 | 1.73800 | 32.26 | 17.93 |
| s24 | −24.6714 | 5.354 | 1.48749 | 70.23 | 18.29 |
| s25 | −53.1343 | 2.770 | | | 16.63 |
| s26* | 683.9611 | 8.787 | 1.49700 | 81.54 | 14.40 |

-continued

Objective 14

| s | r | d | nd | vd | er |
|---|---|---|---|---|---|
| s27* | 31.7810 | 2.371 | | | 12.29 |
| s28* | 22.1813 | 8.754 | 1.49700 | 81.54 | 11.98 |
| s29* | 13.6459 | 5.257 | | | 9.41 |
| s30* | −33.9011 | 6.266 | 1.49700 | 81.54 | 9.76 |
| s31* | 135.5589 | 1.000 | | | 10.28 |
| s32 | 60.0363 | 1.206 | 1.73800 | 32.26 | 10.50 |
| s33 | 115.3925 | −29.031 | | | 10.50 |

Aspherical data of the objective 14 is described below. Here, an aspherical shape is represented by the expression below. In this expression, z represents a coordinate in an optical axis direction of an aspherical surface, Y represents a coordinate in a direction orthogonal to an optical axis of the aspherical surface, K represents a conical coefficient, r represents a paraxial radius of curvature of the aspherical surface, and A4, A6, A8, and A10 respectively represent the fourth, sixth, eighth, and tenth aspherical coefficients. E represents a power of 10.

$$Z = \frac{Y^2}{r + r\sqrt{1 - (K+1)\left(\frac{Y}{r}\right)^2}} + A4Y^4 + A6Y^6 + A8Y^8 + A10Y^{10}$$

Fifteenth Surface s15
K=−130.5839 A4=−3.374E−06 A6=−2.550E−09 A8=−4.653E−12 A10=−1.689E−14
Sixteenth Surface s16
K=0.9776 A4=−1.333E−06 A6=−2.475E−09 A8=−9.516E−12 A10=−6.753E−15
Twenty-Sixth Surface s26
K=−115.0934 A4=9.081E−07 A6=−5.191E−08 A8=−1.147E−10 A10=1.250E−13
Twenty-Seventh Surface s27
K=−0.5111 A4=1.769E−05 A6=−2.561E−08 A8=−7.502E−10 A10=1.643E−12
Twenty-Eighth Surface s28
K=−2.9135 A4=6.461E−07 A6=−2.152E−08 A8=4.242E−10 A10=2.141E−12
Twenty-Ninth Surface s29
K=−1.5929 A4=2.967E−05 A6=4.115E−07 A8=3.764E−09 A10=2.546E−11
Thirtieth Surface s30
K=−3.3854 A4=1.580E−05 A6=4.658E−07 A8=1.813E−09 A10=−1.025E−11
Thirty-First Surface s31
K=−79.1359 A4=−5.487E−06 A6=4.016E−08 A8=4.241E−10 A10=−1.231E−11

The objective 14 satisfies conditional expressions (1) to (7) and (11) to (16), as described below.

Figure 10:
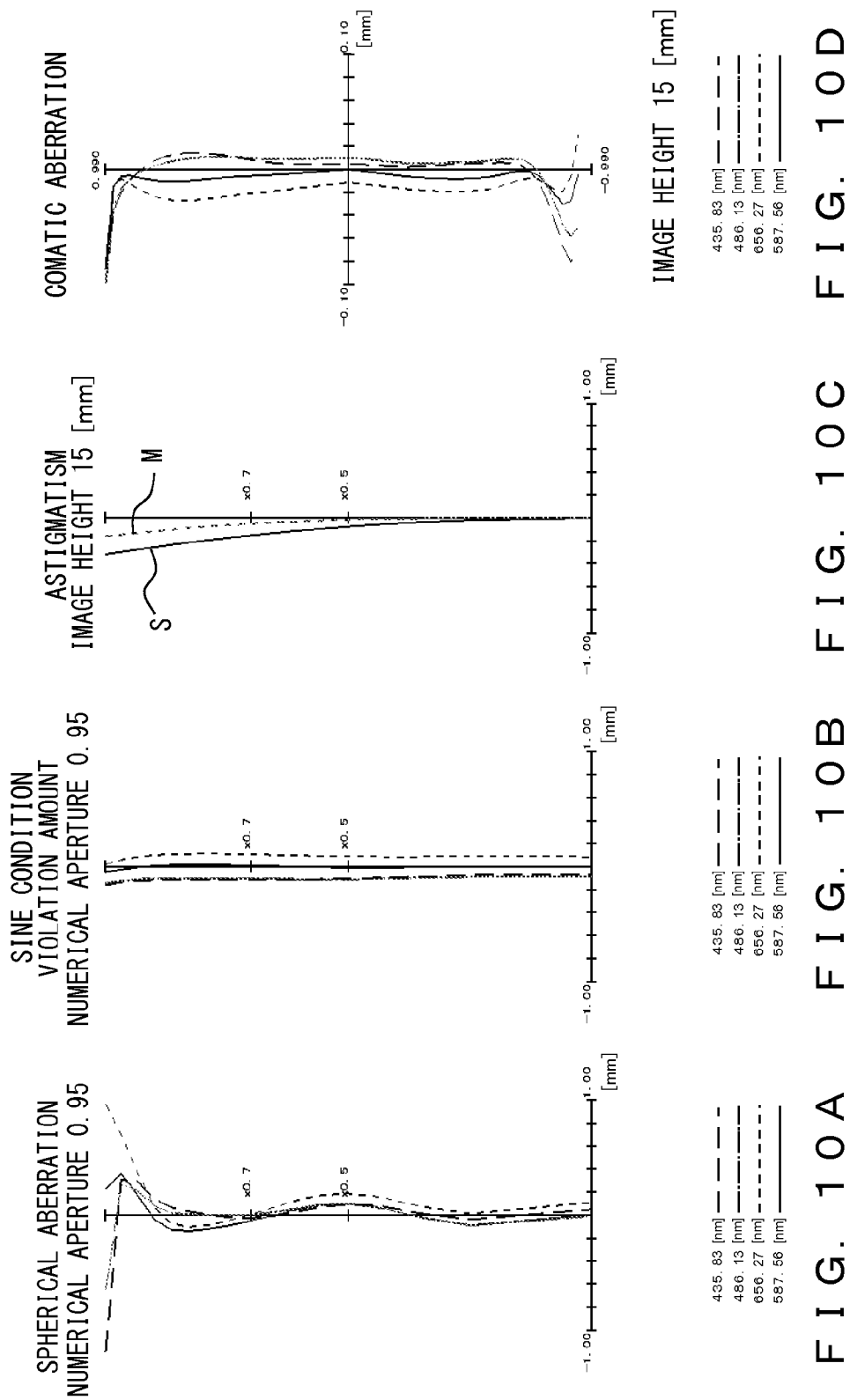
FIG. 10A and FIG. 10D are aberration diagrams in a case in which a combination of an objective illustrated in FIG. 9 and a tube lens illustrated in FIG. 3 is used, and respectively illustrate spherical aberration, a sine condition violation amount, astigmatism, and comatic aberration.

$NA=0.95$ (1), (4):

$FN/|\beta|/\epsilon=1990$ (2):

$\Phi_{max}/2/h_{exp}/NA=2.68$ (3):

$f_{G1}/f=2.62$ (5):

$r_{11}/f=-1.14$ (6):

$r_{12}/d_{o12}=-1.29$ (7):

$D_{ogF}/D_{oL}=0.72$ (11):

$f/f_{G3O}=0.01$ (12):

$f_{G1}/f_{L2}=0.36$ (13):

$f_{G1}/f_{L3}=0.13$ (14):

$f_{G3t}/f=-9.10$ (15):

$r_{21}/r_{12}=1.33$ (16):

FIG. 10A and FIG. 10D are aberration diagrams in a case in which a combination of the objective 14 and the tube lens 10 is used. FIG. 10A illustrates spherical aberration, FIG. 10B illustrates a sine condition violation amount, FIG. 10C illustrates astigmatism, and FIG. 10D illustrates comatic aberration.

EXAMPLE 5

Figure 11:
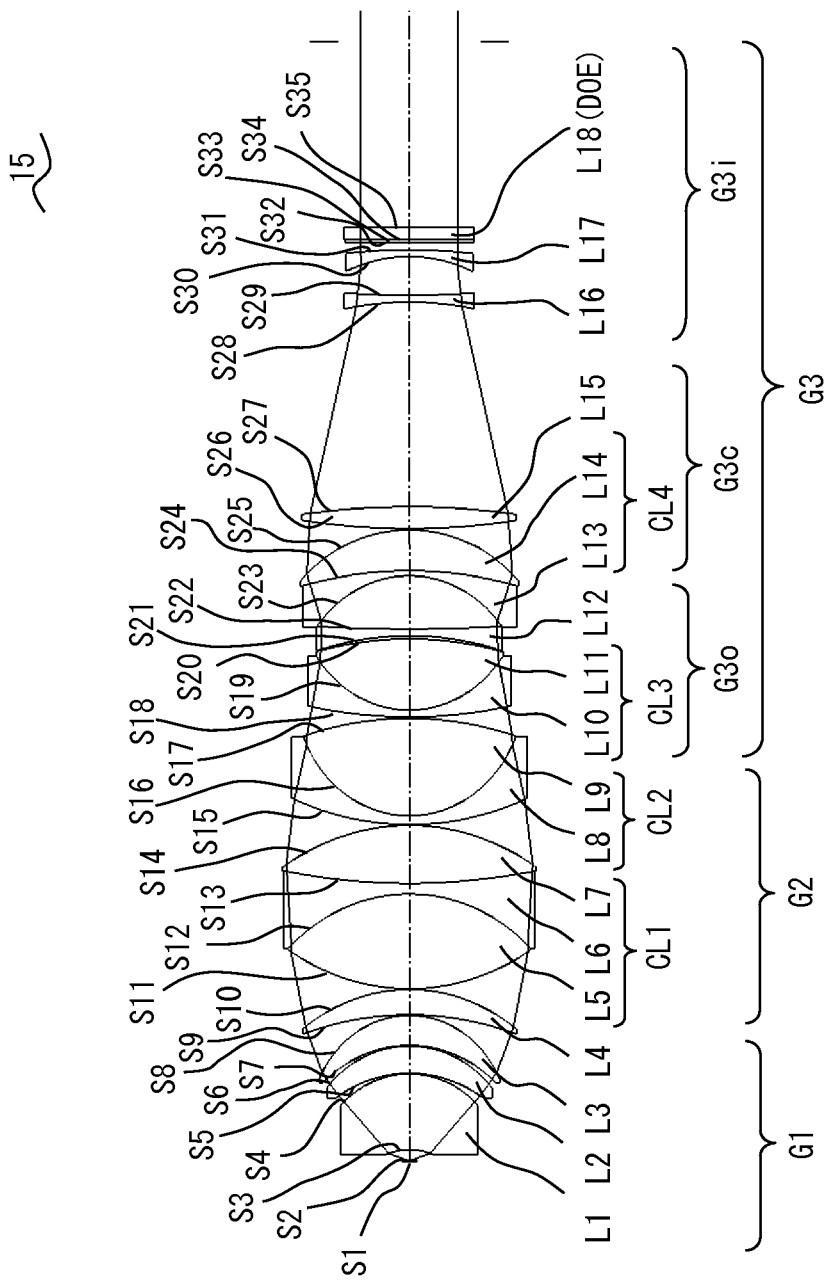
FIG. 11 is a sectional view of an objective in Example 5 of the present invention.

FIG. 11 is a sectional view of an objective 15 in this example. The objective 15 illustrated in FIG. 11 is a dry objective for a microscope. The objective 15 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a meniscus lens L1 (the first lens) with negative refractive power with a concave surface facing the object side, a meniscus lens L2 (the second lens) with positive refractive power with a concave surface facing the object side, a meniscus lens L3 (the third lens component) with positive refractive power with a concave surface facing the object side, and a meniscus lens L4 (the seventh lens component) with positive refractive power with a concave surface facing the object side, in order from the object side.

The second lens group G2 is configured of a three-lens-cemented lens CL1 that is configured of a biconvex lens L5, a biconcave lens L6, and a biconvex lens L7, and a cemented lens CL2 that is configured of a meniscus lens L8 with negative refractive power with a concave surface facing the image side and a biconvex lens L9, in order from the object side.

The third lens group G3 is configured of the 3o-th lens group (the front lens group), the 3c-th lens group (the intermediate lens group), and the 3i-th lens group (the rear lens group), in order from the object side. The 3o-th lens group is configured of a cemented lens CL3 that is configured of a meniscus lens L10 (the ninth lens) with negative refractive power with a concave surface facing the image side and a biconvex lens L11 (the eighth lens), and a biconcave lens L12, in order from the object side. The 3c-th lens group is configured of a cemented lens CL4 (the tenth lens component) that is configured of a meniscus lens L13 with negative refractive power with a concave surface facing the object side and a meniscus lens L14 (the sixth lens; NBH53 of OHARA INC.) with positive refractive power with a concave surface facing the object side, and a biconvex lens L15, in order from the object side. The 3i-th lens group is configured of a biconcave lens L16, a meniscus lens L17 with negative refractive power with a concave surface facing the object side, and a diffractive optical element (DOE) L18, in order from the object side.

The diffractive optical element L18 is an optical element in which at least two layers that are made of optical materials different from each other are laminated, and is a diffractive optical element, as described in Japanese Patent No. 3717555, in which a relief pattern is formed on a boundary surface and diffraction efficiency is enhanced in a wide wavelength region. However, a diffractive optical element used for the objective 15 in this example is not limited to the diffractive optical element above. The diffractive optical element may be a diffractive optical element as described, for example, in Japanese Laid-Open Patent Publication No. 2003-215457 or Japanese Laid-Open Patent Publication No. 11-133305.

The diffractive optical element L18 has been designed with an ultra-high index method, as described, for example, in Japanese Laid-Open Patent Publication No. 8-286113. A surface shape (a radius of curvature and an aspherical coefficient) of the diffractive optical element L18 is a lens surface shape in a case in which the diffractive optical element L18 is replaced with a virtual lens (an ultra-high index lens) having extremely great refractive power.

Various pieces of data of the objective 15 is described below. The d-line (587.56 nm) is used for a reference wavelength.

NA=0.95, FN=30 mm, $|\beta|$=20, $\epsilon$=7.54E−04 mm, f=9 mm, $f_{G1}$=25.9 mm, $r_{11}$=−11.7553 mm, $r_{12}$=−16.9884 mm, $d_{o12}$=14.223 mm, $\Phi_{max}$/2=21.938 mm, $h_{exp}$=8.55 mm, $f_{G3O}$=−102.2878 mm, $f_{G3F}$=−38.562 mm, $r_{21}$=−23.2686 mm, $D_{oL}$=151.183 mm, $D_{ogF}$=102.274 mm, $f_{L2}$=139.125 mm, $f_{L3}$=104.96 mm Lens data of the objective 15 is described below. The mark "*" put on a surface number represents that a surface is aspherical. A surface number s34 indicates a lens surface shape in a case in which a diffractive optical element is replaced with a virtual lens (an ultra-high index lens) having extremely great refractive power.

| Objective 15 | | | | | |
|---|---|---|---|---|---|
| s | r | d | nd | vd | er |
| s1(object surface) | INF | 0.165 | 1.52103 | 56.02 | 0.75 |
| s2 | INF | 1.760 | | | 0.88 |
| s3 | −11.7553 | 12.298 | 1.88306 | 40.76 | 3.84 |
| s4 | −16.9884 | 0.088 | | | 11.65 |
| s5 | −23.2686 | 4.402 | 1.5691 | 71.30 | 12.60 |
| s6 | −19.2175 | 0.110 | | | 14.17 |
| s7 | −22.4059 | 4.840 | 1.5691 | 71.30 | 14.80 |
| s8 | −17.5706 | 0.110 | | | 15.53 |
| s9 | −58.7666 | 4.091 | 1.49702 | 81.54 | 18.10 |
| s10 | −31.1809 | 0.110 | | | 18.44 |
| s11 | 39.7049 | 15.367 | 1.43876 | 94.93 | 21.02 |
| s12 | −30.5156 | 1.650 | 1.63779 | 42.41 | 20.96 |
| s13 | 123.7205 | 9.396 | 1.43876 | 94.93 | 21.75 |
| s14 | −40.5802 | 0.110 | | | 21.86 |
| s15 | 53.0777 | 1.430 | 1.63779 | 42.41 | 20.40 |
| s16 | 20.1928 | 15.788 | 1.43876 | 94.93 | 18.30 |
| s17 | −62.8184 | 0.220 | | | 18.26 |
| s18 | 91.8568 | 1.100 | 1.63779 | 42.41 | 17.44 |
| s19 | 20.0113 | 11.538 | 1.43876 | 94.93 | 16.06 |
| s20 | −67.1527 | 0.508 | | | 16.00 |
| s21 | −56.6330 | 1.100 | 1.63779 | 42.41 | 15.97 |
| s22 | 322.2650 | 8.580 | | | 16.01 |
| s23 | −20.5345 | 0.823 | 1.48751 | 70.23 | 16.04 |
| s24 | −74.6275 | 6.688 | 1.73806 | 32.26 | 18.44 |
| s25 | −26.5166 | 0.194 | | | 18.85 |
| s26 | 136.8083 | 3.519 | 1.67305 | 38.15 | 18.47 |
| s27 | −149.8267 | 33.112 | | | 18.38 |

-continued

| Objective 15 | | | | | |
|---|---|---|---|---|---|
| s | r | d | nd | vd | er |
| s28 | −60.0182 | 1.100 | 1.49702 | 81.54 | 11.00 |
| s29 | 192.7648 | 6.268 | | | 10.82 |
| s30 | −27.1426 | 1.100 | 1.49702 | 81.54 | 10.51 |
| s31 | −105.6533 | 1.116 | | | 10.74 |
| s32 | INF | 0.500 | 1.61006 | 27.48 | 10.87 |
| s33 | INF | 0 | 1000 | −3.45 | 10.90 |
| s34* | 2075000 | 2.000 | 1.63768 | 34.21 | 10.90 |
| s35 | INF | −32.826 | | | 11.00 |

Aspherical data of the objective 15 is described below.
Thirty-Fourth Surface s34
K=0 A4=4.591E−11 A6=3.073E−13 A8=0 A10=0

The objective 15 satisfies conditional expressions (1) to (7) and (11) to (16), as described below.

$$NA=0.95 \quad (1), (4):$$

$$FN/|\beta|/\epsilon=1990 \quad (2):$$

$$\Phi_{max}/2/h_{exp}/NA=2.70 \quad (3):$$

$$f_{G1}/f=2.88 \quad (5):$$

$$r_{11}/f=-1.31 \quad (6):$$

$$r_{12}/d_{o12}=-1.19 \quad (7):$$

$$D_{ogF}/D_{oL}=0.68 \quad (11):$$

$$f/f_{G3O}=-0.09 \quad (12):$$

$$f_{G1}/f_{L2}=0.19 \quad (13):$$

$$f_{G1}/f_{L3}=0.25 \quad (14):$$

$$f_{G3F}/f=-4.28 \quad (15):$$

$$r_{21}/r_{12}=1.37 \quad (16):$$

Figure 12:
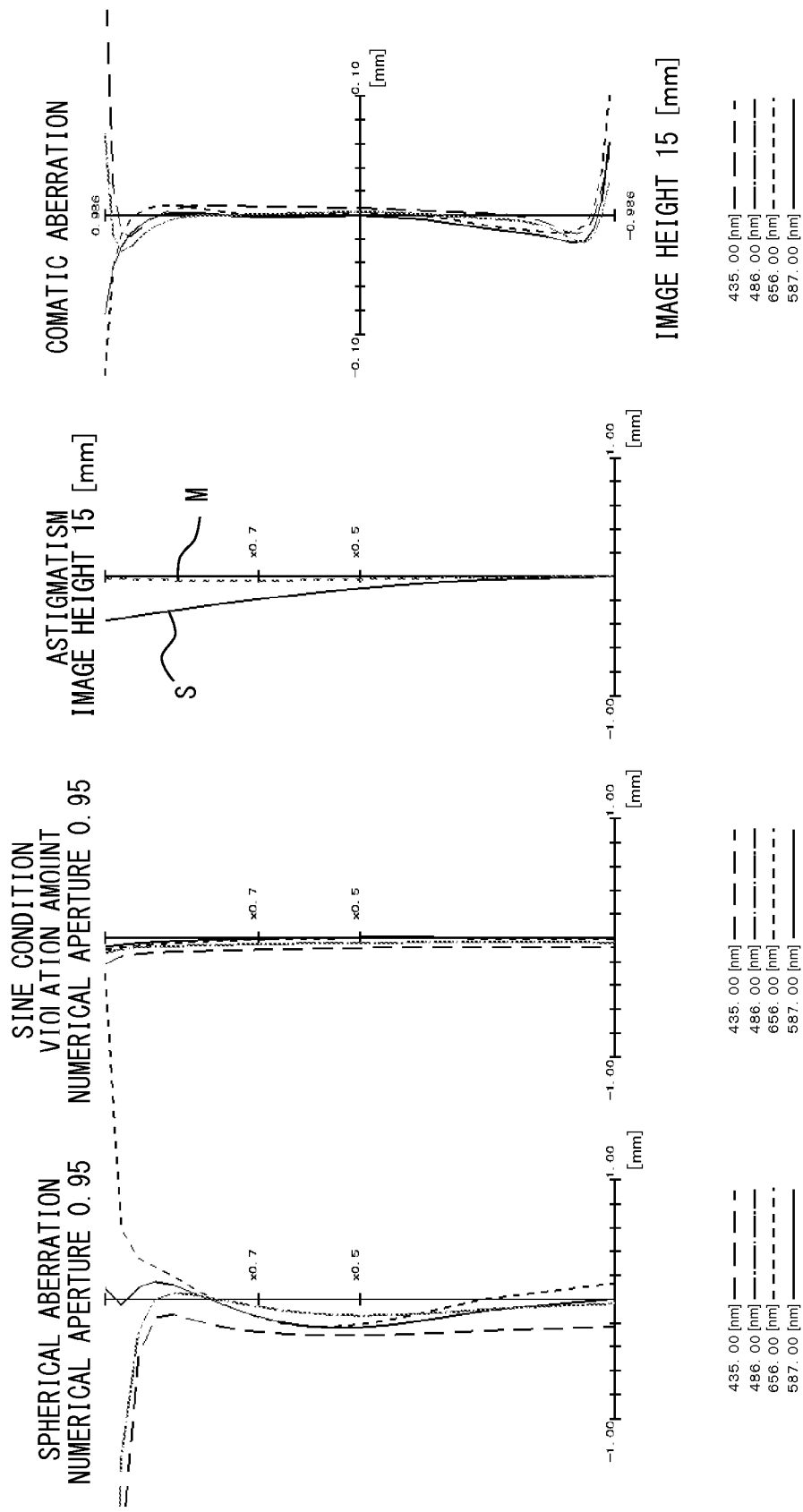
FIG. 12A to FIG. 12D are aberration diagrams in a case in which a combination of an objective illustrated in FIG. 11 and a tube lens illustrated in FIG. 3 is used, and respectively illustrate spherical aberration, a sine condition violation amount, astigmatism, and comatic aberration.

FIG. 12A to FIG. 12D are aberration diagrams in a case in which a combination of the objective 15 and the tube lens 10 is used. FIG. 12A illustrates spherical aberration, FIG. 12B illustrates a sine condition violation amount, FIG. 12C illustrates astigmatism, and FIG. 12D illustrates comatic aberration.

EXAMPLE 6

Figure 13:
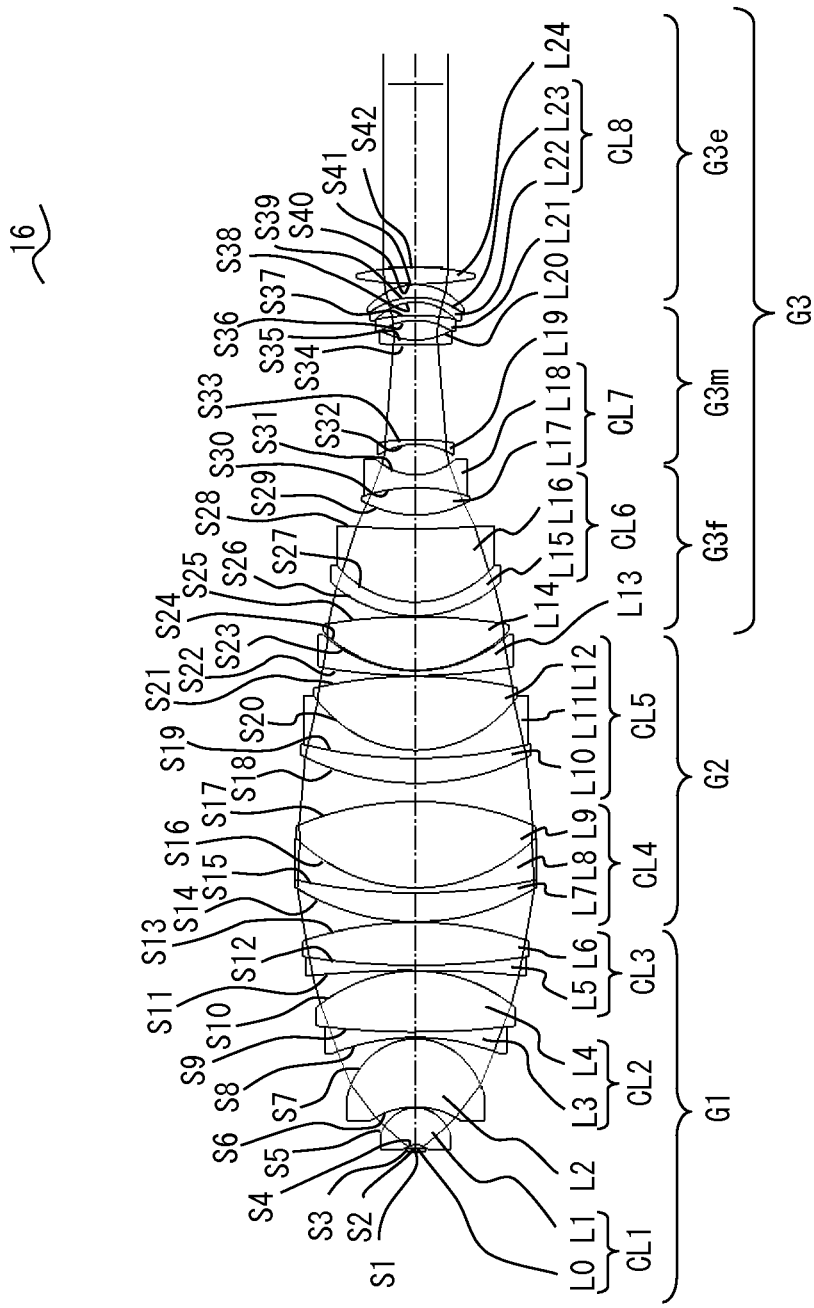
FIG. 13 is a sectional view of an objective in Example 6 of the present invention.

FIG. 13 is a sectional view of an objective 16 in this example. The objective 16 illustrated in FIG. 13 is an immersion type objective for a microscope. The objective 16 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a cemented lens CL1 (the first cemented lens) that is configured of a plano-convex lens L0 with a plane surface facing the object side and a meniscus lens L1 (the first lens) with negative refractive power with a concave surface facing the object side, a meniscus lens L2 (the second lens) with positive refractive power with a concave surface facing the object side, a cemented lens CL2 (the third lens component) that is configured of a biconcave lens L3 and a biconvex lens L4, and a cemented lens CL3 (the seventh lens component) that is configured of a biconcave lens L5 and a biconvex lens L6, in order from the object side.

The second lens group G2 is configured of a three-lens-cemented lens CL4 that is configured of a meniscus lens L7 with positive refractive power with a concave surface facing the image side, a meniscus lens L8 with negative refractive power with a concave surface facing the image side, and a biconvex lens L9, and a three-lens-cemented lens CL5 that is configured of a meniscus lens L10 (the sixth lens; TIH53 of OHARA INC.) with positive refractive power with a concave surface facing the image side, a meniscus lens L11 with negative refractive power with a concave surface facing the image side, and a biconvex lens L12, in order from the object side.

The third lens group G3 is configured of the 3f-th lens group (the front lens group), the 3m-th lens group (the intermediate lens group), and the 3e-th lens group (the rear lens group), in order from the object side. The 3f-th lens group is configured of a meniscus lens L13 (the ninth lens) with negative refractive power with a concave surface facing the image side, a biconvex lens L14 (the eighth lens), and a cemented lens CL6 that is configured of a meniscus lens L15 with negative refractive power with a concave surface facing the image side and a meniscus lens L16 with positive refractive power with a concave surface facing the image side, in order from the object side. The 3m-th lens group is configured of a cemented lens CL7 (the twelfth lens component) that is configured of a biconvex lens L17 and a biconcave lens L18, and a meniscus lens L19 with negative refractive power with a concave surface facing the object side, in order from the object side. The 3e-th lens group is configured of a meniscus lens L20 (the eleventh lens component) with negative refractive power with a concave surface facing the image side, a meniscus lens L21 (the fifth lens component) with negative refractive power with a concave surface facing the object side, a cemented lens CL8 (the fourth lens component) that is configured of a meniscus lens L22 with negative refractive power with a concave surface facing the object side and a meniscus lens L23 with positive refractive power with a concave surface facing the object side, and a biconvex lens L24, in order from the object side.

Various pieces of data of the objective 16 are described below. The d-line (587.56 nm) is used for a reference wavelength. A refractive index $N_o$ of immersion liquid is 1.5148.
NA=1.3, FN=30 mm, $|\beta|$=40, $\epsilon$=5.51E−04 mm, f=4.5 mm, $f_{G1}$=15.83 mm, $r_{12}$=−6.834 mm, $d_{o12}$=7.238 mm, $\Phi_{max}/2$=21.64 mm, $h_{exp}$=5.85 mm, $f_{G3O}$=67.05 mm, $D_{oL}$=145.000 mm, $D_{ogF}$=64.477 mm, $f_{L2}$=51.90 mm, $f_{L3}$=165.57 mm, $f_{L7}$=220.49 mm Lens data of the objective 16 is described below.

| Objective 16 | | | | | |
|---|---|---|---|---|---|
| s | r | d | nd | vd | er |
| s1(object surface) | INF | 0.170 | 1.52347 | 54.41 | 0.38 |
| s2 | INF | 0.362 | 1.51486 | 41.00 | 0.66 |
| s3 | INF | 0.652 | 1.51635 | 64.14 | 1.29 |
| s4 | −3.2441 | 6.054 | 1.88306 | 40.76 | 1.64 |
| s5 | −6.8342 | 0.144 | | | 5.90 |
| s6 | −16.1435 | 11.171 | 1.5691 | 71.30 | 7.68 |
| s7 | −13.0577 | 0.222 | | | 12.07 |
| s8 | −45.2412 | 0.891 | 1.63779 | 42.41 | 14.57 |
| s9 | 164.1406 | 10.007 | 1.5691 | 71.30 | 16.18 |
| s10 | −30.4567 | 0.122 | | | 17.67 |
| s11 | −215.6520 | 0.800 | 1.63779 | 42.41 | 19.01 |
| s12 | 149.0681 | 6.993 | 1.5691 | 71.30 | 19.59 |
| s13 | −72.7399 | 0.100 | | | 20.19 |
| s14 | 45.7927 | 4.715 | 1.43876 | 94.93 | 21.64 |
| s15 | 112.1092 | 0.837 | 1.63779 | 42.41 | 21.59 |
| s16 | 33.3718 | 14.170 | 1.43876 | 94.93 | 21.26 |
| s17 | −61.1831 | 2.993 | | | 21.41 |
| s18 | 50.0401 | 4.073 | 1.84676 | 23.78 | 20.46 |
| s19 | 93.4075 | 1.331 | 1.75504 | 52.32 | 20.00 |
| s20 | 23.9768 | 12.129 | 1.43876 | 94.93 | 18.15 |
| s21 | −90.2641 | 0.100 | | | 17.99 |
| s22 | 109.2684 | 0.800 | 1.75504 | 52.32 | 17.31 |
| s23 | 27.2740 | 0.100 | | | 16.40 |
| s24 | 25.9302 | 8.731 | 1.43876 | 94.93 | 16.55 |
| s25 | −111.0317 | 0.100 | | | 16.40 |
| s26 | 24.1614 | 2.386 | 1.75504 | 52.32 | 15.02 |
| s27 | 20.4571 | 11.959 | 1.43876 | 94.93 | 13.89 |
| s28 | 170.5645 | 2.268 | | | 11.48 |
| s29 | 22.1833 | 4.491 | 1.60303 | 65.44 | 9.50 |
| s30 | −33.1761 | 2.120 | 1.73806 | 32.26 | 8.95 |
| s31 | 11.7279 | 4.969 | | | 6.73 |
| s32 | −14.2396 | 0.800 | 1.49702 | 81.54 | 6.45 |
| s33 | −43.4343 | 15.497 | | | 6.51 |
| s34 | 123.5400 | 0.800 | 1.60303 | 65.44 | 6.15 |
| s35 | 14.1045 | 3.245 | | | 6.08 |
| s36 | −12.7149 | 0.800 | 1.75504 | 52.32 | 6.15 |
| s37 | −41.8941 | 2.177 | | | 6.85 |
| s38 | −10.7606 | 0.800 | 1.43876 | 94.93 | 6.95 |
| s39 | −15.4480 | 2.076 | 1.73806 | 32.26 | 7.77 |
| s40 | −12.0682 | 0.100 | | | 8.31 |
| s41 | 64.1504 | 2.741 | 1.88306 | 40.76 | 10.19 |
| s42 | −53.5056 | −53.273 | | | 10.32 |

Surfaces having surface numbers s1 and s2 are respectively an object surface (a surface on the object side of a cover glass) and a surface on the image side of the cover glass. Surfaces having surface numbers s3 and s42 are respectively a lens surface closest to the object and a lens surface closest to the image plane in the objective. A space between the surface having a surface number s2 and the surface having a surface number s3 is filled with immersion liquid.

The objective 16 satisfies conditional expressions (1) to (3) and (8) to (14), as described below.

$$NA=1.3 \quad (1), (8):$$

$$FN/|\beta|/\epsilon=1361 \quad (2):$$

$$\Phi_{max}/2/h_{exp}/NA=2.85 \quad (3):$$

$$f_{G1}/f=3.52 \quad (9):$$

$$r_{12}/d_{o12}=-0.95 \quad (10):$$

$$D_{ogF}/D_{oL}=0.44 \quad (11):$$

$$f/f_{G3O}=0.07 \quad (12):$$

$$f_{G1}/f_{L2}=0.31 \quad (13):$$

$$f_{G1}/f_{L3}=0.10 \quad (14):$$

Figure 14:
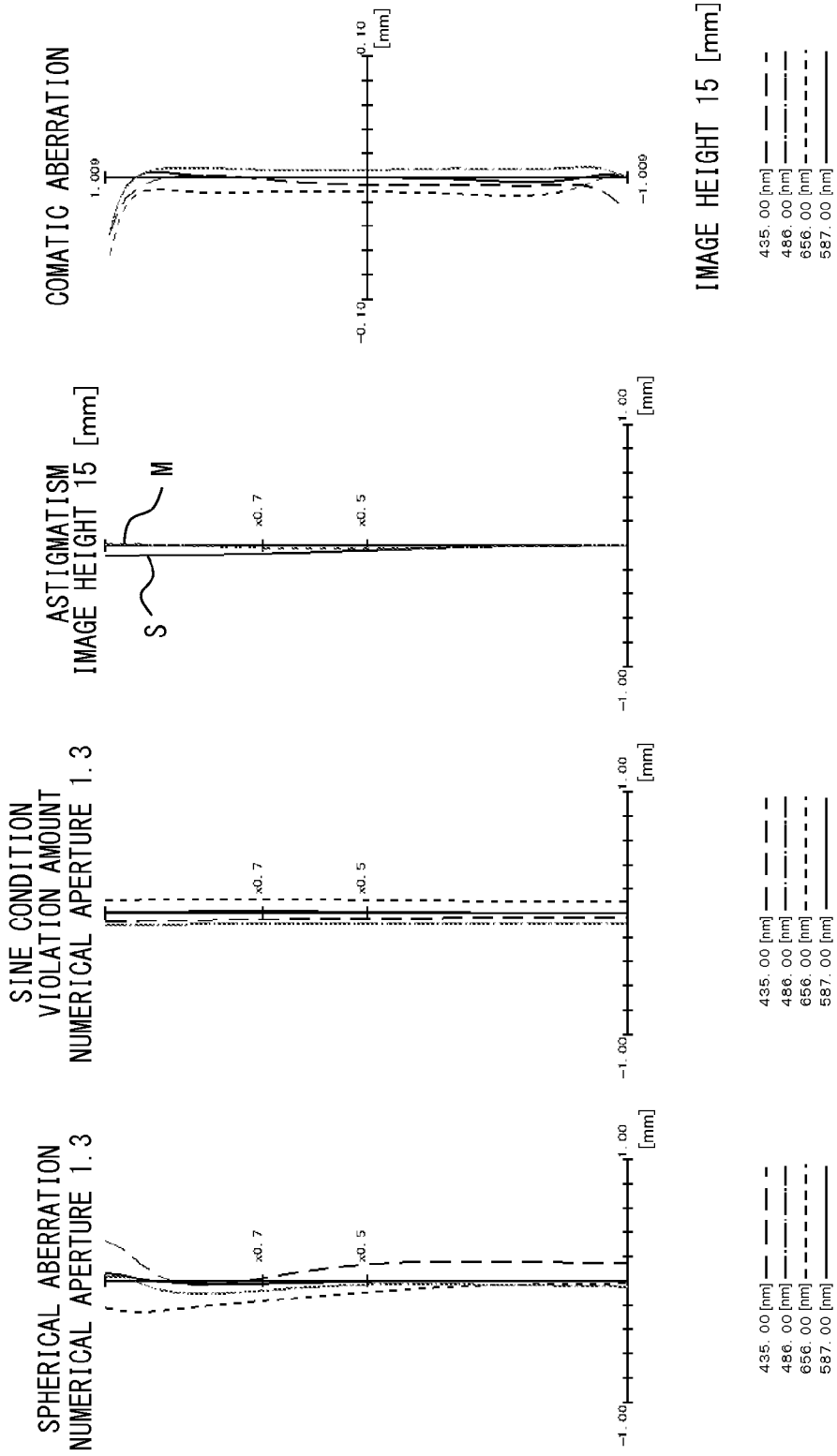
FIG. 14A to FIG. 14D are aberration diagrams in a case in which a combination of an objective illustrated in FIG. 13 and a tube lens illustrated in FIG. 3 is used, and respectively illustrate spherical aberration, a sine condition violation amount, astigmatism, and comatic aberration.

FIG. 14A to FIG. 14D are aberration diagrams in a case in which a combination of the objective 16 and the tube lens 10 is used. FIG. 14A illustrates spherical aberration, FIG.

14B illustrates a sine condition violation amount, FIG. 14C illustrates astigmatism, and FIG. 14D illustrates comatic aberration.

EXAMPLE 7

Figure 15:
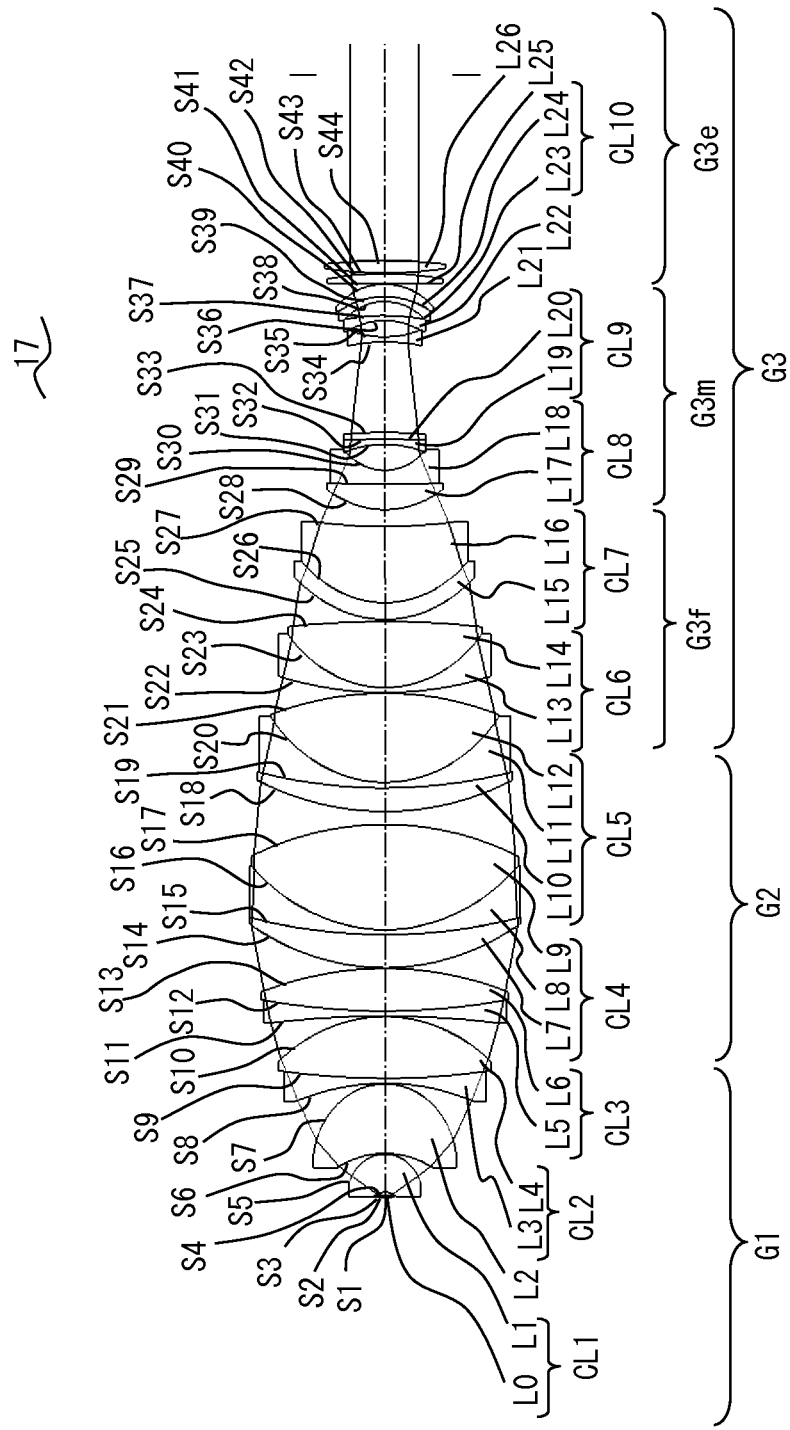
FIG. 15 is a sectional view of an objective in Example 7 of the present invention.

FIG. 15 is a sectional view of an objective 17 in this example. The objective 17 illustrated in FIG. 15 is an immersion type objective for a microscope. The objective 17 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a cemented lens CL1 (the first cemented lens) that is configured of a plano-convex lens L0 with a plane surface facing the object side and a meniscus lens L1 (the first lens) with negative refractive power with a concave surface facing the object side, a meniscus lens L2 (the second lens) with positive refractive power with a concave surface facing the object side, a cemented lens CL2 (the third lens component) that is configured of a biconcave lens L3 and a biconvex lens L4, and a cemented lens CL3 (the seventh lens component) that is configured of a biconcave lens L5 and a biconvex lens L6, in order from the object side.

The second lens group G2 is configured of a three-lens-cemented lens CL4 that is configured of a meniscus lens L7 with positive refractive power with a concave surface facing the image side, a meniscus lens L8 with negative refractive power with a concave surface facing the image side, and a biconvex lens L9, and a three-lens-cemented lens CL5 that is configured of a meniscus lens L10 (the sixth lens; TIH53 of OHARA, INC.) with positive refractive power with a concave surface facing the image side, a meniscus lens L11 with negative refractive power with a concave surface facing the image side, and a biconvex lens L12, in order from the object side.

The third lens group G3 is configured of the 3f-th lens group (the front lens group), the 3m-th lens group (the intermediate lens group), and the 3e-th lens group (the rear lens group), in order from the object side. The 3f-th lens group is configured of a cemented lens CL6 that is configured of a meniscus lens L13 (the ninth lens) with negative refractive power with a concave surface facing the image side and a biconvex lens L14 (the eighth lens), and a cemented lens CL7 that is configured of a meniscus lens L15 with negative refractive power with a concave surface facing the image side and a meniscus lens L16 with positive refractive power with a concave surface facing the image side, in order from the object side. The 3m-th lens group is configured of a cemented lens CL8 that is configured of a meniscus lens L17 with positive refractive power with a concave surface facing the image side and a meniscus lens L18 with negative refractive power with a concave surface facing the image side, and a cemented lens CL9 that is configured of a meniscus lens L19 with negative refractive power with a concave surface facing the object side and a meniscus lens L20 with positive refractive power with a concave surface facing the object side, in order from the object side. The 3e-th lens group is configured of a biconcave lens L21 (the eleventh lens component), a meniscus lens L22 (the fifth lens component) with negative refractive power with a concave surface facing the object side, a cemented lens CL10 (the fourth lens component) that is configured of a meniscus lens L23 with negative refractive power with a concave surface facing the object side and a meniscus lens L24 with positive refractive power with a concave surface facing the object side, a plano-convex lens L25 with a plane surface facing the object side, and a biconvex lens L26, in order from the object side.

Various pieces of data of the objective 17 are described below. The d-line (587.56 nm) is used for a reference wavelength. A refractive index $N_o$ of immersion liquid is 1.5148.

NA=1.4, FN=30 mm, $|\beta|$=40, $\epsilon$=5.12E−04 mm, f=4.5 mm, $f_{G1}$=14.27 mm, $r_{12}$=−7.0457 mm, $d_{o12}$=7.091 mm, $\Phi_{max}/2$=24.721 mm, $h_{exp}$=6.30 mm, $f_{G3O}$=75.727 mm, $D_{oL}$=151.261 mm, $D_{ogF}$=66.140 mm, $f_{L2}$=47.8 mm, $f_{L3}$=146.08 mm Lens data of the objective 17 is described below.

| Objective 17 | | | | | |
|---|---|---|---|---|---|
| s | r | d | nd | νd | er |
| s1(object surface) | INF | 0.170 | 1.52347 | 54.41 | 0.38 |
| s2 | INF | 0.250 | 1.51486 | 41.00 | 0.74 |
| s3 | INF | 0.541 | 1.51635 | 64.14 | 1.30 |
| s4 | −3.2573 | 6.130 | 1.88306 | 40.76 | 1.58 |
| s5 | −7.0457 | 0.101 | | | 6.17 |
| s6 | −18.2608 | 11.223 | 1.5691 | 71.30 | 8.50 |
| s7 | −13.3647 | 0.100 | | | 12.69 |
| s8 | −47.9736 | 0.811 | 1.63779 | 42.41 | 16.07 |
| s9 | 156.9755 | 9.957 | 1.5691 | 71.30 | 18.18 |
| s10 | −30.2445 | 0.100 | | | 19.18 |
| s11 | −199.1341 | 0.800 | 1.63779 | 42.41 | 21.08 |
| s12 | 143.4114 | 6.879 | 1.5691 | 71.30 | 21.93 |
| s13 | −70.9607 | 0.100 | | | 22.34 |
| s14 | 47.7991 | 5.342 | 1.43876 | 94.93 | 24.60 |
| s15 | 115.7137 | 0.801 | 1.63779 | 42.41 | 24.55 |
| s16 | 34.7896 | 16.963 | 1.43876 | 94.93 | 24.08 |
| s17 | −61.7960 | 2.077 | | | 24.23 |
| s18 | 57.6791 | 3.796 | 1.84676 | 23.78 | 23.09 |
| s19 | 108.1782 | 0.918 | 1.75504 | 52.32 | 22.75 |
| s20 | 26.3280 | 14.393 | 1.43876 | 94.93 | 20.64 |
| s21 | −65.8296 | 0.100 | | | 20.57 |
| s22 | 74.3029 | 0.810 | 1.75504 | 52.32 | 19.11 |
| s23 | 22.9020 | 10.684 | 1.43876 | 94.93 | 17.47 |
| s24 | −185.2953 | 0.324 | | | 17.32 |
| s25 | 23.7108 | 2.654 | 1.75504 | 52.32 | 16.10 |
| s26 | 20.7355 | 12.324 | 1.43876 | 94.93 | 14.89 |
| s27 | 110.2738 | 2.752 | | | 12.51 |
| s28 | 19.2575 | 4.184 | 1.60303 | 65.44 | 10.18 |
| s29 | 1332.6436 | 2.153 | 1.73806 | 32.26 | 9.49 |
| s30 | 10.2792 | 4.211 | | | 7.11 |
| s31 | −21.6113 | 0.800 | 1.49702 | 81.54 | 7.08 |
| s32 | −310.2945 | 1.098 | 1.73806 | 32.26 | 7.07 |
| s33 | −94.8995 | 14.625 | | | 7.07 |
| s34 | −36.3192 | 0.800 | 1.60303 | 65.44 | 6.24 |
| s35 | 20.0000 | 2.657 | | | 6.31 |
| s36 | −14.2645 | 0.800 | 1.75504 | 52.32 | 6.35 |
| s37 | −44.8729 | 2.263 | | | 6.99 |
| s38 | −10.8850 | 0.800 | 1.43876 | 94.93 | 7.09 |
| s39 | −16.2941 | 2.006 | 1.73806 | 32.26 | 7.94 |
| s40 | −12.8173 | 0.100 | | | 8.48 |
| s41 | INF | 1.594 | 1.88306 | 40.76 | 9.98 |
| s42 | −66.6667 | 0.100 | | | 10.16 |
| s43 | 84.2007 | 1.975 | 1.88306 | 40.76 | 10.61 |
| s44 | −119.1973 | −50.823 | | | 10.69 |

The objective 17 satisfies conditional expressions (1) to (3) and (8) to (14), as described below.

Figures 16A, 16B, 16C, 16D:
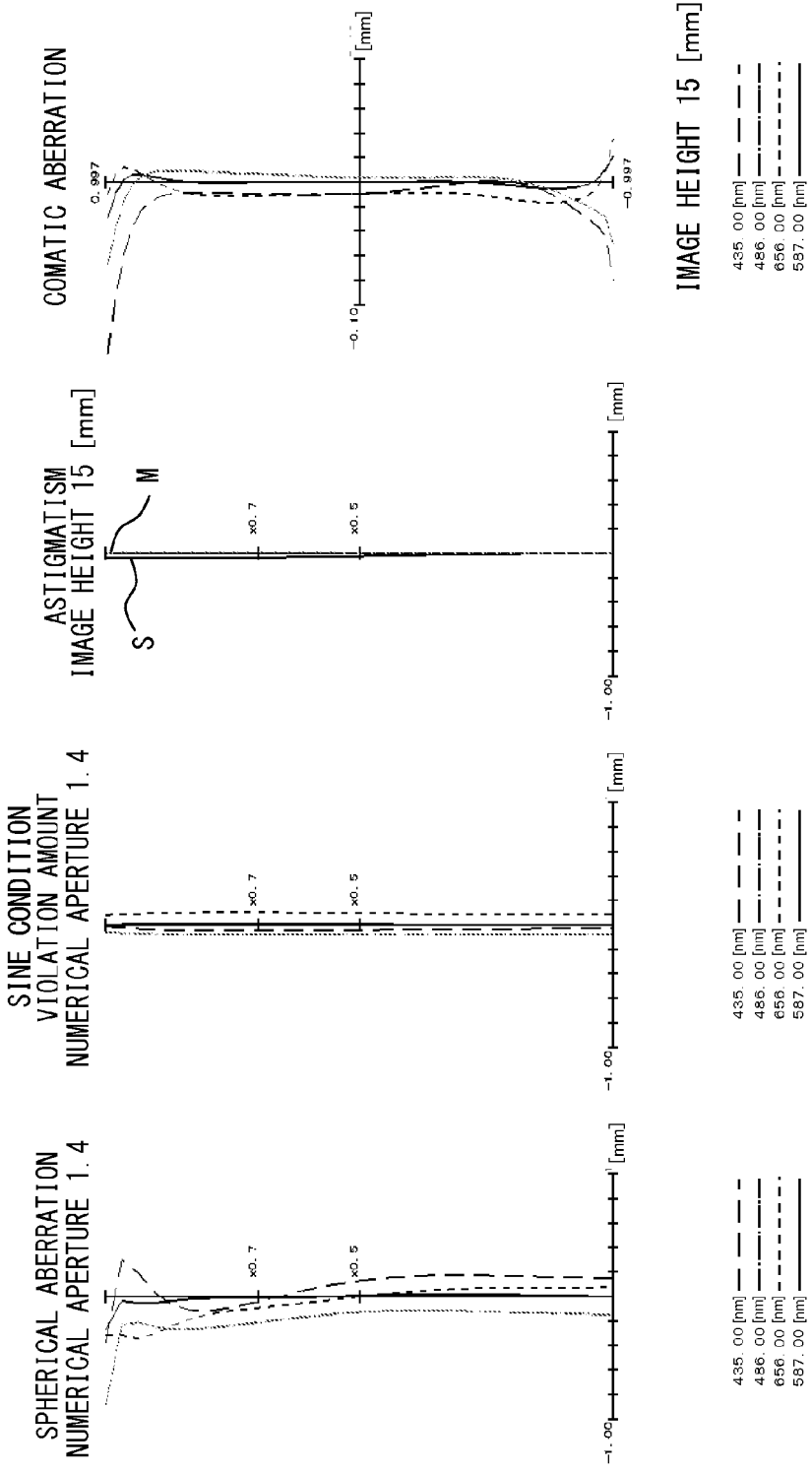
FIG. 16A to FIG. 16D are aberration diagrams in a case in which a combination of an objective illustrated in FIG. 15 and a tube lens illustrated in FIG. 3 is used, and respectively illustrate spherical aberration, a sine condition violation amount, astigmatism, and comatic aberration.

NA=1.4     (1), (8):

FN/$|\beta|$/$\epsilon$=1466     (2):

$\Phi_{max}/2/h_{exp}/NA$=2.80     (3):

$f_{G1}/f=3.17$ (9):

$r_{12}/d_{o12}=-0.99$ (10):

$D_{ogF}/D_{oL}=0.44$ (11):

$f/f_{G3O}=0.06$ (12):

$f_{G1}/f_{L2}=0.30$ (13):

$f_{G1}/f_{L3}=0.10$ (14):

FIG. 16A to FIG. 16D are aberration diagrams in a case in which a combination of the objective 17 and the tube lens 10 is used. FIG. 16A illustrates spherical aberration, FIG. 16B illustrates a sine condition violation amount, FIG. 16C illustrates astigmatism, and FIG. 16D illustrates comatic aberration.

EXAMPLE 8

Figure 17:
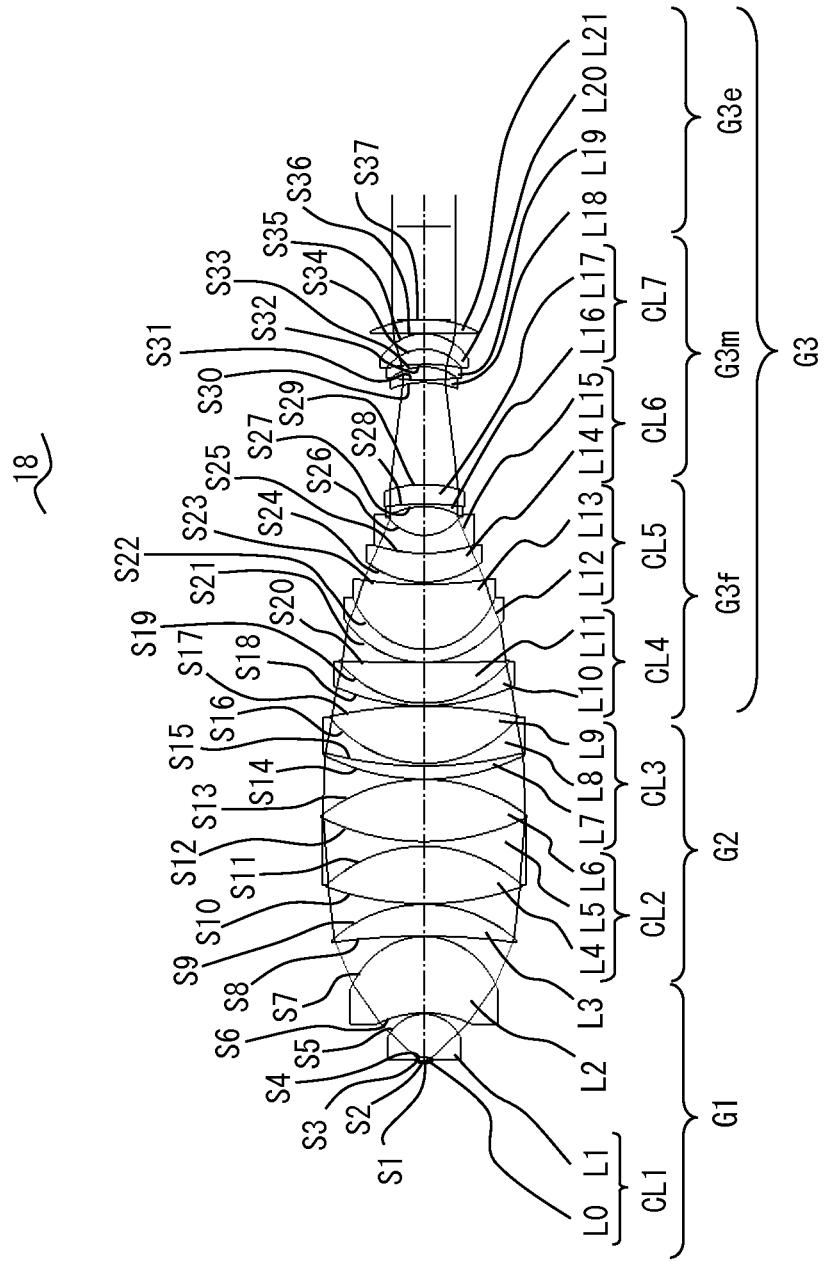
FIG. 17 is a sectional view of an objective in Example 8 of the present invention.

FIG. 17 is a sectional view of an objective 18 in this example. The objective 18 illustrated in FIG. 17 is an immersion type objective for a microscope. The objective 18 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a cemented lens CL1 (the first cemented lens) that is configured of a plano-convex lens L0 with a plane surface facing the object side and a meniscus lens L1 (the first lens) with negative refractive power with a concave surface facing the object side, a meniscus lens L2 (the second lens) with positive refractive power with a concave surface facing the object side, and a meniscus lens L3 (the third lens component) with positive refractive power with a concave surface facing the object side, in order from the object side.

The second lens group G2 is configured of a three-lens-cemented lens CL2 that is configured of a biconvex lens L4, a biconcave lens L5, and a biconvex lens L6, and a three-lens-cemented lens CL3 that is configured of a meniscus lens L7 (the sixth lens; TIH53 of OHARA INC.) with positive refractive power with a concave surface facing the image side, a meniscus lens L8 with negative refractive power with a concave surface facing the image side, and a biconvex lens L9, in order from the object side.

The third lens group G3 is configured of the 3f-th lens group (the front lens group), the 3m-th lens group (the intermediate lens group), and the 3e-th lens group (the rear lens group), in order from the object side. The 3f-th lens group is configured of a cemented lens CL4 that is configured of a meniscus lens L10 (the ninth lens) with negative refractive power with a concave surface facing the image side and a meniscus lens L11 (the eighth lens) with positive refractive power with a concave surface facing the image side, and a cemented lens CL5 that is configured of a meniscus lens L12 with negative refractive power with a concave surface facing the image side and a meniscus lens L13 with positive refractive power with a concave surface facing the image side, in order from the object side. The 3m-th lens group is configured of a cemented lens CL6 (the twelfth lens component) that is configured of a meniscus lens L14 with positive refractive power with a concave surface facing the image side and a meniscus lens L15 with negative refractive power with a concave surface facing the image side, and a cemented lens CL7 that is configured of a meniscus lens L16 with negative refractive power with a concave surface facing the object side and a meniscus lens L17 with positive refractive power with a concave surface facing the object side, in order from the object side. The 3e-th lens group is configured of a biconcave lens L18 (the eleventh lens component), a meniscus lens L19 (the fifth lens component) with negative refractive power with a concave surface facing the object side, a meniscus lens L20 (the fourth lens component) with negative refractive power with a concave surface facing the object side, and a meniscus lens L21 with positive refractive power with a concave surface facing the object side, in order from the object side.

Various pieces of data of the objective 18 are described below. The d-line (587.56 nm) is used for a reference wavelength. A refractive index $N_o$ of immersion liquid is 1.5148.

NA=1.3, FN=30 mm, $|\beta|=20$, $\epsilon=5.51E-04$ mm, f=9 mm, $f_{G1}=25.5$ mm, $r_{12}=-15.884$ mm, $d_{o12}=15.892$ mm, $\Phi_{max}/2=37.6$ mm, $h_{exp}=11.70$ mm, $f_{G3O}=117$ mm, $D_{oL}=240.000$ mm, $D_{ogF}=95.874$ mm, $f_{L2}=105.04$ mm, $f_{L3}=121.71$ mm Lens data of the objective 18 is described below.

| Objective 18 | | | | | |
|---|---|---|---|---|---|
| s | r | d | nd | vd | er |
| s1(object surface) | INF | 0.170 | 1.52347 | 54.41 | 0.75 |
| s2 | INF | 0.471 | 1.51486 | 41.00 | 1.03 |
| s3 | INF | 1.365 | 1.51635 | 64.14 | 1.82 |
| s4 | −7.1989 | 13.886 | 1.88306 | 40.76 | 3.00 |
| s5 | −15.8839 | 0.376 | | | 12.95 |
| s6 | −43.6099 | 24.634 | 1.5691 | 71.30 | 17.08 |
| s7 | −30.3807 | 0.142 | | | 26.86 |
| s8 | −280.6407 | 10.229 | 1.5691 | 71.30 | 33.43 |
| s9 | −56.2880 | 0.195 | | | 33.75 |
| s10 | 122.3257 | 18.520 | 1.43876 | 94.93 | 35.67 |
| s11 | −58.5812 | 1.528 | 1.63779 | 42.41 | 35.65 |
| s12 | 96.9456 | 20.013 | 1.43876 | 94.93 | 37.30 |
| s13 | −68.2221 | 0.100 | | | 37.50 |
| s14 | 92.5363 | 4.245 | 1.84676 | 23.78 | 36.98 |
| s15 | 161.2978 | 0.802 | 1.75504 | 52.32 | 36.81 |
| s16 | 48.4035 | 18.570 | 1.43876 | 94.93 | 34.52 |
| s17 | −179.2671 | 0.100 | | | 34.48 |
| s18 | 91.9859 | 0.800 | 1.75504 | 52.32 | 32.93 |
| s19 | 43.7277 | 13.061 | 1.43876 | 94.93 | 30.99 |
| s20 | 787.6851 | 0.100 | | | 30.90 |
| s21 | 38.5369 | 4.195 | 1.63779 | 42.41 | 29.04 |
| s22 | 29.3182 | 21.077 | 1.43876 | 94.93 | 25.91 |
| s23 | 187.4254 | 0.717 | | | 23.46 |
| s24 | 38.5544 | 9.316 | 1.49702 | 81.54 | 20.94 |
| s25 | 68.6319 | 5.690 | 1.73806 | 32.26 | 18.05 |
| s26 | 18.1926 | 9.271 | | | 13.54 |
| s27 | −30.8961 | 0.800 | 1.49702 | 81.54 | 13.53 |
| s28 | −129.8157 | 6.381 | 1.73806 | 32.26 | 13.80 |
| s29 | −48.9189 | 32.834 | | | 14.23 |
| s30 | −38.7296 | 0.800 | 1.61803 | 63.33 | 11.78 |
| s31 | 109.7621 | 4.288 | | | 12.03 |
| s32 | −22.5743 | 0.800 | 1.75504 | 52.32 | 12.06 |
| s33 | −81.3258 | 4.884 | | | 13.25 |
| s34 | −19.1249 | 4.983 | 1.73806 | 32.26 | 13.48 |
| s35 | −20.5477 | 0.100 | | | 15.77 |
| s36 | −7763.5563 | 4.558 | 1.88306 | 40.76 | 19.18 |
| s37 | −52.0532 | −94.014 | | | 19.38 |

The objective 18 satisfies conditional expressions (1) to (3) and (8) to (14), as described below.

Figure 18:
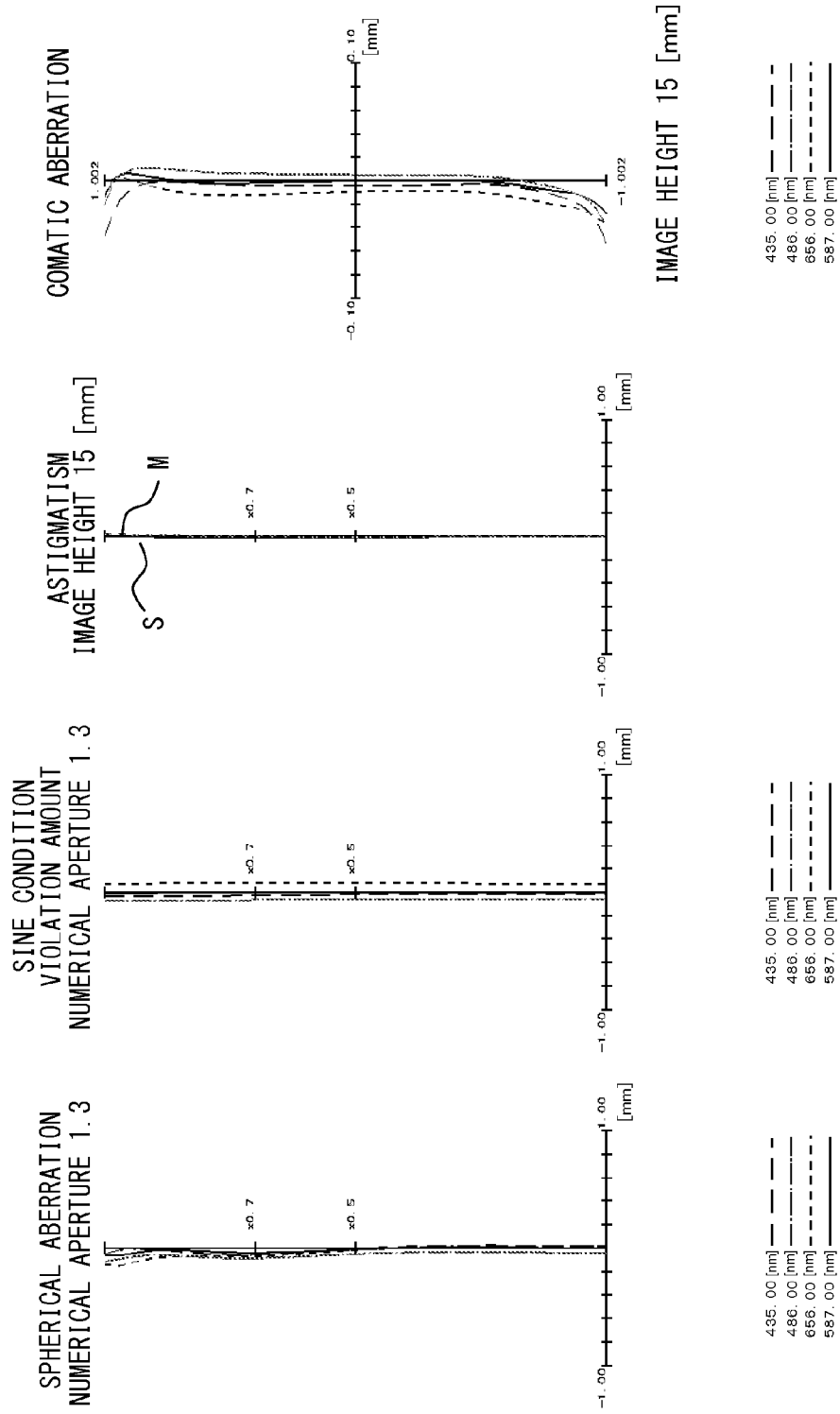
FIG. 18A to FIG. 18D are aberration diagrams in a case in which a combination of an objective illustrated in FIG. 17 and a tube lens illustrated in FIG. 3 is used, and respectively illustrate spherical aberration, a sine condition violation amount, astigmatism, and comatic aberration.

NA=1.3 (1), (8):

FN/$|\beta|$/$\epsilon$=2723 (2):

$\Phi_{max}/2/h_{exp}/NA=2.47$ (3):

$f_{G1}/f=2.83$ (9):

$r_{12}/d_{o12}=-1.00$ (10):

$D_{ogF}/D_{oL}=0.40$ (11):

$f/f_{G3O}=0.08$ (12):

$f_{G1}/f_{L2}=0.24$ (13):

$f_{G1}/f_{L3}=0.21$ (14):

FIG. 18A to FIG. 18D are aberration diagrams in a case in which a combination of the objective 18 and the tube lens 10 is used. FIG. 18A illustrates spherical aberration, FIG. 18B illustrates a sine condition violation amount, FIG. 18C illustrates astigmatism, and FIG. 18D illustrates comatic aberration.

EXAMPLE 9

Figure 19:
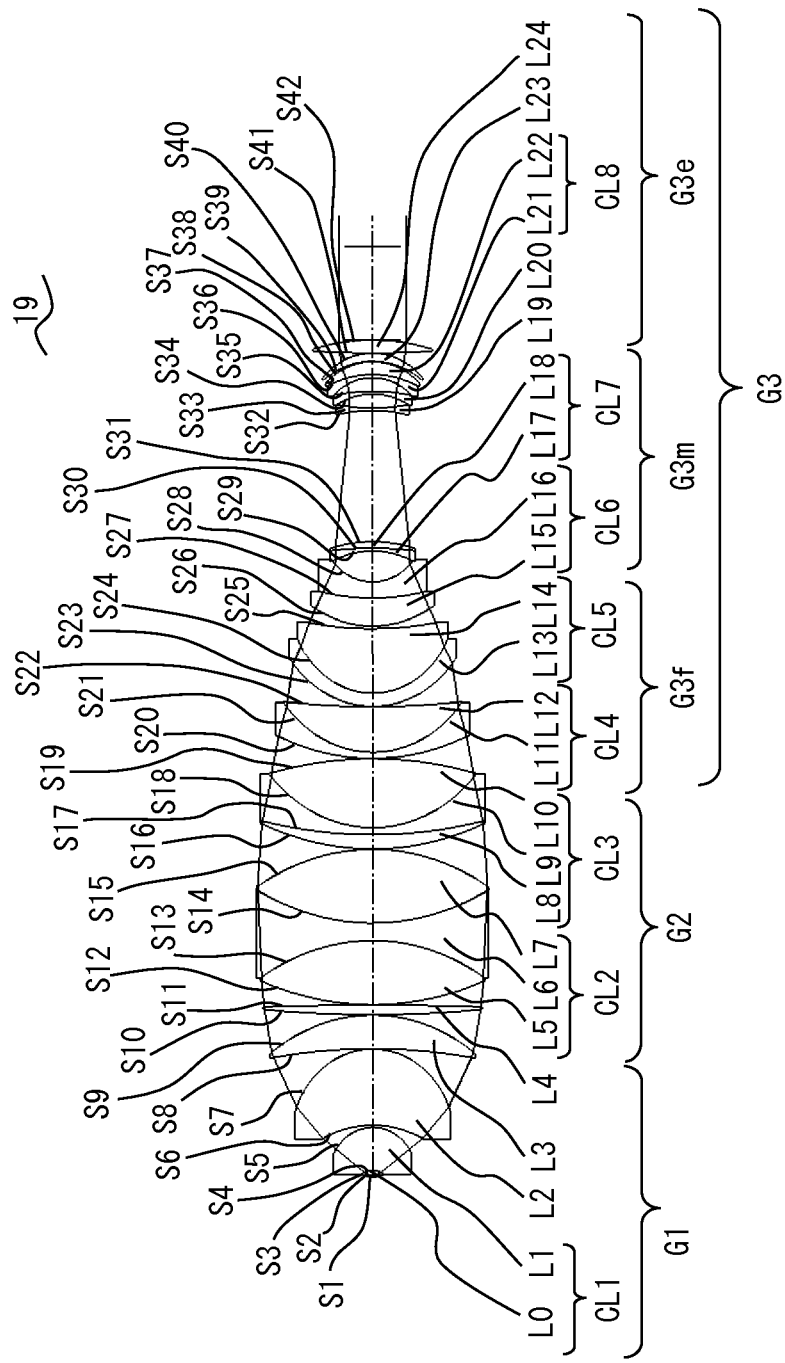
FIG. 19 is a sectional view of an objective in Example 9 of the present invention.

FIG. 19 is a sectional view of an objective 19 in this example. The objective 19 illustrated in FIG. 19 is an immersion type objective for a microscope. The objective 19 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a cemented lens CL1 (the first cemented lens) that is configured of a plano-convex lens L0 with a plane surface facing the object side and a meniscus lens L1 (the first lens) with negative refractive power with a concave surface facing the object side, a meniscus lens L2 (the second lens) with positive refractive power with a concave surface facing the object side, a meniscus lens L3 (the third lens component) with positive refractive power with a concave surface facing the object side, and a biconvex lens L4 (the seventh lens component), in order from the object side.

The second lens group G2 is configured of a three-lens-cemented lens CL2 that is configured of a biconvex lens L5, a biconcave lens L6, and a biconvex lens L7, and a three-lens-cemented lens CL3 that is configured of a meniscus lens L8 (the sixth lens; TIH53 of OHARA, INC.) with positive refractive power with a concave surface facing the image side, a meniscus lens L9 with negative refractive power with a concave surface facing the image side, and a biconvex lens L10, in order from the object side.

The third lens group G3 is configured of the 3f-th lens group (the front lens group), the 3m-th lens group (the intermediate lens group), and the 3e-th lens group (the rear lens group), in order from the object side. The 3f-th lens group is configured of a cemented lens CL4 that is configured of a meniscus lens L11 (the ninth lens) with negative refractive power with a concave surface facing the image side and a meniscus lens L12 (the eighth lens) with positive refractive power with a concave surface facing the image side, and a cemented lens CL5 that is configured of a meniscus lens L13 with negative refractive power with a concave surface facing the image side and a meniscus lens L14 with positive refractive power with a concave surface facing the image side, in order from the object side. The 3m-th lens group is configured of a cemented lens CL6 (the twelfth lens component) that is configured of a meniscus lens L15 with positive refractive power with a concave surface facing the image side and a meniscus lens L16 with negative refractive power with a concave surface facing the image side, and a cemented lens CL7 that is configured of a meniscus lens L17 with negative refractive power with a concave surface facing the object side and a meniscus lens L18 with positive refractive power with a concave surface facing the object side, in order from the object side. The 3e-th lens group is configured of a biconcave lens L19 (the eleventh lens component), a meniscus lens L20 (the fifth lens component) with negative refractive power with a concave surface facing the object side, a cemented lens CL8 (the fourth lens component) that is configured of a meniscus lens L21 with negative refractive power with a concave surface facing the object side and a meniscus lens L22 with positive refractive power with a concave surface facing the object side, a meniscus lens L23 with positive refractive power with a concave surface facing the object side, and a biconvex lens L24, in order from the object side.

Various pieces of data of the objective 19 are described below. The d-line (587.56 nm) is used for a reference wavelength. A refractive index $N_o$ of immersion liquid is 1.5148.

NA=1.35, FN=30 mm, |β|=20, ϵ=5.30E−04 mm, f=9 mm, $f_{G1}$=26.6 mm, $r_{12}$=−16.1427 mm, $d_{o12}$=15.983 mm, $\Phi_{max}/2$=42 mm, $h_{exp}$=12.15 mm, $f_{G3O}$=128.44 mm, $D_{oL}$=270.000 mm, $D_{ogF}$=110.373 mm, $f_{L2}$=108 mm, $f_{L3}$=145 mm Lens data of the objective 19 is described below.

| Objective 19 | | | | | |
|---|---|---|---|---|---|
| s | r | d | nd | vd | er |
| s1(object surface) | INF | 0.170 | 1.52347 | 54.41 | 0.75 |
| s2 | INF | 0.500 | 1.51486 | 41.00 | 1.06 |
| s3 | INF | 1.549 | 1.51635 | 64.14 | 2.01 |
| s4 | −6.7369 | 13.764 | 1.88306 | 40.76 | 3.30 |
| s5 | −16.1427 | 0.696 | | | 13.61 |
| s6 | −40.4034 | 24.581 | 1.5691 | 71.30 | 18.50 |
| s7 | −29.8313 | 0.100 | | | 27.90 |
| s8 | −230.6251 | 10.855 | 1.5691 | 71.30 | 36.23 |
| s9 | −61.8679 | 0.100 | | | 36.81 |
| s10 | 461.9394 | 3.119 | 1.5691 | 71.30 | 39.38 |
| s11 | −1334.3709 | 0.100 | | | 39.45 |
| s12 | 111.3362 | 20.692 | 1.43876 | 94.93 | 40.42 |
| s13 | −74.6831 | 5.662 | 1.63779 | 42.41 | 40.37 |
| s14 | 88.0169 | 23.795 | 1.43876 | 94.93 | 41.63 |
| s15 | −78.5986 | 0.100 | | | 41.80 |
| s16 | 103.7530 | 4.590 | 1.84676 | 23.78 | 40.51 |
| s17 | 184.2894 | 2.300 | 1.75504 | 52.32 | 40.33 |
| s18 | 49.4844 | 22.221 | 1.43876 | 94.93 | 37.07 |
| s19 | −150.7597 | 0.100 | | | 37.02 |
| s20 | 85.8487 | 2.000 | 1.75504 | 52.32 | 34.72 |
| s21 | 40.6690 | 14.643 | 1.43876 | 94.93 | 31.78 |
| s22 | 334.4963 | 0.100 | | | 31.67 |
| s23 | 37.3445 | 4.191 | 1.63779 | 42.41 | 29.82 |
| s24 | 29.7904 | 20.983 | 1.43876 | 94.93 | 26.73 |
| s25 | 138.8114 | 0.853 | | | 24.22 |
| s26 | 41.3866 | 8.957 | 1.49702 | 81.54 | 21.79 |
| s27 | 87.4837 | 5.226 | 1.73806 | 32.26 | 19.18 |
| s28 | 19.0760 | 9.956 | | | 14.46 |
| s29 | −34.4437 | 0.900 | 1.49702 | 81.54 | 14.44 |
| s30 | −151.4859 | 2.117 | 1.73806 | 32.26 | 14.74 |
| s31 | −55.0586 | 42.292 | | | 14.81 |
| s32 | −58.6989 | 0.800 | 1.61803 | 63.33 | 12.63 |
| s33 | 81.0144 | 4.508 | | | 12.80 |
| s34 | −26.3219 | 0.900 | 1.75504 | 52.32 | 12.83 |
| s35 | −78.6093 | 4.395 | | | 13.85 |
| s36 | −20.4267 | 1.009 | 1.88306 | 40.76 | 13.92 |
| s37 | −37.4278 | 4.143 | 1.73806 | 32.26 | 15.89 |
| s38 | −24.2264 | 0.100 | | | 16.63 |

-continued

| Objective 19 | | | | | |
|---|---|---|---|---|---|
| s | r | d | nd | vd | er |
| s39 | −29.1246 | 2.638 | 1.63779 | 42.41 | 17.21 |
| s40 | −24.7643 | 0.100 | | | 17.70 |
| s41 | 422.1492 | 4.197 | 1.88306 | 40.76 | 20.86 |
| s42 | −79.2452 | −106.731 | | | 21.00 |

The objective 19 satisfies conditional expressions (1) to (3) and (8) to (14), as described below.

$$NA=1.35 \quad (1), (8):$$

$$FN/|\beta|/\epsilon=2828 \quad (2):$$

$$\Phi_{max}/2/h_{exp}/NA=2.56 \quad (3):$$

$$f_{G1}/f=2.96 \quad (9):$$

$$r_{12}/d_{o12}=-1.01 \quad (10):$$

$$D_{ogF}/D_{oL}=0.41 \quad (11):$$

$$f/f_{G3O}=0.07 \quad (12):$$

$$f_{G1}/f_{L2}=0.25 \quad (13):$$

$$f_{G1}/f_{L3}=0.18 \quad (14):$$

Figure 20:
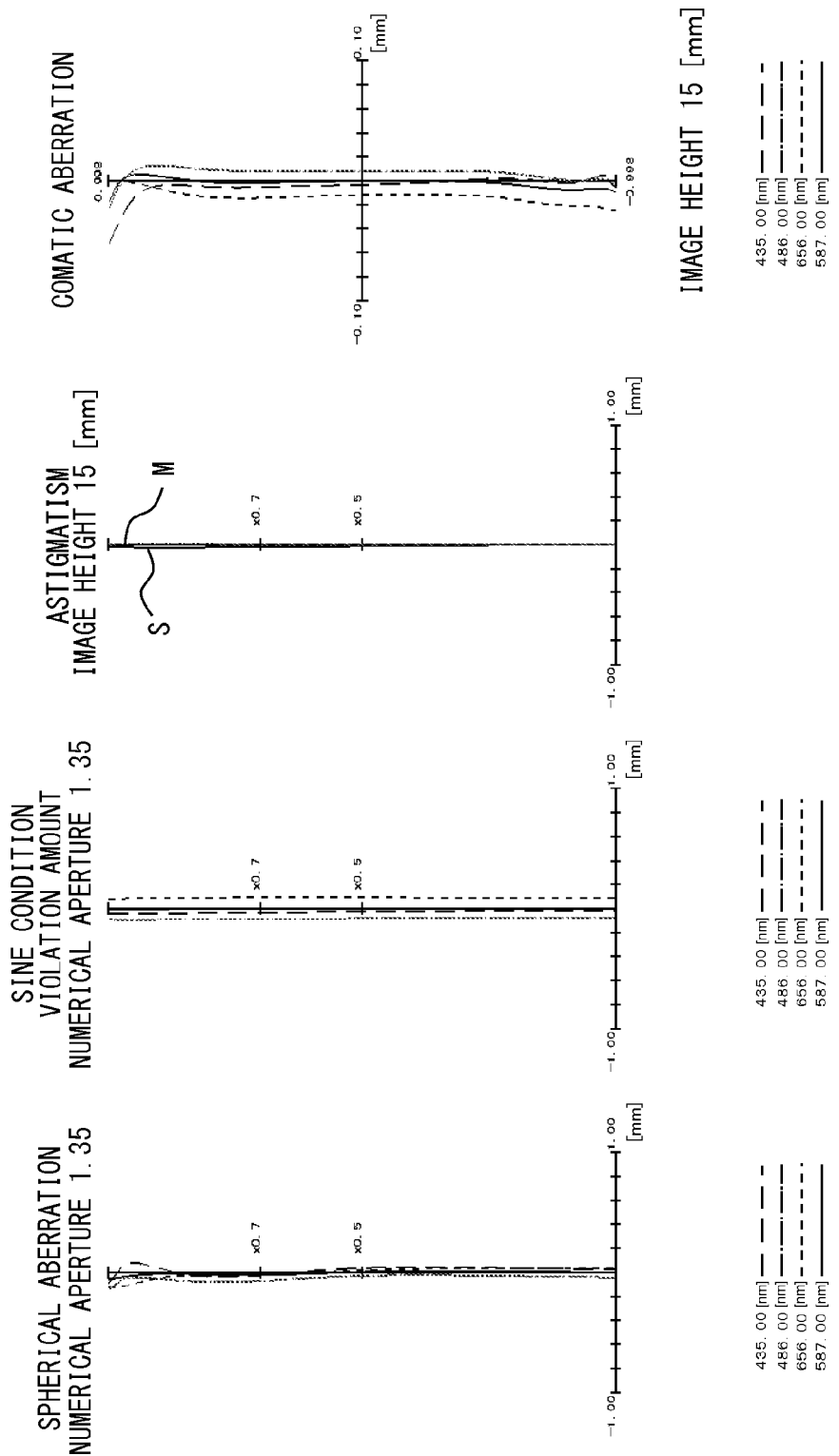
FIG. 20A to FIG. 20D are aberration diagrams in a case in which a combination of an objective illustrated in FIG. 19 and a tube lens illustrated in FIG. 3 is used, and respectively illustrate spherical aberration, a sine condition violation amount, astigmatism, and comatic aberration.

FIG. 20A to FIG. 20D are aberration diagrams in a case in which a combination of the objective 19 and the tube lens 10 is used. FIG. 20A illustrates spherical aberration, FIG. 20B illustrates a sine condition violation amount, FIG. 20C illustrates astigmatism, and FIG. 20D illustrates comatic aberration.

EXAMPLE 10

Figure 21:
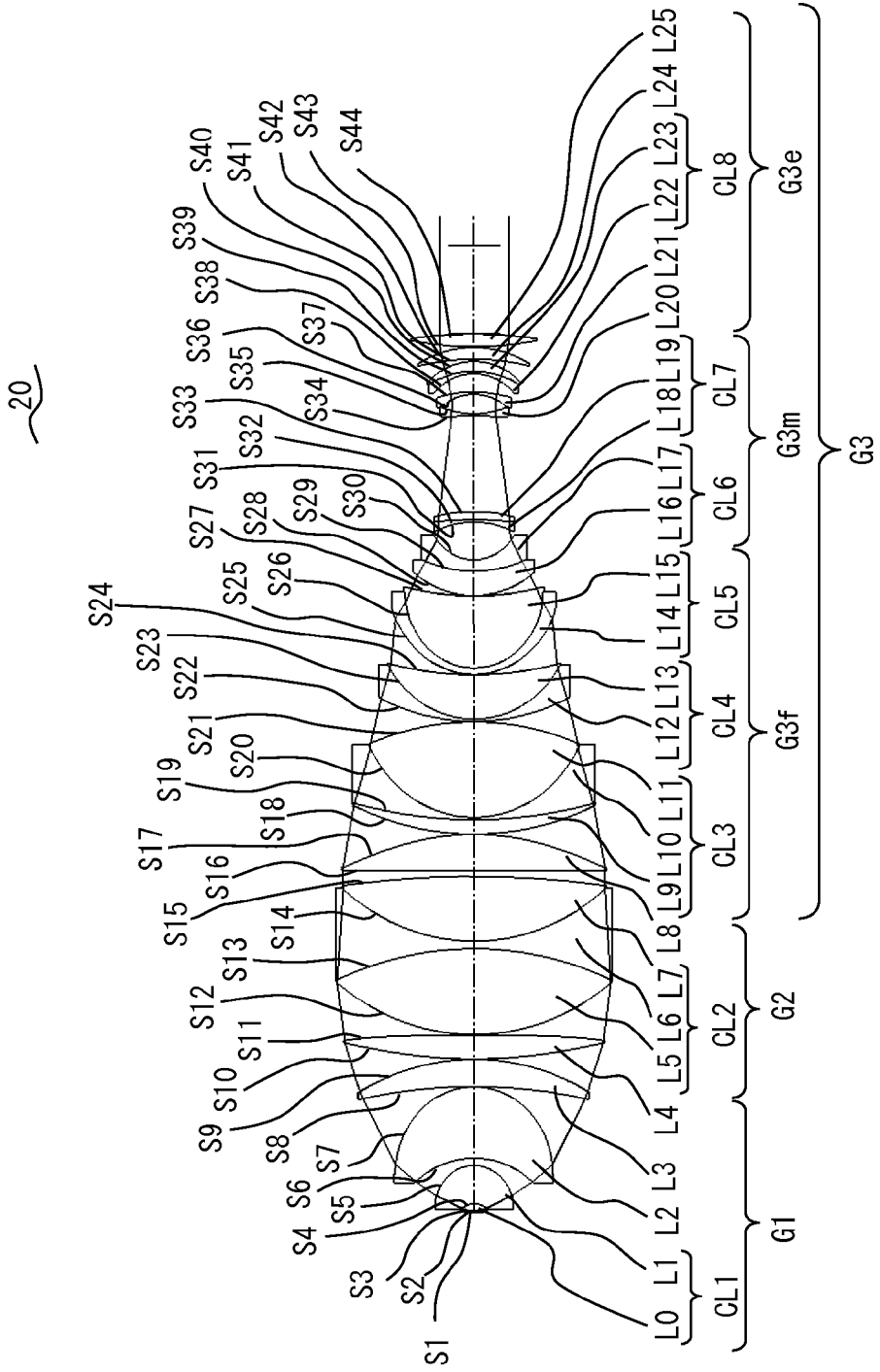
FIG. 21 is a sectional view of an objective in Example 10 of the present invention.

FIG. 21 is a sectional view of an objective 20 in this example. The objective 20 illustrated in FIG. 21 is an immersion type objective for a microscope. The objective 20 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a cemented lens CL1 (the first cemented lens) that is configured of a plano-convex lens L0 with a plane surface facing the object side and a meniscus lens L1 (the first lens) with negative refractive power with a concave surface facing the object side, a meniscus lens L2 (the second lens) with positive refractive power with a concave surface facing the object side, a meniscus lens L3 (the third lens component) with positive refractive power with a concave surface facing the object side, and a biconvex lens L4 (the seventh lens component), in order from the object side. The biconvex lens L4 is an aspherical lens for which both surfaces are formed so as to be aspherical.

The second lens group G2 is configured of a three-lens-cemented lens CL2 that is configured of a biconvex lens L5, a biconcave lens L6, and a biconvex lens L7, and a plano-convex lens L8 with a plane surface facing the object side, in order from the object side. The plane-convex lens L8 is an aspherical lens in which a lens surface of the image side is formed so as to be aspherical.

The third lens group G3 is configured of the 3f-th lens group (the front lens group), the 3m-th lens group (the intermediate lens group), and the 3e-th lens group (the rear lens group), in order from the object side. The 3f-th lens group is configured of a three-lens-cemented lens CL3 that is configured of a meniscus lens L9 (the sixth lens; TIH53 of OHARA, INC.) with positive refractive power with a concave surface facing the image side, a meniscus lens L10 with negative refractive power with a concave surface facing the image side, and a biconvex lens L11, a cemented lens CL4 that is configured of a meniscus lens L12 (the ninth lens) with negative refractive power with a concave surface facing the image side and a meniscus lens L13 (the eighth lens) with positive refractive power with a concave surface facing the image side, and a cemented lens CL5 that is configured of a meniscus lens L14 with negative refractive power with a concave surface facing the image side and a meniscus lens L15 with positive refractive power with a concave surface facing the image side, in order from the object side. The 3m-th lens group is configured of a cemented lens CL6 (the twelfth lens component) that is configured of a meniscus lens L16 with positive refractive power with a concave surface facing the image side and a meniscus lens L17 with negative refractive power with a concave surface facing the image side, and a cemented lens CL7 that is configured of a meniscus lens L18 with negative refractive power with a concave surface facing the object side and a meniscus lens L19 with positive refractive power with a concave surface facing the object side, in order from the object side. The 3e-th lens group is configured of a biconcave lens L20 (the eleventh lens component), a meniscus lens L21 (the fifth lens component) with negative refractive power with a concave surface facing the object side, a cemented lens CL8 (the fourth lens component) that is configured of a meniscus lens L22 with negative refractive power with a concave surface facing the object side and a meniscus lens L23 with positive refractive power with a concave surface facing the object side, a meniscus lens L24 with positive refractive power with a concave surface facing the object side, and a biconvex lens L25, in order from the object side. The biconcave lens L20 is an aspherical lens for which both surfaces are formed so as to be aspherical. The meniscus lens L21 and the biconvex lens L25 are aspherical lenses in which a lens surface on the object side is formed so as to be aspherical.

Various pieces of data of the objective 20 are described below. The d-line (587.56 nm) is used for a reference wavelength. A refractive index $N_o$ of immersion liquid is 1.5148.

NA=1.45, FN=30 mm, $|\beta|$=20, $\epsilon$=4.94E−04 mm, f=9 mm, $f_{G1}$=26.9 mm, $r_{12}$=−14.9778 mm, $d_{o12}$=16.116 mm, $\Phi_{max}/2$=51.9 mm, $h_{exp}$=13.05 mm, $f_{G3O}$=94.24 mm, $D_{oL}$=300.000 mm, $D_{ogF}$=134.067 mm, $f_{L2}$=137.033 mm, $f_{L3}$=270.96 mm Lens data of the objective 20 is described below.

| Objective 20 | | | | | |
|---|---|---|---|---|---|
| s | r | d | nd | vd | er |
| s1(object surface) | INF | 0.170 | 1.52347 | 54.41 | 0.75 |
| s2 | INF | 0.655 | 1.51486 | 41.00 | 1.25 |
| s3 | INF | 2.192 | 1.51635 | 64.14 | 3.31 |
| s4 | −7.9038 | 13.099 | 1.88306 | 40.76 | 4.88 |
| s5 | −14.9779 | 2.533 | | | 14.26 |

-continued

Objective 20

| s | r | d | nd | vd | er |
|---|---|---|---|---|---|
| s6 | −34.1464 | 24.266 | 1.5691 | 71.30 | 22.10 |
| s7 | −29.8689 | 0.127 | | | 29.68 |
| s8 | −211.5322 | 9.249 | 1.5691 | 71.30 | 42.08 |
| s9 | −90.6020 | 0.100 | | | 43.14 |
| s10* | 206.0617 | 8.203 | 1.5691 | 71.30 | 48.83 |
| s11* | −902.4320 | 0.100 | | | 48.96 |
| s12 | 84.4233 | 29.394 | 1.43876 | 94.93 | 51.76 |
| s13 | −131.1968 | 2.488 | 1.63779 | 42.41 | 51.60 |
| s14 | 77.5618 | 22.136 | 1.43876 | 94.93 | 49.55 |
| s15 | −399.1036 | 2.027 | | | 49.60 |
| s16 | INF | 12.359 | 1.43876 | 94.93 | 49.60 |
| s17* | −99.6579 | 0.100 | | | 49.60 |
| s18 | 112.6466 | 4.869 | 1.84676 | 23.78 | 45.58 |
| s19 | 185.5705 | 0.800 | 1.75504 | 52.32 | 45.32 |
| s20 | 44.4911 | 32.698 | 1.43876 | 94.93 | 39.48 |
| s21 | −107.8277 | 0.100 | | | 39.44 |
| s22 | 83.7721 | 0.800 | 1.75504 | 52.32 | 35.73 |
| s23 | 38.1549 | 15.109 | 1.43876 | 94.93 | 32.22 |
| s24 | 141.2766 | 0.100 | | | 32.08 |
| s25 | 32.5170 | 2.177 | 1.63779 | 42.41 | 30.58 |
| s26 | 26.0501 | 24.782 | 1.43876 | 94.93 | 26.04 |
| s27 | 114.8265 | 0.100 | | | 25.08 |
| s28 | 37.1811 | 8.297 | 1.49702 | 81.54 | 22.33 |
| s29 | 51.6704 | 3.874 | 1.73806 | 32.26 | 19.42 |
| s30 | 17.8456 | 12.898 | | | 14.73 |
| s31 | −35.4780 | 0.800 | 1.49702 | 81.54 | 14.41 |
| s32 | −150.7254 | 2.764 | 1.73806 | 32.26 | 14.57 |
| s33 | −61.1012 | 32.508 | | | 14.66 |
| s34* | −497.5063 | 0.800 | 1.61803 | 63.33 | 12.48 |
| s35* | 29.8465 | 6.746 | | | 12.29 |
| s36* | −20.0794 | 0.800 | 1.75504 | 52.32 | 12.31 |
| s37 | −52.3966 | 6.143 | | | 13.65 |
| s38 | −20.6189 | 0.800 | 1.88306 | 40.76 | 14.61 |
| s39 | −34.5889 | 3.515 | 1.73806 | 32.26 | 16.51 |
| s40 | −24.7079 | 0.762 | | | 17.12 |
| s41 | −94.2453 | 3.952 | 1.63779 | 42.41 | 20.30 |
| s42 | −42.7157 | 0.179 | | | 20.66 |
| s43* | 112.0266 | 4.428 | 1.88306 | 40.76 | 23.36 |
| s44 | −180.0961 | −118.512 | | | 23.00 |

Aspherical data of the objective 20 is described below.
Tenth Surface s10
K=−0.7052 A4=1.849E−08 A6=−1.547E−11 A8=−1.063E−14 A10=0
Eleventh Surface s11
K=−92.9161 A4=2.085E−08 A6=−3.402E−11 A8=−1.112E−14 A10=0
Seventeenth Surface s17
K=−0.4340 A4=2.270E−07 A6=1.494E−11 A8=−4.829E−15 A10=0
Thirty-Fourth Surface s34
K=−92.9382 A4=−9.240E−06 A6=1.262E−07 A8=−2.565E−10 A10=0
Thirty-Fifth Surface s35
K=−3.2850 A4=−1.357E−05 A6=9.443E−08 A8=−2.053E−10 A10=0
Thirty-Sixth Surface s36
K=−0.0104 A4=−1.169E−06 A6=−1.636E−08 A8=−9.606E−11 A10=0
Forth-Third Surface s43
K=−18.5319 A4=−1.484E−07 A6=0 A8=0 A10=0

The objective 20 satisfies conditional expressions (1) to (3) and (8) to (14), as described below.

$$NA=1.45 \quad (1), (8):$$

$$FN/|\beta|/\epsilon=3037 \quad (2):$$

$$\Phi_{max}/2/h_{exp}/NA=2.74 \quad (3):$$

$$f_{G1}/f=2.99 \quad (9):$$

$$r_{12}/d_{o12}=-0.93 \quad (10):$$

$$D_{ogF}/D_{oL}=0.45 \quad (11):$$

$$f/f_{G3O}=0.10 \quad (12):$$

$$f_{G1}/f_{L2}=0.20 \quad (13):$$

$$f_{G1}/f_{L3}=0.10 \quad (14):$$

Figures 22A, 22B, 22C, 22D:
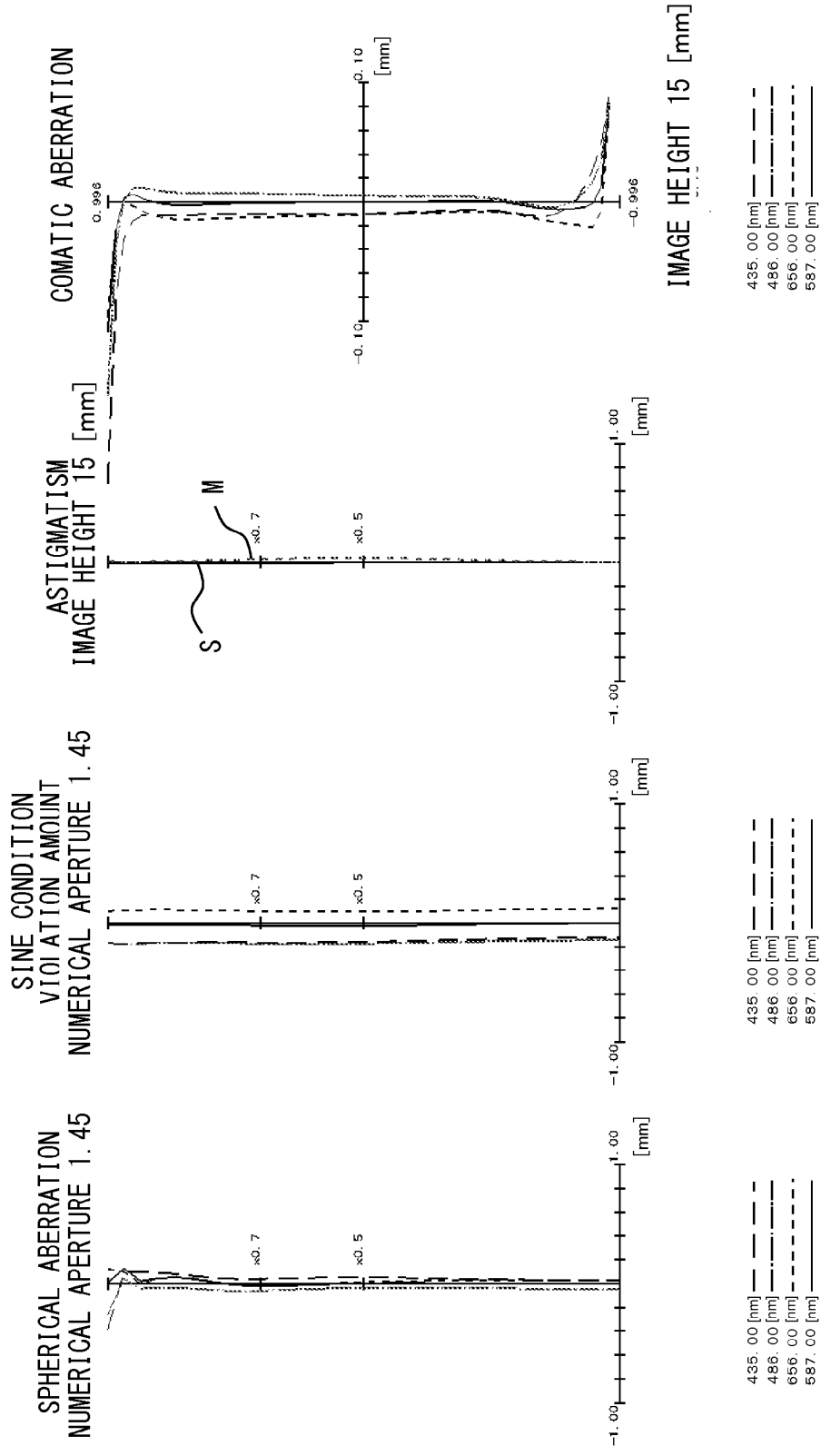
FIG. 22A to FIG. 22D are aberration diagrams in a case in which a combination of an objective illustrated in FIG. 21 and a tube lens illustrated in FIG. 3 is used, and respectively illustrate spherical aberration, a sine condition violation amount, astigmatism, and comatic aberration.

FIG. 22A to FIG. 22D are aberration diagrams in a case in which a combination of the objective 20 and the tube lens 10 is used. FIG. 22A illustrates spherical aberration, FIG. 22B illustrates a sine condition violation amount, FIG. 22C illustrates astigmatism, and FIG. 22D illustrates comatic aberration.

EXAMPLE 11

Figure 23:
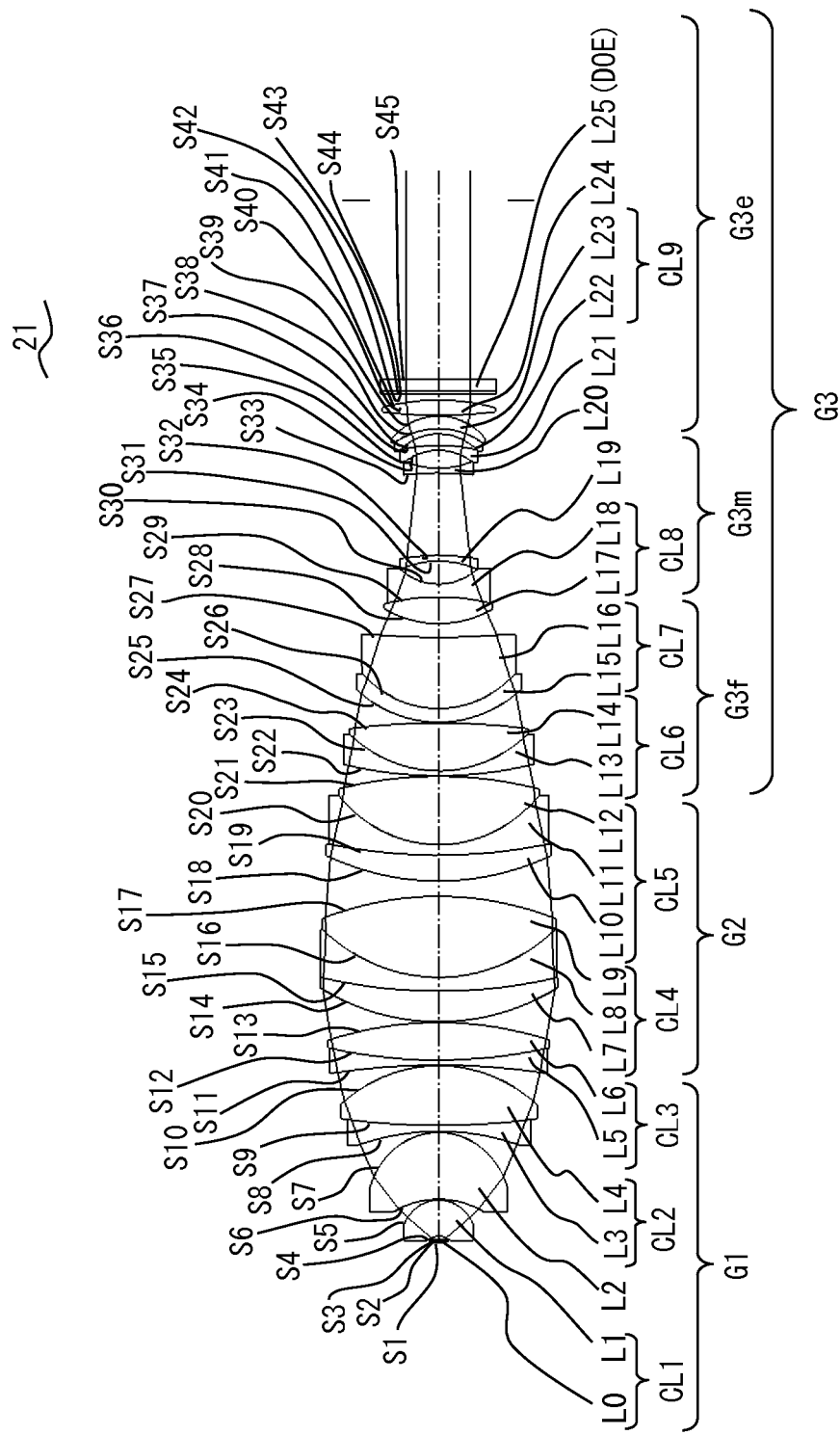
FIG. 23 is a sectional view of an objective in Example 11 of the present invention.

FIG. 23 is a sectional view of an objective 21 in this example. The objective 21 illustrated in FIG. 23 is an immersion type objective for a microscope. The objective 21 is configured of the first lens group G1 with positive refractive power, the second lens group G2 with positive refractive power that includes a cemented lens that is configured of a lens with positive refractive power that is made of a low dispersion material and a lens with negative refractive power that is made of a high dispersion material, and the third lens group G3 with negative refractive power, in order from the object side.

The first lens group G1 is configured of a cemented lens CL1 (the first cemented lens) that is configured of a plano-convex lens L0 with a plane surface facing the object side and a meniscus lens L1 (the first lens) with negative refractive power with a concave surface facing the object side, a meniscus lens L2 (the second lens) with positive refractive power with a concave surface facing the object side, a cemented lens CL2 (the third lens component) that is configured of a biconcave lens L3 and a biconvex lens L4, and a cemented lens CL3 (the seventh lens component) that is configured of a biconcave lens L5 and a biconvex lens L6, in order from the object side.

The second lens group G2 is configured of a three-lens-cemented lens CL4 that is configured of a meniscus lens L7 with positive refractive power with a concave surface facing the image side, a meniscus lens L8 with negative refractive power with a concave surface facing the image side, and a biconvex lens L9, and a three-lens-cemented lens CL5 that is configured of a meniscus lens L10 (the sixth lens; TIH53 of OHARA, INC.) with positive refractive power with a concave surface facing the image side, a meniscus lens L11 with negative refractive power with a concave surface facing the image side, and a biconvex lens L12, in order from the object side.

The third lens group G3 is configured of the 3f-th lens group (the front lens group), the 3m-th lens group (the intermediate lens group), and the 3e-th lens group (the rear lens group), in order from the object side. The 3f-th lens group is configured of a cemented lens CL6 that is configured of a meniscus lens L13 (the ninth lens) with negative refractive power with a concave surface facing the image side and a biconvex lens L14 (the eighth lens), and a cemented lens CL7 that is configured of a meniscus lens L15 with negative refractive power with a concave surface facing the image side and a meniscus lens L16 with positive refractive power with a concave surface facing the image side, in order from the object side. The 3m-th lens group is configured of a cemented lens CL8 (the twelfth lens component) that is configured of a biconvex lens L17 and a biconcave lens L18, and a meniscus lens L19 with negative refractive power with a concave surface facing the object side, in order from the object side. The 3e-th lens group is configured of a biconcave lens L20 (the eleventh lens component), a meniscus lens L21 (the fifth lens component) with negative refractive power with a concave surface facing the object side, a cemented lens CL9 (the fourth lens component) that is configured of a meniscus lens L22 with negative refractive power with a concave surface facing the object side and a meniscus lens L23 with positive refractive power with a concave surface facing the object side, a biconvex lens L24, and a diffractive optical element (DOE) L25, in order from the object side.

Various pieces of data of the objective 21 are described below. The d-line (587.56 nm) is used for a reference wavelength. A refractive index $N_o$ of immersion liquid is 1.5148.

NA=1.3, FN=30 mm, $|\beta|$=40, $\epsilon$=5.51E−04 mm, f=4.5 mm, $f_{G1}$=14.30 mm, $r_{12}$=−6.990 mm, $d_{o12}$=7.199 mm, $\Phi_{max}/2$=21.32 mm, $h_{exp}$=5.85 mm, $f_{G3O}$=69.74 mm, $D_{oL}$=145.000 mm, $D_{ogF}$=65.076 mm, $f_{L2}$=49.55 mm, $f_{L3}$=117.33 mm Lens data of the objective 21 is described below. A surface number s44 indicates a lens surface shape in a case in which a diffractive optical element is replaced with a virtual lens (an ultra-high index lens) having extremely great refractive power.

| Objective 21 | | | | | |
|---|---|---|---|---|---|
| s | r | d | nd | vd | er |
| s1 (object surface) | INF | 0.170 | 1.52347 | 54.41 | 0.38 |
| s2 | INF | 0.333 | 1.51486 | 41.00 | 0.66 |
| s3 | INF | 0.618 | 1.51635 | 64.14 | 1.24 |
| s4 | −3.2999 | 6.078 | 1.88306 | 40.76 | 1.59 |
| s5 | −6.9896 | 0.121 | | | 5.91 |
| s6 | −17.4528 | 11.219 | 1.5691 | 71.30 | 7.74 |
| s7 | −13.2943 | 0.194 | | | 12.15 |
| s8 | −48.9021 | 0.980 | 1.63779 | 42.41 | 14.73 |
| s9 | 146.3471 | 10.058 | 1.5691 | 71.30 | 16.37 |
| s10 | −28.2615 | 0.100 | | | 17.61 |
| s11 | −141.0081 | 0.802 | 1.63779 | 42.41 | 18.79 |
| s12 | 100.4622 | 6.354 | 1.5691 | 71.30 | 19.57 |
| s13 | −70.7737 | 0.100 | | | 19.90 |
| s14 | 44.9582 | 5.106 | 1.43876 | 94.93 | 21.32 |
| s15 | 106.1692 | 2.298 | 1.63779 | 42.41 | 21.26 |
| s16 | 32.5030 | 13.613 | 1.43876 | 94.93 | 20.84 |
| s17 | −63.5018 | 2.579 | | | 20.97 |
| s18 | 52.2478 | 4.354 | 1.84676 | 23.78 | 20.20 |
| s19 | 112.2228 | 1.743 | 1.75504 | 52.32 | 19.73 |
| s20 | 24.7453 | 11.491 | 1.43876 | 94.93 | 17.94 |
| s21 | −82.1758 | 0.100 | | | 17.81 |
| s22 | 81.6786 | 0.803 | 1.75504 | 52.32 | 16.99 |
| s23 | 24.9223 | 8.083 | 1.43876 | 94.93 | 15.97 |
| s24 | −136.1825 | 0.100 | | | 15.84 |
| s25 | 23.8425 | 2.286 | 1.75504 | 52.32 | 14.71 |
| s26 | 19.9624 | 12.027 | 1.43876 | 94.93 | 13.63 |
| s27 | 162.1933 | 2.258 | | | 11.34 |
| s28 | 21.5140 | 4.479 | 1.60303 | 65.44 | 9.49 |
| s29 | −43.3478 | 2.154 | 1.73806 | 32.26 | 8.85 |
| s30 | 11.2466 | 3.863 | | | 6.73 |
| s31 | −18.7530 | 0.962 | 1.49702 | 81.54 | 6.66 |
| s32 | −43.9945 | 13.831 | | | 6.68 |
| s33 | −64.0343 | 0.800 | 1.60303 | 65.44 | 5.86 |
| s34 | 17.2665 | 3.000 | | | 5.86 |
| s35 | −10.9759 | 0.840 | 1.75504 | 52.32 | 5.91 |
| s36 | −32.8559 | 1.928 | | | 6.66 |
| s37 | −10.5993 | 0.879 | 1.43876 | 94.93 | 6.76 |
| s38 | −14.9478 | 2.126 | 1.73806 | 32.26 | 7.56 |

-continued

| Objective 21 | | | | | |
|---|---|---|---|---|---|
| s | r | d | nd | vd | er |
| s39 | −11.6319 | 0.100 | | | 8.11 |
| s40 | 89.1554 | 2.572 | 1.88306 | 40.76 | 9.75 |
| s41 | −43.4106 | 1.000 | | | 9.89 |
| s42 | INF | 0.500 | 1.61006 | 27.48 | 10.06 |
| s43 | INF | 0 | 1000 | −3.45 | 10.09 |
| s44* | 6076000 | 2.000 | 1.63768 | 34.21 | 10.09 |
| s45 | INF | −51.001 | | | 10.19 |

Aspherical data of the objective 21 is described below.
Forty-Fourth Surface s44
K=0 A4=1.645E−10 A6=8.451E−13 A8=0 A10=0

The objective 21 satisfies conditional expressions (1) to (3) and (8) to (14), as described below.

$$NA=1.3 \qquad (1), (8):$$

$$FN/|\beta|/\epsilon=1361 \qquad (2):$$

$$\Phi_{max}/2/h_{exp}/NA=2.80 \qquad (3):$$

$$f_{G1}/f=3.18 \qquad (9):$$

$$r_{12}/d_{o12}=-0.97 \qquad (10):$$

$$D_{ogF}/D_{oL}=0.45 \qquad (11):$$

$$f/f_{G3O}=0.06 \qquad (12):$$

$$f_{G1}/f_{L2}=0.29 \qquad (13):$$

$$f_{G1}/f_{L3}=0.12 \qquad (14):$$

FIG. 24A to FIG. 24D are aberration diagrams in a case in which a combination of the objective 21 and the tube lens 10 is used. FIG. 24A illustrates spherical aberration, FIG. 24B illustrates a sine condition violation amount, FIG. 24C illustrates astigmatism, and FIG. 24D illustrates comatic aberration.

Lastly, the tube lens 10 illustrated in FIG. 3, which is used in common in Example 1 to Example 11, is described. The tube lens 10 is a tube lens for a microscope that is used in combination with an infinity correction type objective so as to form a magnified image of an object. The tube lens 10 is configured of the first lens group G1 with positive power that includes a cemented lens CL1, the second lens group G2 with negative power, and the third lens group G3 having positive power as a whole that is configured of a plurality of lenses (L6 and L7) that each have positive power, in order from the object side.

The first lens group G1 is configured of a biconvex lens L1, and a cemented lens CL1 that is configured of a biconvex lens L2 and a biconcave lens L3, in order from the object side. The second lens group G2 is configured of a cemented lens CL2 that is configured of a biconcave lens L4 and a biconvex lens L5, in order from the object side. The third lens group G3 is configured of a meniscus lens L6 with positive power with a concave surface facing the object side, and a biconvex lens L7, in order from the object side. Each of the first lens and the second lens has a meniscus shape.

Lens data of the tube lens 10 is described below. "INF" in the lens data represents infinity (∞).

Tube lens 10

| s | r | d | nd | vd |
|---|---|---|---|---|
| s1 | INF | 162.2 | | |
| s2 | 63.8523 | 9.3326 | 1.497 | 81.54 |
| s3 | −1485.8995 | 3.1666 | | |
| s4 | 39.1423 | 13.9864 | 1.497 | 81.54 |
| s5 | −145.3496 | 6 | 1.51633 | 64.14 |
| s6 | 26.8639 | 20.2953 | | |
| s7 | −53.5928 | 8.0905 | 1.72047 | 34.71 |
| s8 | 110.3106 | 7.877 | 1.43875 | 94.93 |
| s9 | −130 | 14.8023 | | |
| s10 | −288.1082 | 6 | 1.59522 | 67.74 |
| s11 | −114.1428 | 0.4703 | | |
| s12 | 176.2945 | 6 | 1.85026 | 32.27 |
| s13 | −475.1754 | | | |

What is claimed is:

1. An immersion type objective for a microscope, the immersion type objective comprising in order from an object side:
a first lens group with positive refractive power;
a second lens group with positive refractive power, the second lens group including a cemented lens that is configured of a lens with positive refractive power that is made of a low dispersion material and a lens with negative refractive power that is made of a high dispersion material; and
a third lens group with negative refractive power, wherein:
the first lens group includes in order from the object side:
a first lens that is a single lens having a meniscus shape with a concave surface facing the object side, or a first cemented lens that is configured of the first lens and a lens arranged on the object side of the first lens;
a second lens that a single lens with positive refractive power, the single lens having a meniscus shape with a concave surface facing the object side; and
a third lens component that is a single lens or cemented lens with positive refractive power,
the third lens group includes a rear lens group with negative refractive power closest to an image side,
the rear lens group includes:
a fourth lens component that is a single lens or cemented lens having a meniscus shape with a concave surface facing the object side; and
a fifth lens component that is arranged closer to the object side than the fourth lens component and that is a single lens or cemented lens with negative refractive power with a concave surface facing the object side, and
when NA represents a numerical aperture of the objective, f represents a focal length of the objective, $f_{G1}$ represents a focal length of the first lens group, $r_{12}$ represents a radius of curvature of a lens surface on the image side of the first lens, and $d_{o12}$ represents a distance on an optical axis from a front-side focal plane of the objective to a lens surface on the image side of the first lens, the objective satisfies the following conditional expressions:

$$0.8 \leq NA \leq 1.5 \quad (8)$$

$$2.3 \leq f_{G1}/f \leq 8 \quad (9)$$

$$-1.5 \leq r_{12}/d_{o12} \leq -0.75 \quad (10).$$

2. The objective according to claim 1, wherein the rear lens group further includes:
an eleventh lens component that is arranged closer to the object side than the fourth lens component and that is a single lens or cemented lens with negative refractive power.

3. The objective according to claim 1, wherein:
the third lens group includes:
a front lens group arranged closest to the object side; and
an intermediate lens group arranged between the front lens group and the rear lens group, and
the intermediate lens group includes a twelfth lens component that is configured of a single lens or cemented lens having a meniscus shape with a convex surface facing the object side.

4. The objective according to claim 1 wherein the third lens component has a meniscus shape with a concave surface facing the object side.

5. The objective according to claim 1, further comprising:
a sixth lens with positive refractive power that is made of a material having a high partial dispersion,
wherein, when $D_{ogF}$ represents a distance on the optical axis from the front-side focal plane of the objective to a lens surface on the image side of the sixth lens, and $D_{oL}$ represents a distance on the optical axis from the front-side focal plane of the objective to a lens surface closest to the image side in the objective, the objective satisfies the following conditional expression:

$$0.2 \leq D_{ogF}/D_{oL} \leq 0.87 \quad (11).$$

6. The objective according to claim 1, wherein the first lens group includes a seventh lens component that is a single lens or cemented lens with positive refractive power, closer to the image side than the third lens component.

7. The objective according to claim 1, wherein:
the third lens group includes a front lens group closest to the object side,
the front lens group includes:
an eighth lens with positive refractive power that is made of a low dispersion material; and
a ninth lens with negative refractive power that is made of a high dispersion material, the eighth lens and the ninth lens being arranged so as to be adjacent to each other,
a lens surface on a ninth-lens side of the eighth lens and a lens surface on an eighth lens-side of the ninth lens have a radius of curvature having the same sign, and
when $f_{G3O}$ represents a focal length of the front lens group, the objective satisfies the following conditional expression:

$$-0.3 \leq f/f_{G3O} \leq 0.3 \quad (12).$$

8. A dry objective for a microscope, the dry objective comprising in order from an object side: a first lens croup with positive refractive power; a second lens group with positive refractive power, the second lens group including a cemented lens that is configured of a lens with positive refractive power that is made of a low dispersion material and a lens with negative refractive power that is made of a high dispersion material; and a third lens croup with negative refractive power, wherein: the first lens group includes in order from the object side: a first lens that is a single lens having a meniscus shape with a concave surface facing the object side; a second lens that is a single lens with positive refractive power, the single lens having a meniscus shape with a concave surface facing the object side; and a third lens component that is a single lens or cemented lens with positive refractive power, when NA represents a numerical aperture of the objective, f represents a focal length of the objective, $f_{G1}$ represents a focal length of the first lens group, $r_{11}$ represents a radius of curvature of a lens surface on the object side of the first lens, $r_{12}$ represents a radius of curvature of a lens surface on an image side of the first lens, and $d_{o12}$ represents a distance on an optical axis from a front-side focal plane of the objective to a lens surface on the image side of the first lens, the objective satisfies the following conditional expressions:

$$0.8 \leq NA < 1 \quad (4)$$

$$1.6 \leq f_{G1}/f \leq 6 \quad (5)$$

$$-1.6 \leq r_{11}/f \leq -0.2 \quad (6)$$

$$-2 \leq r_{12}/d_{o12} \leq -0.86 \quad (7)$$

the objective further comprises a sixth lens with positive refractive power that is made of a material having a high partial dispersion, and when $D_{ogF}$ represents a distance on the optical axis from the front-side focal plane of the objective to a lens surface on the image side of the sixth lens, and $D_{oL}$ represents a distance on the optical axis from the front-side focal plane of the objective to a lens surface closest to the image side in the objective, the objective satisfies the following conditional expression:

$$0.2 \leq D_{ogF}/D_{oL} \leq 0.87 \quad (11).$$

9. A dry objective for a microscope, the dry objective comprising in order from an object side:
a first lens group with positive refractive power;
a second lens group with positive refractive power, the second lens group including a cemented lens that is configured of a lens with positive refractive power that is made of a low dispersion material and a lens with negative refractive power that is made of a high dispersion material; and
a third lens group with negative refractive power,
wherein:
the first lens group includes in order from the object side:
  a first lens that is a single lens having a meniscus shape with a concave surface facing the object side;
  a second lens that is a single lens with positive refractive power, the single lens having a meniscus shape with a concave surface facing the object side; and
  a third lens component that is a single lens or cemented lens with positive refractive power, and
when NA represents a numerical aperture of the objective, f represents a focal length of the objective, $f_{G1}$ represents a focal length of the first lens group, $r_{11}$ represents a radius of curvature of a lens surface on the object side of the first lens, $r_{12}$ represents a radius of curvature of a lens surface on an image side of the first lens, $d_{o12}$ represents a distance on an optical axis from a front-side focal plane of the objective to a lens surface on the image side of the first lens, and $f_{L2}$ represents a focal length of the second lens, the objective satisfies the following conditional expressions:

$$0.8 \leq NA < 1 \quad (4)$$

$$1.6 \leq f_{G1}/f \leq 6 \quad (5)$$

$$-1.6 \leq r_{11}/f \leq -0.2 \quad (6)$$

$$-2 \leq r_{12}/d_{o12} \leq -0.86 \quad (7)$$

$$0.05 \leq f_{G1}/f_{L2} \leq 0.6 \quad (13).$$

10. A dry objective for a microscope, the dry objective comprising in order from an object side:
a first lens group with positive refractive power;
a second lens group with positive refractive power, the second lens group including a cemented lens that is configured of a lens with positive refractive power that is made of a low dispersion material and a lens with negative refractive power that is made of a high dispersion material; and
a third lens group with negative refractive power,
wherein:
the first lens group includes in order from the object side:
  a first lens that is a single lens having a meniscus shape with a concave surface facing the object side;
  a second lens that is a single lens with positive refractive power, the single lens having a meniscus shape with a concave surface facing the object side; and
  a third lens component that is a single lens or cemented lens with positive refractive power, and
when NA represents a numerical aperture of the objective, f represents a focal length of the objective, $f_{G1}$ represents a focal length of the first lens group, $r_{11}$ represents a radius of curvature of a lens surface on the object side of the first lens, $r_{12}$ represents a radius of curvature of a lens surface on an image side of the first lens, $d_{o12}$ represents a distance on an optical axis from a front-side focal plane of the objective to a lens surface on the image side of the first lens, and $f_{L3}$ represents a focal length of the third lens component, the objective satisfies the following conditional expressions:

$$0.8 \leq NA < 1 \quad (4)$$

$$1.6 \leq f_{G1}/f \leq 6 \quad (5)$$

$$-1.6 \leq r_{11}/f \leq -0.2 \quad (6)$$

$$-2 \leq r_{12}/d_{o12} \leq -0.86 \quad (7)$$

$$0.03 \leq f_{G1}/f_{L3} \leq 0.5 \quad (14).$$

11. An objective for a microscope, the objective comprising in order from an object side:
a first lens group with positive refractive power;
a second lens group with positive refractive power; and
a third lens group with negative refractive power,
wherein, when NA represents a numerical aperture of the objective, FN represents a field number of the objective, β represents a magnification of the objective, ε represents an Airy disk diameter on an axis to a d-line of the objective, $\phi_{max}$ represents a maximum value of an effective diameter of a lens included in the objective, and $h_{exp}$ represents a radius of an exit pupil of the objective, the objective satisfies the following conditional expressions:

$$0.8 \leq NA \leq 1.5 \quad (1)$$

$$1000 \leq FN/|\beta|/\epsilon \leq 10000 \quad (2)$$

$$1.7 \leq \phi_{max}/2/h_{exp}/NA \leq 4 \quad (3).$$

* * * * *